(12) United States Patent
Machida et al.

(10) Patent No.: US 9,753,284 B2
(45) Date of Patent: Sep. 5, 2017

(54) DISPLAY DEVICE

(71) Applicant: Sony Corporation, Tokyo (JP)

(72) Inventors: Akio Machida, Kanagawa (JP);
Yukinari Sakamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/370,362

(22) PCT Filed: Dec. 14, 2012

(86) PCT No.: PCT/JP2012/082461
§ 371 (c)(1),
(2) Date: Jul. 2, 2014

(87) PCT Pub. No.: WO2013/111471
PCT Pub. Date: Aug. 1, 2013

(65) Prior Publication Data
US 2014/0340286 A1    Nov. 20, 2014

(30) Foreign Application Priority Data

Jan. 24, 2012   (JP) ................................ 2012-012244

(51) Int. Cl.
*G02B 27/01* (2006.01)
*G02B 26/08* (2006.01)
(Continued)

(52) U.S. Cl.
CPC ..... *G02B 27/0172* (2013.01); *G02B 26/0833* (2013.01); *G02B 26/101* (2013.01);
(Continued)

(58) Field of Classification Search
CPC  G02B 26/0833; G02B 26/101; G02B 27/283; G02B 27/0172; G02B 6/00;
(Continued)

(56) References Cited

U.S. PATENT DOCUMENTS 6,137,457 A   10/2000   Tokuhashi et al.
7,924,506 B2   4/2011   Rieger
(Continued)

FOREIGN PATENT DOCUMENTS

| CN | 1071262 A | 4/1993 |
|---|---|---|
| CN | 1774661 A | 5/2006 |

(Continued)

OTHER PUBLICATIONS

Keller et al., Head mounted Displays for Medical Use. J Disp Tech. Dec. 1, 2008;4(4):468-72.

*Primary Examiner* — Michael Pervan
(74) *Attorney, Agent, or Firm* — Wolf, Greenfield & Sacks, P.C.

(57) ABSTRACT

There is provided a display device including (I) an eyeglass-shaped frame configured to be mounted on a head of an observer, and (II) an image display device attached to the frame. The image display device includes (A) an image forming device, and (B) an optical device on which light output from the image forming device is incident, in which the light is guided, and from which the light is output. A dimmer configured to adjust an amount of external light incident from outside is installed on a side opposite to a side on which the image forming device of the optical device is disposed. A light shielding member configured to shield incidence of external light on the optical device is disposed in a region of the optical device on which light output from the image forming device is incident.

19 Claims, 45 Drawing Sheets

(51) Int. Cl.
*G02B 26/10* (2006.01)
*G02B 27/28* (2006.01)

(52) U.S. Cl.
CPC ......... *G02B 27/017* (2013.01); *G02B 27/283* (2013.01); *G02B 2027/0105* (2013.01); *G02B 2027/0118* (2013.01); *G02B 2027/0174* (2013.01); *G02B 2027/0178* (2013.01)

(58) Field of Classification Search
CPC .......... G02B 27/017; G02B 2027/0118; G02B 2027/0174; G02B 2027/0105; G02B 2027/0178
USPC .............................. 345/7–8; 359/13–14, 630
See application file for complete search history.

(56) References Cited

U.S. PATENT DOCUMENTS

| | | | |
|---|---|---|---|
| 8,411,134 | B2 | 4/2013 | Tomita |
| 8,570,242 | B2 | 10/2013 | Chosokabe et al. |
| 8,797,433 | B2 | 8/2014 | Kaizu et al. |
| 8,861,090 | B2 | 10/2014 | Mukawa |
| 8,907,865 | B2 | 12/2014 | Miyawaki et al. |
| 8,976,453 | B2 | 3/2015 | Akutsu et al. |
| 8,988,315 | B2 | 3/2015 | Mukawa et al. |
| 9,016,864 | B2 | 4/2015 | Sasazaki et al. |
| 9,096,920 | B1 | 8/2015 | Gomez et al. |
| 9,164,221 | B2 | 10/2015 | Akutsu et al. |
| 9,201,242 | B2 | 12/2015 | Miyawaki et al. |
| 9,311,752 | B2 | 4/2016 | Chosokabe et al. |
| 9,451,244 | B2 | 9/2016 | Sasazaki et al. |
| 9,488,846 | B2 | 11/2016 | Hayashi |
| 9,558,540 | B2 | 1/2017 | Mukawa |
| 9,569,897 | B2 | 2/2017 | Miyawaki et al. |
| 2006/0228073 | A1* | 10/2006 | Mukawa et al. ................. 385/31 |
| 2007/0012925 | A1* | 1/2007 | Hong et al. ....................... 257/72 |
| 2007/0070859 | A1* | 3/2007 | Hirayama ................. 369/112.04 |
| 2007/0091445 | A1 | 4/2007 | Amitai |
| 2007/0159673 | A1* | 7/2007 | Freeman ............... G02B 5/1814 359/19 |
| 2008/0285140 | A1 | 11/2008 | Amitai |
| 2010/0110368 | A1 | 5/2010 | Chaum |
| 2010/0128107 | A1 | 5/2010 | Tomita |
| 2010/0277687 | A1 | 11/2010 | Shehadeh et al. |
| 2010/0321409 | A1 | 12/2010 | Komori et al. |
| 2011/0050727 | A1 | 3/2011 | Mukawa |
| 2011/0090389 | A1* | 4/2011 | Saito ................... G02B 27/0172 348/333.01 |
| 2011/0241975 | A1 | 10/2011 | Mukawa et al. |
| 2011/0248904 | A1 | 10/2011 | Miyawaki et al. |
| 2011/0248905 | A1 | 10/2011 | Chosokabe et al. |
| 2012/0044571 | A1 | 2/2012 | Mukawa |
| 2012/0127434 | A1 | 5/2012 | Sasazaki et al. |
| 2012/0194420 | A1 | 8/2012 | Osterhout et al. |
| 2012/0212398 | A1 | 8/2012 | Border et al. |
| 2012/0218426 | A1 | 8/2012 | Kaizu et al. |
| 2012/0249895 | A1 | 10/2012 | Kaifu |
| 2013/0113973 | A1* | 5/2013 | Miao ....................... G09G 3/003 348/333.01 |
| 2013/0128611 | A1 | 5/2013 | Akutsu et al. |
| 2013/0135749 | A1 | 5/2013 | Akutsu et al. |
| 2013/0241948 | A1 | 9/2013 | Kimura |
| 2013/0242555 | A1 | 9/2013 | Mukawa |
| 2013/0300766 | A1 | 11/2013 | Mukawa |
| 2014/0022284 | A1 | 1/2014 | Chosokabe et al. |
| 2014/0253605 | A1 | 9/2014 | Border et al. |
| 2014/0334010 | A1 | 11/2014 | Mukawa |
| 2014/0340550 | A1 | 11/2014 | Kaizu et al. |
| 2014/0347252 | A1 | 11/2014 | Miyawaki et al. |
| 2015/0062699 | A1 | 3/2015 | Hayashi |
| 2015/0109679 | A1 | 4/2015 | Mukawa et al. |
| 2015/0138647 | A1 | 5/2015 | Akutsu et al. |
| 2015/0226970 | A1 | 8/2015 | Mukawa |
| 2015/0229897 | A1 | 8/2015 | Mukawa |
| 2015/0235620 | A1 | 8/2015 | Takahota et al. |
| 2015/0260994 | A1 | 9/2015 | Akutsu et al. |
| 2015/0260995 | A1 | 9/2015 | Mukawa |
| 2015/0269784 | A1 | 9/2015 | Miyawaki et al. |
| 2015/0277125 | A1 | 10/2015 | Hirano et al. |
| 2015/0277126 | A1 | 10/2015 | Hirano et al. |
| 2015/0288954 | A1 | 10/2015 | Sasazaki et al. |
| 2015/0338660 | A1 | 11/2015 | Mukawa |
| 2015/0346494 | A1 | 12/2015 | Tanaka et al. |
| 2015/0362735 | A1 | 12/2015 | Akutsu et al. |
| 2015/0370075 | A1 | 12/2015 | Ato et al. |
| 2016/0041394 | A1 | 2/2016 | Tanaka et al. |
| 2016/0062123 | A1 | 3/2016 | Tanaka et al. |
| 2016/0097931 | A1 | 4/2016 | Takahota et al. |
| 2016/0147069 | A1 | 5/2016 | Tanaka et al. |
| 2016/0154243 | A1 | 6/2016 | Aiki |
| 2017/0069140 | A1 | 3/2017 | Mukawa |

FOREIGN PATENT DOCUMENTS

| | | |
|---|---|---|
| CN | 1957269 A | 5/2007 |
| CN | 101141568 A | 3/2008 |
| CN | 103119512 A | 5/2013 |
| EP | 2 535 760 A2 | 12/2012 |
| EP | 2 662 723 A1 | 11/2013 |
| JP | 57-026822 A | 2/1982 |
| JP | 01-188826 A | 7/1989 |
| JP | 02-004212 A | 1/1990 |
| JP | 08-160340 A | 6/1996 |
| JP | 08-160344 A | 6/1996 |
| JP | 10-126711 A | 5/1998 |
| JP | 10-319240 A | 12/1998 |
| JP | 2000-171750 A | 6/2000 |
| JP | 2003-015075 | 1/2003 |
| JP | 2004-101197 | 4/2004 |
| JP | 2005-172851 A | 6/2005 |
| JP | 2005-308889 A | 11/2005 |
| JP | 2006-162767 | 6/2006 |
| JP | 2006-209144 A | 8/2006 |
| JP | 2006-267887 A | 10/2006 |
| JP | 2006-308858 | 11/2006 |
| JP | 2006-343747 | 12/2006 |
| JP | 2007-094175 | 4/2007 |
| JP | 2007-264324 A | 10/2007 |
| JP | 2008-085548 A | 4/2008 |
| JP | 2008-103916 A | 5/2008 |
| JP | 2009-104170 | 5/2009 |
| JP | 2009-145513 A | 7/2009 |
| JP | 2009-251428 A | 10/2009 |
| JP | 2010-145674 A | 7/2010 |
| JP | 2010-282231 A | 12/2010 |
| JP | 2011-209732 A | 10/2011 |
| JP | 2012-013940 | 1/2012 |
| JP | 2012-088472 A | 5/2012 |
| JP | 2012-252091 | 12/2012 |
| JP | 2013-005201 A | 1/2013 |
| JP | 2013-122519 A | 6/2013 |
| JP | 2013-210643 A | 10/2013 |
| JP | 2013-214856 A | 10/2013 |
| WO | WO 2005/093493 | 10/2005 |
| WO | WO 2006/085310 A1 | 8/2006 |
| WO | WO 2008/078320 A2 | 7/2008 |
| WO | WO 2010/087293 A1 | 8/2010 |

* cited by examiner

FIG. 3
FIG. 3A
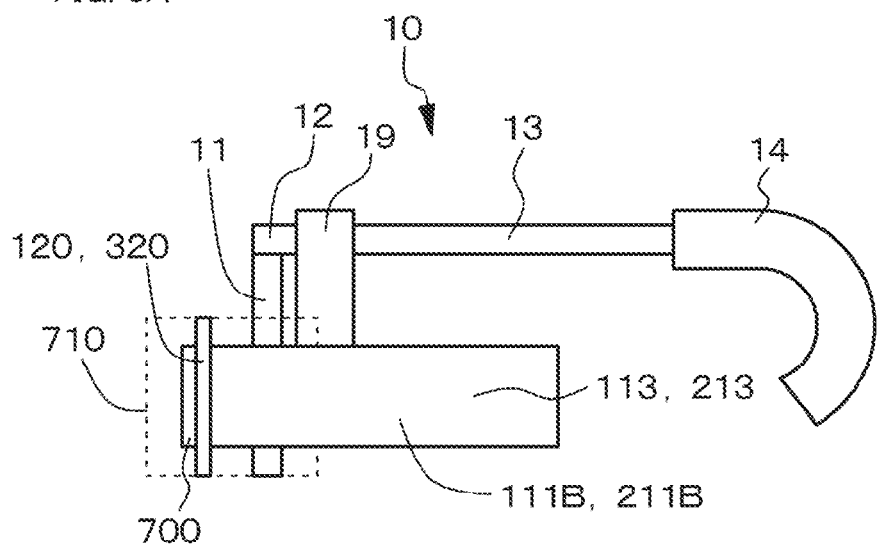
FIG. 3B
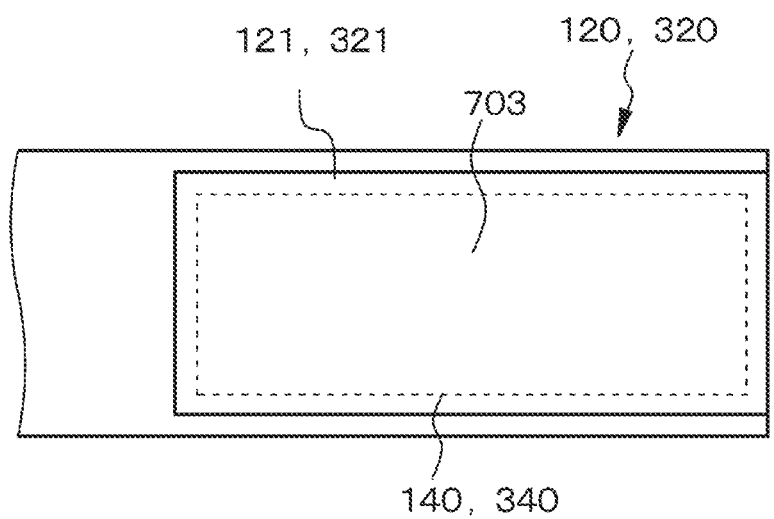

FIG. 4
FIG. 4A
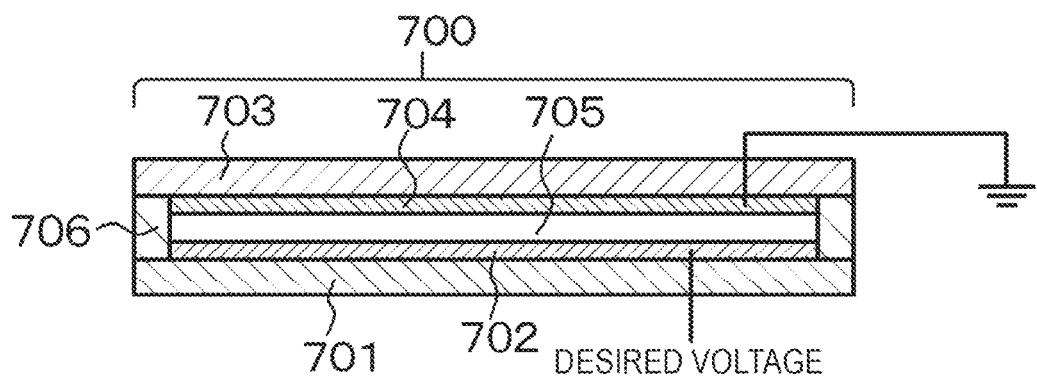
FIG. 4B
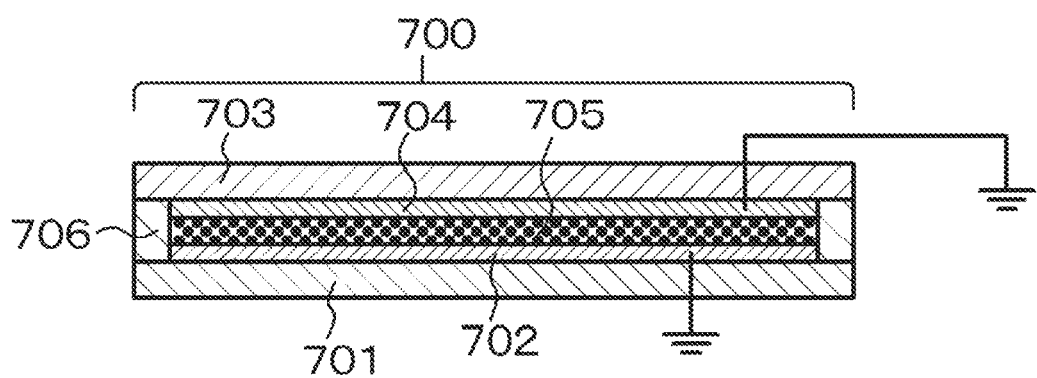

(EMBODIMENT 3)

(EMBODIMENT 5)

FIG. 16A (EMBODIMENT10)

FIG. 17A (EMBODIMENT 11)

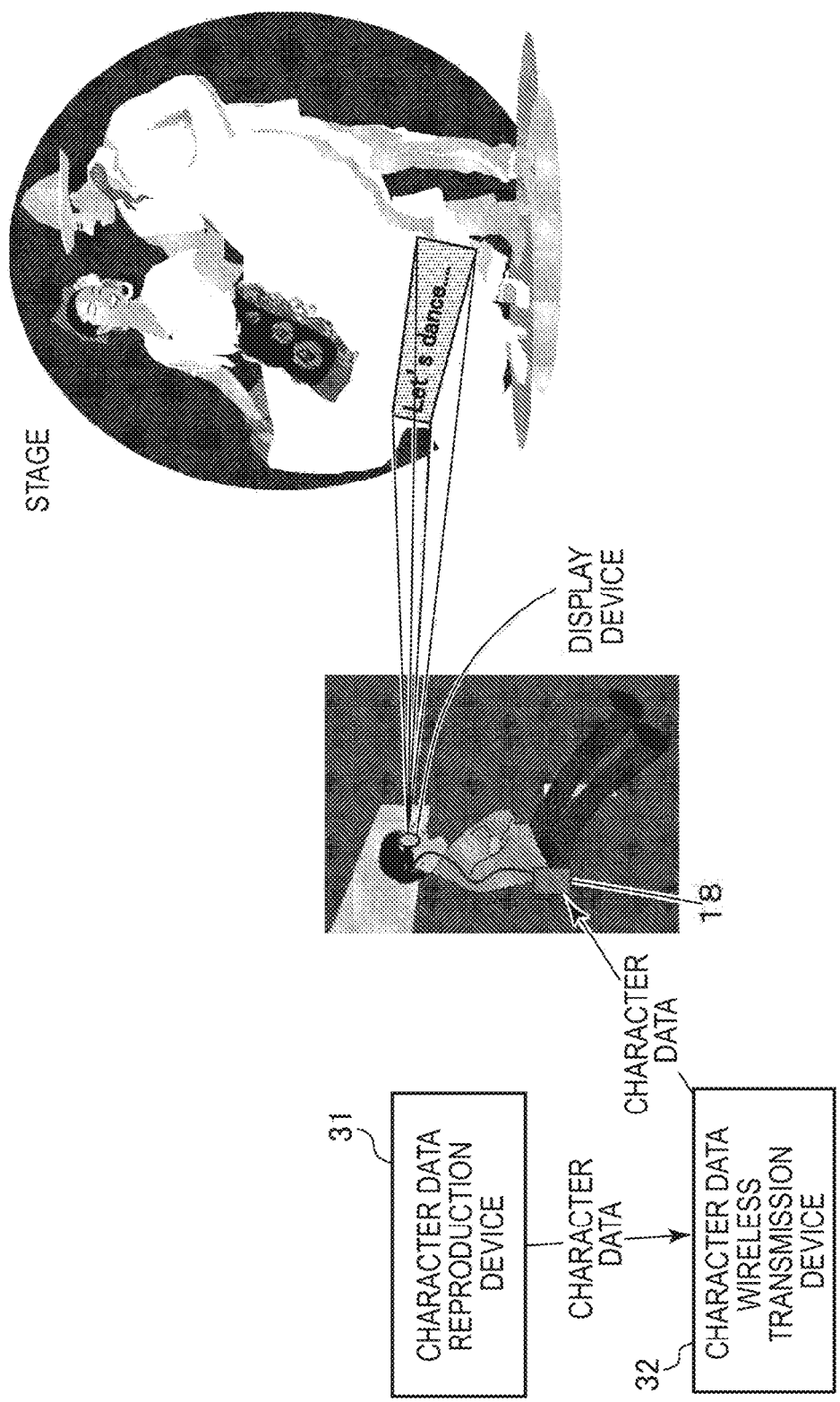

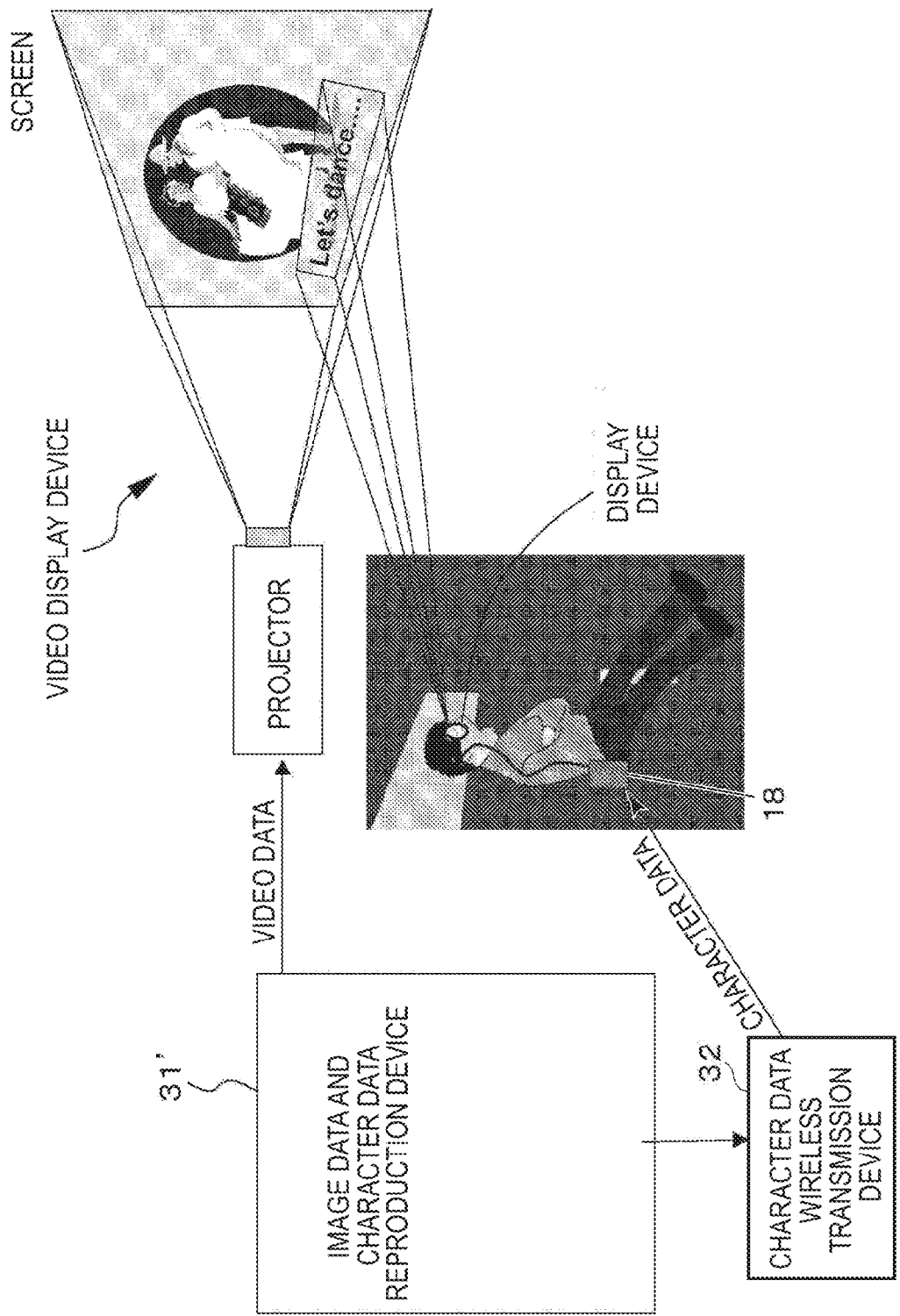

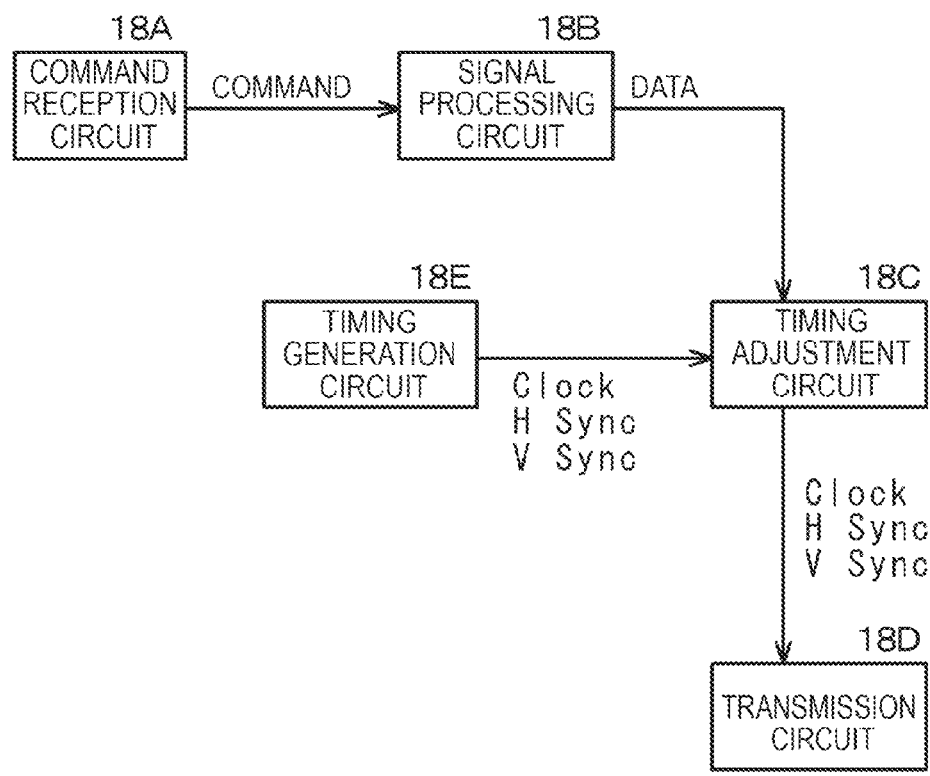

FIG. 24
FIG. 24A
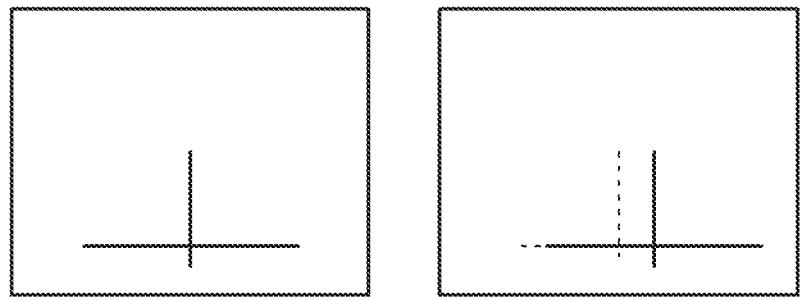
FIG. 24B
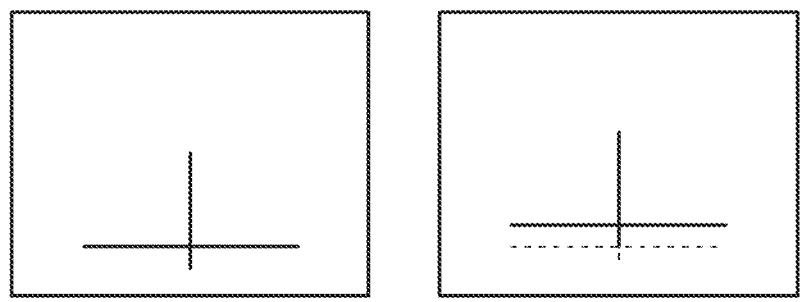
FIG. 24C
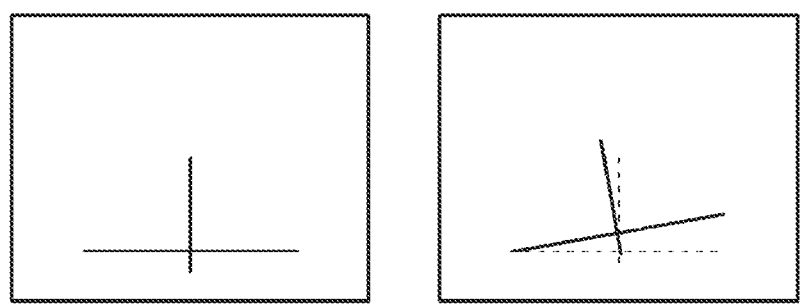

FIG. 25
FIG. 25A
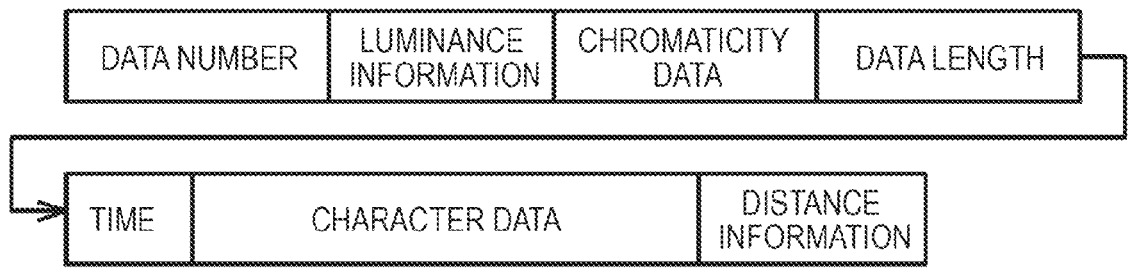
FIG. 25B
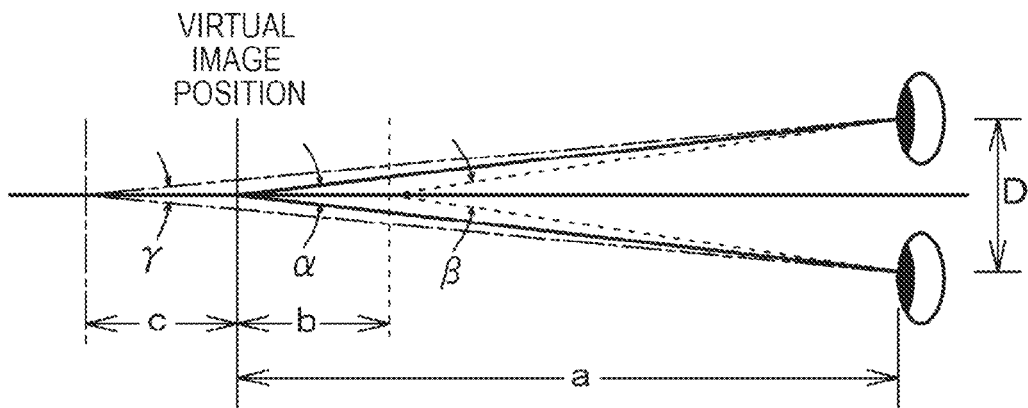

FIG. 26A (EMBODIMENT 14)

(EMBODIMENT 14)

FIG. 28A (EMBODIMENT 15)

FIG. 31
FIG. 31A
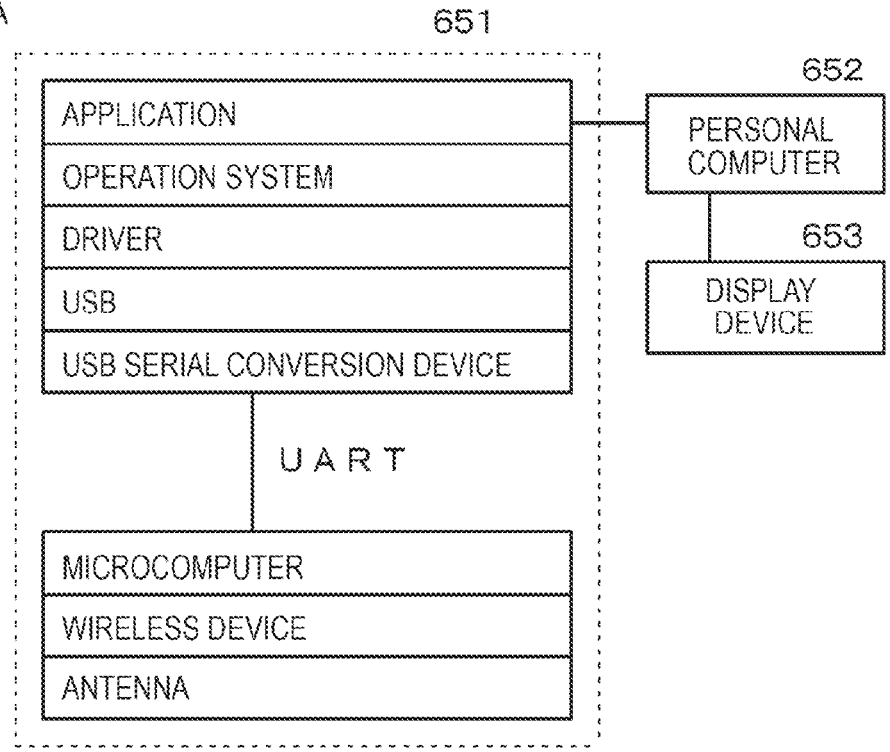
FIG. 31B
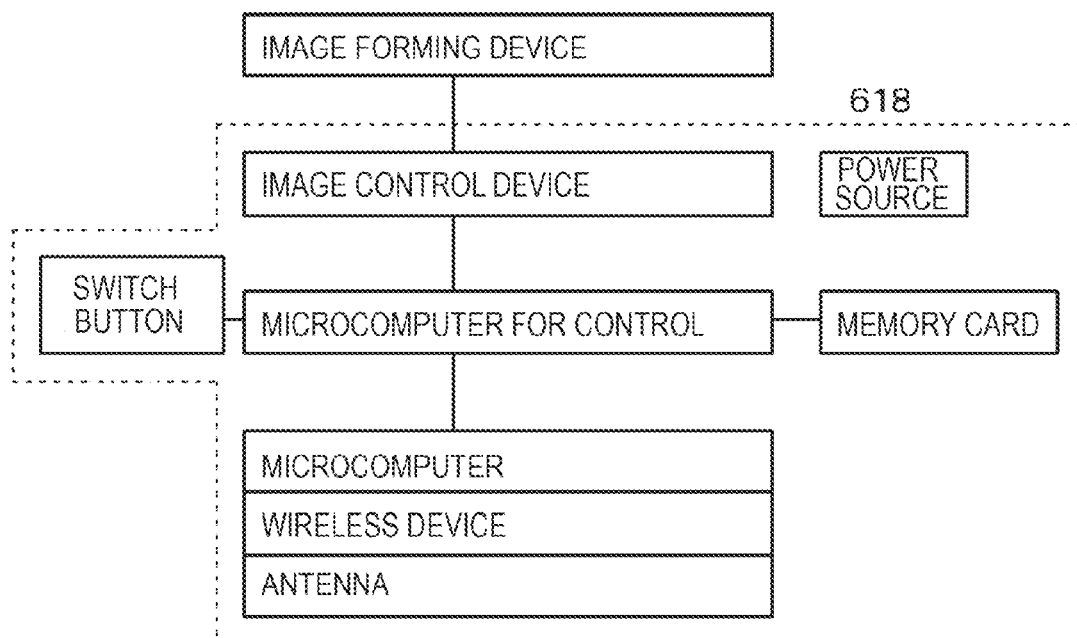

| DESIGNATION IDENTIFICATION CODE | TOTAL DISPLAY TIME | LUMINANCE INFORMATION | DATA |
|---|---|---|---|
| 01 | 10 | 60 | AAAAAAAAAA |
| 02 | 20 | 60 | BBBBBBBBBB |
| 03 | 15 | 80 | CCCCCCCCCC |
| 04 | 20 | 50 | DDDDDDDDDD |

FIG. 35
FIG. 35A (EMBODIMENT 20)
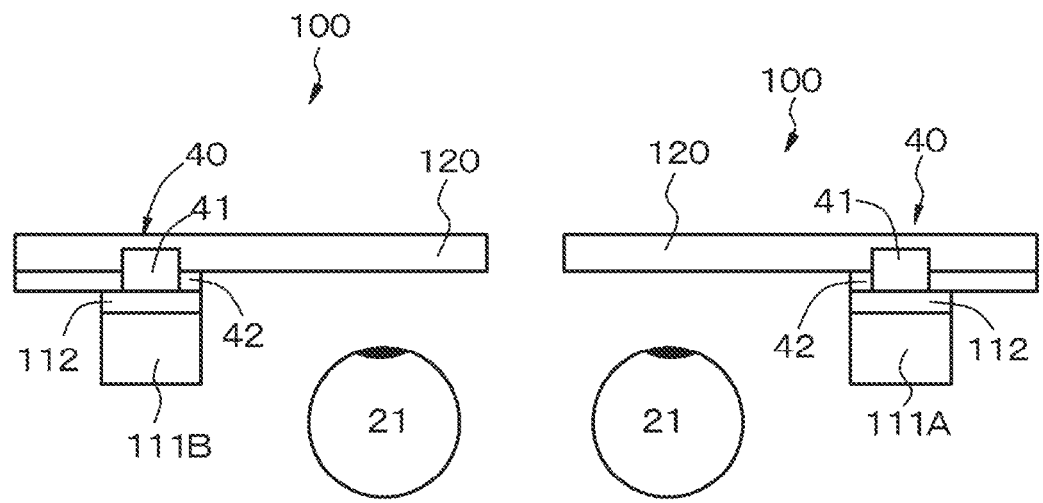
FIG. 35B
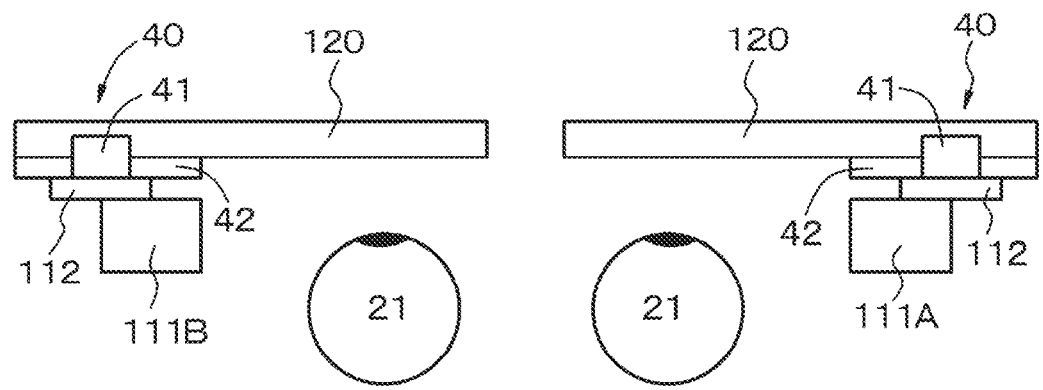
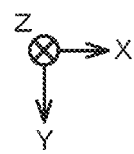
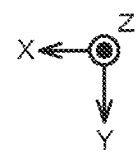

FIG. 37A (EMBODIMENT 21)

FIG. 38
FIG. 38A [PRINCIPLE DIAGRAM]
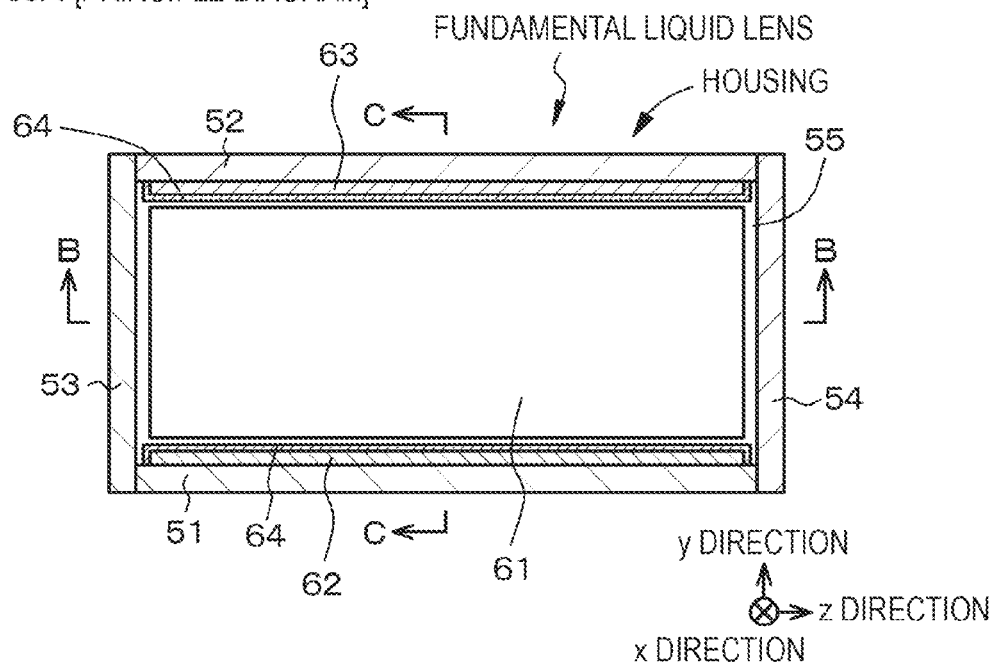
FIG. 38B [PRINCIPLE DIAGRAM]
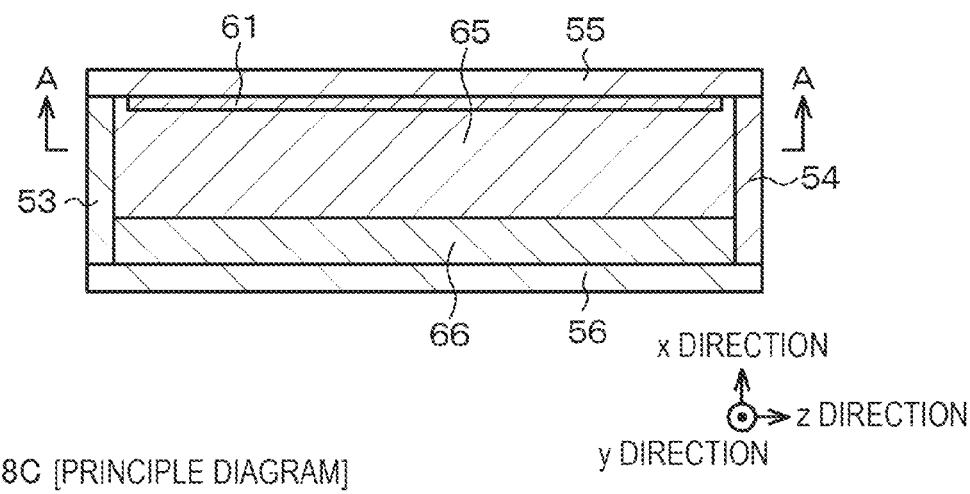
FIG. 38C [PRINCIPLE DIAGRAM]
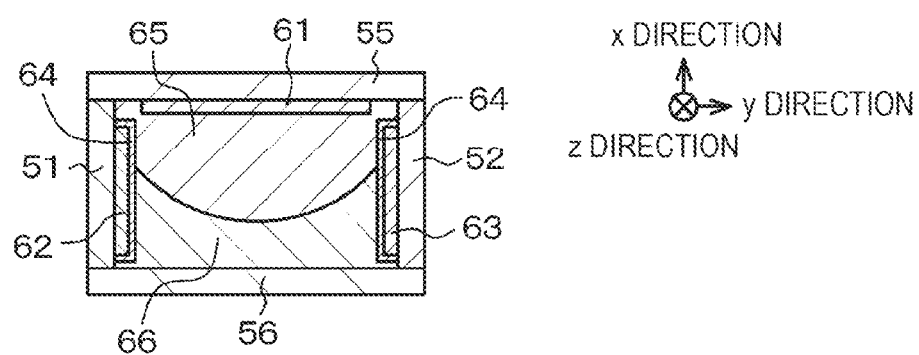

FIG. 39
FIG. 39A
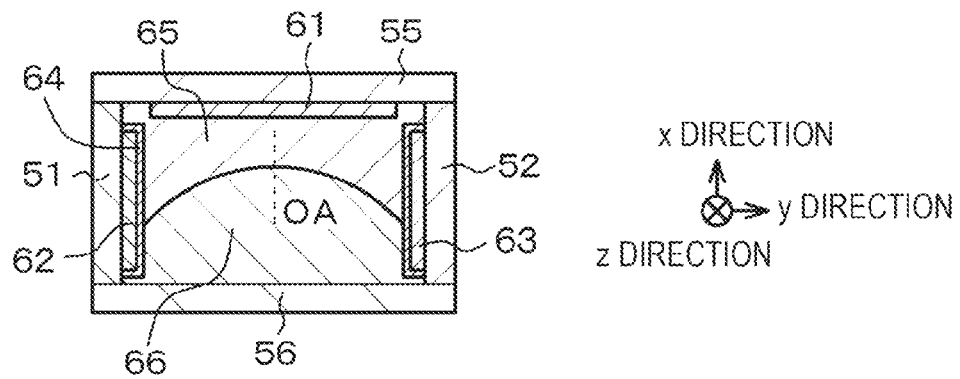
FIG. 39B
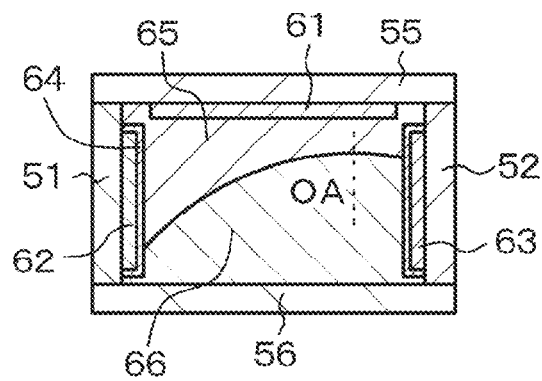
FIG. 39C
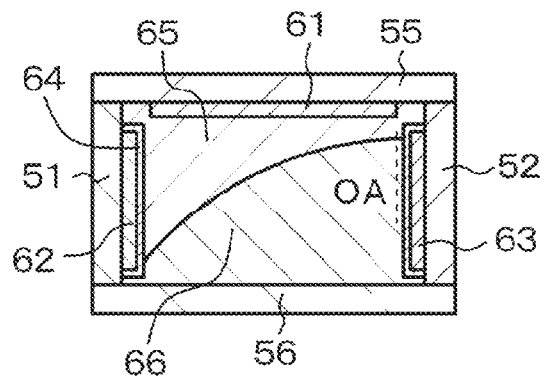

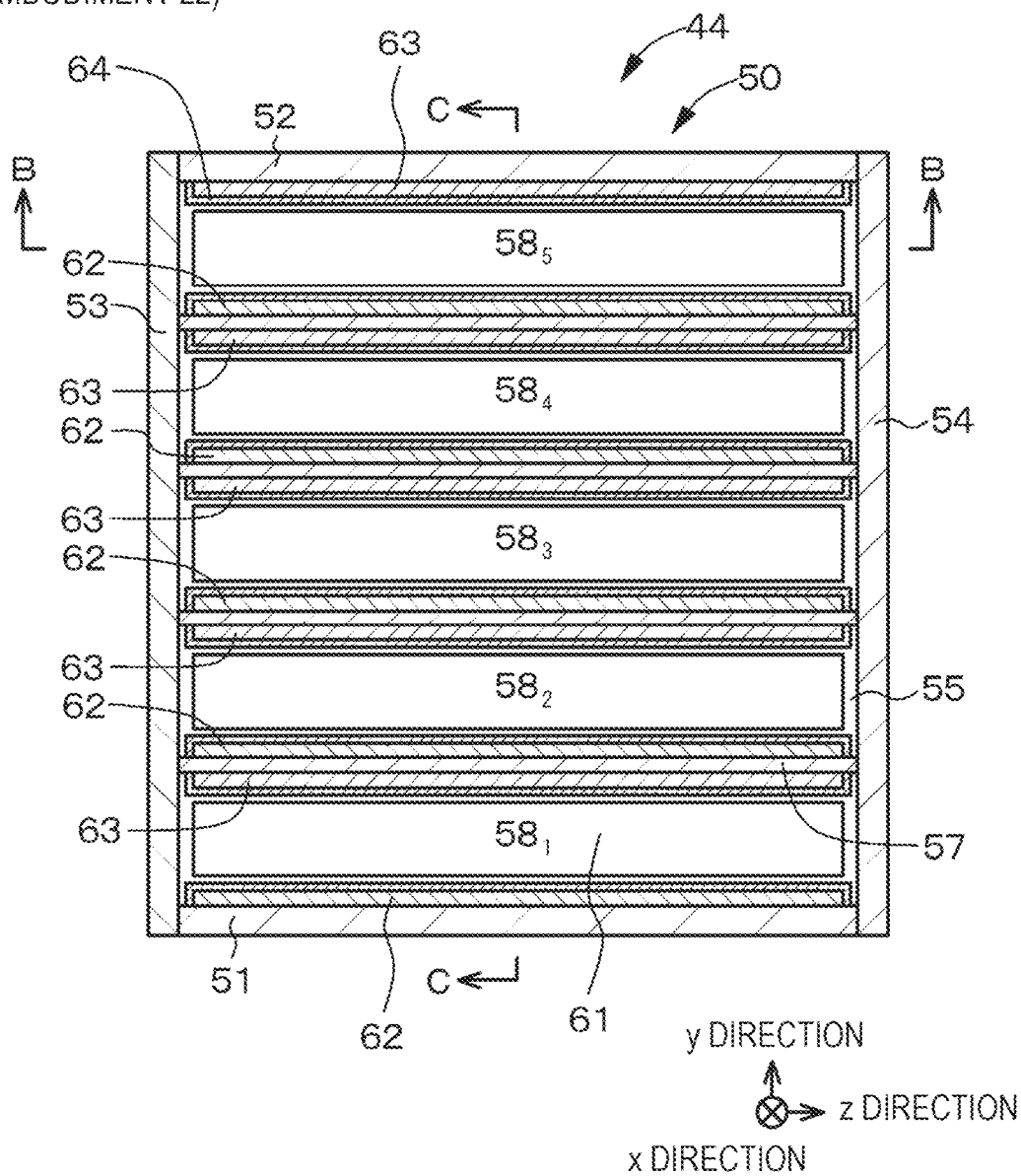

FIG. 41
FIG. 41A
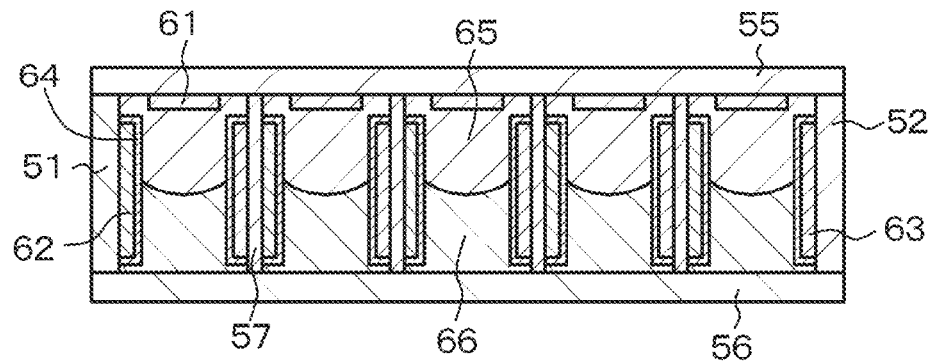
FIG. 41B
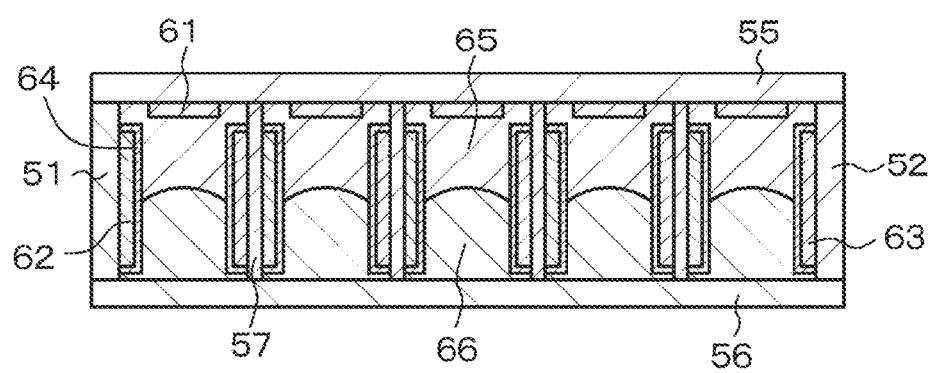
FIG. 41C
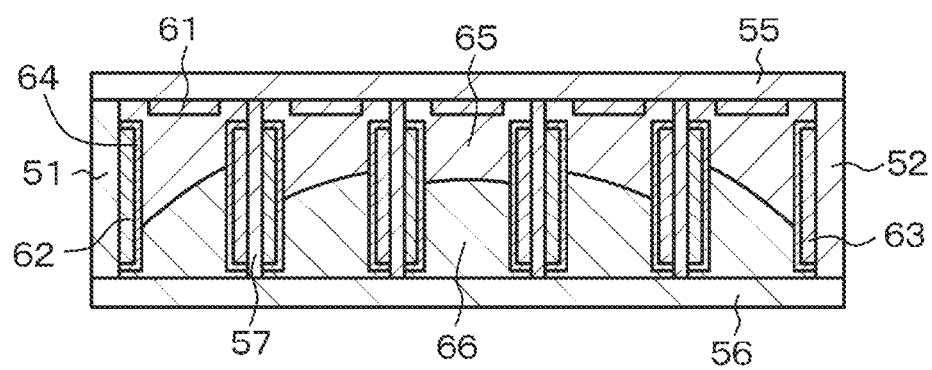

FIG. 42
FIG. 42A
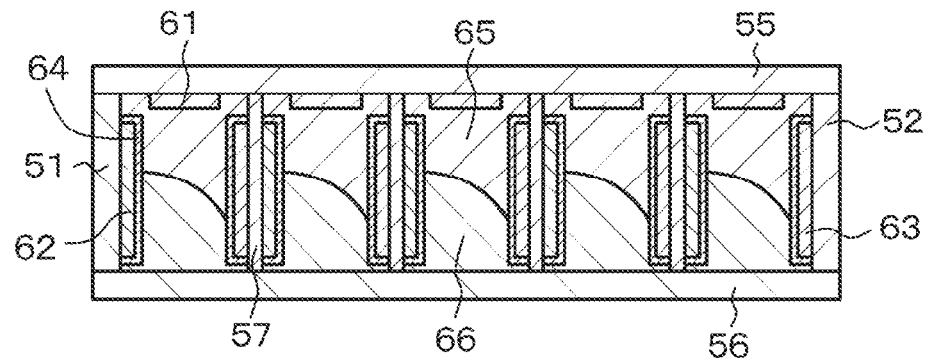
FIG. 42B
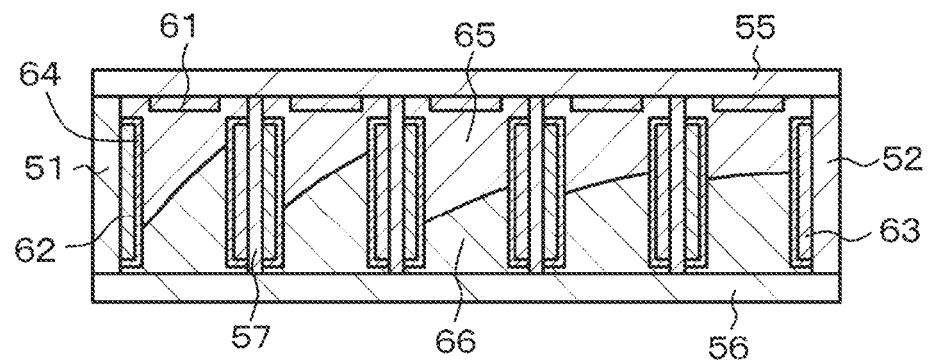
FIG. 43
(EMBODIMENT 23)
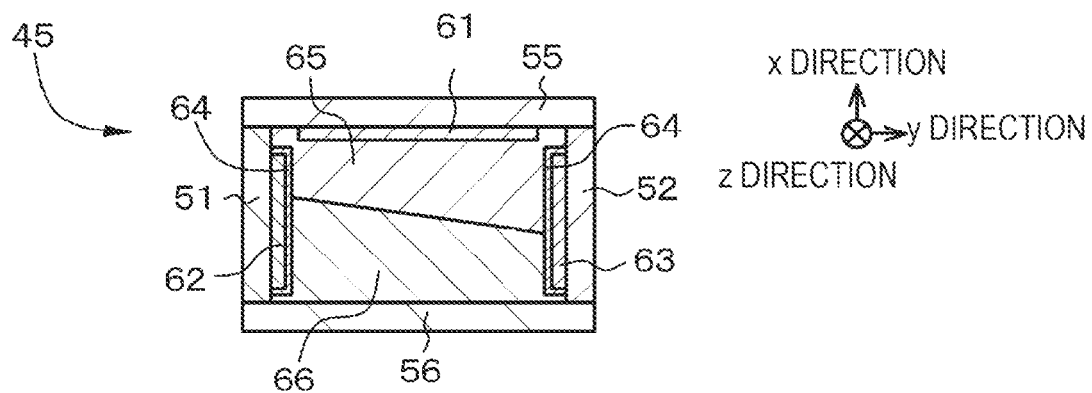

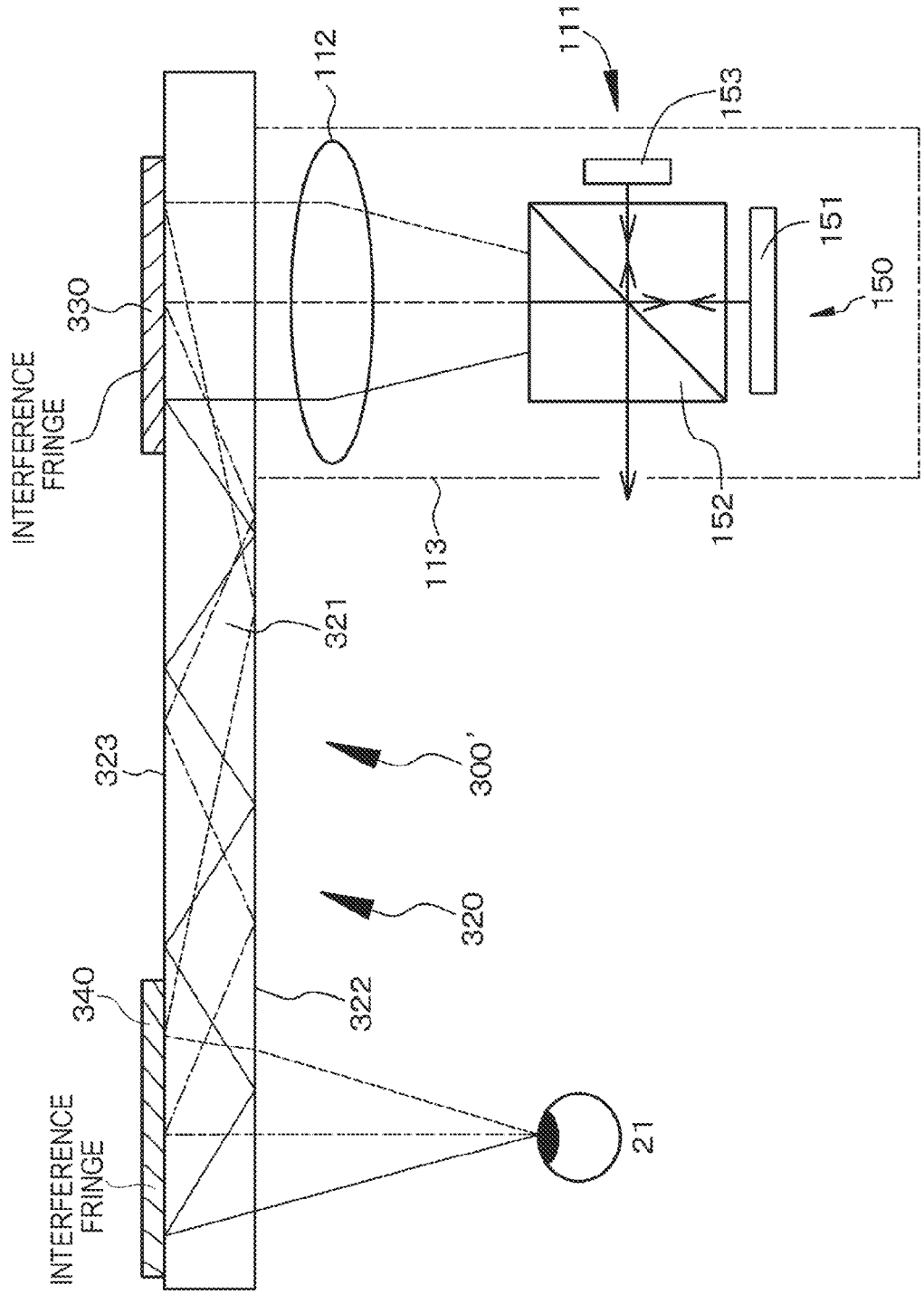

DISPLAY DEVICE

CROSS REFERENCES TO RELATED APPLICATIONS

The present invention is the National Stage of International Application No. PCT/JP2012/082461, filed in the Japanese Patent Office as a Receiving Office on Dec. 14, 2012, and claims the priority benefit of Japanese Patent Application Number 2012-012244, filed in the Japanese Patent Office on Jan. 24, 2012, which is hereby incorporated by reference to the maximum extent allowable by law.

TECHNICAL FIELD

The present disclosure relates to a display device, and more specifically, relates to a display device using a head mounted type display (HMD or Head Mounted Display).

BACKGROUND ART

In recent years, augmented reality technology (AR technology: Augmented Reality) in which a virtual object or various kinds of information serving as supplementary information is combined with a real environment (or a part thereof) and then presented as electronic information has been focused on. In order to realize the augmented reality technology, for example, a head mounted display has been considered as a device for presenting visual information. In addition, as fields of its application, work support in real environments including, for example, provision of road guidance information, provision of technical information to technicians who perform maintenance, and the like is expected to be provided. Particularly, such a head mounted type display is very convenient because the display can be used without hands. In addition, even when one wishes to view a video or an image while moving outside, the video or the image and an external environment can be simultaneously perceived in a visual field, and thus free movement is possible.

A virtual image display device (image display device) for allowing an observer to observe a two-dimensional image formed by an image forming device as a virtual image enlarged by a virtual image optical system is well known, for example, from JP 2006-162767A.

As illustrated in the conceptual diagram of FIG. 47, an image display device 100' includes an image forming device 111 having a plurality of pixels arranged in a 2D matrix, a collimating optical system 112 which collimates light output from a pixel of the image forming device 111 into parallel light, and an optical device (light guide unit) 120 on which light that has turn into the parallel light from the collimating optical system 112 is incident, through which the light is guided, and from which the light is output. The optical device 120 includes a light guide plate 121 which outputs the incident light after the incident light propagates through the inside according to total reflection, a first deflecting unit 130 (for example, including a light reflecting film of one layer) which reflects the light incident on the light guide plate 121 so that the light incident on the light guide plate 121 is totally reflected inside the light guide plate 121, and a second deflecting unit 140 (for example, including a light reflecting multi-film having a multi-layer laminated structure) which outputs from the light guide plate 121 the light propagating through the inside of the light guide plate 121 according to the total reflection. A weight and size of a device can be reduced, for example, when the HMD is formed according to such an image display device 100'. With regard to reference numerals denoting other constituent elements in FIG. 47, an image display device of Embodiment 1 that will be described with reference to FIG. 1 will be referred to.

Alternatively, in order to allow an observer to observe a 2D image formed by the image forming device as a virtual image enlarged by the virtual image optical system, a virtual image display device (image display device) using hologram diffraction gratings is well known, for example, from JP 2007-94175A.

As illustrated in the conceptual diagram of FIG. 48, an image display device 300' basically includes an image forming device 111 which displays an image, a collimating optical system 112, and an optical device (a light guide unit) 320 on which light displayed on the image forming device 111 is incident and through which the incident light is guided to a pupil 21 of the observer. Here, the optical device 320 includes a light guide plate 321 and a first diffraction grating member 330 and a second diffraction grating member 340 formed by reflective volume hologram diffraction gratings provided on the light guide plate 321. Light output from each pixel of the image forming device 111 is incident on the collimating optical system 112, and a plurality of parallel light beams having different angles incident on the light guide plate 321 is generated by the collimating optical system 112 and incident on the light guide plate 321. The parallel light is incident on and output from a first surface 322 of the light guide plate 321. On the other hand, the first diffraction grating member 330 and the second diffraction grating member 340 are mounted on a second surface 323 of the light guide plate 321 parallel to the first surface 322 of the light guide plate 321. With regard to reference numerals denoting other constituent elements in FIG. 48, an image display device of Embodiment 7 that will be described with reference to FIG. 11 will be referred to.

In addition, by displaying images on the image display device 100' or 300', the observer can view the displayed images superimposed on images of the outer field.

However, due to extreme brightness of the environment around the position in which the image display device 100' or 300' is placed or the content of an image being displayed, a problem that sufficient contrast is not given to an image to be observed by an observer can occur. Thus, a measure for solving this problem is known from, for example, JP 2004-101197A. In the technology disclosed in the patent publication, an incidence amount of external light is controlled by a liquid crystal shutter.

CITATION LIST

Patent Literature

Patent Literature 1: JP 2006-162767A
Patent Literature 2: JP 2007-94175A
Patent Literature 3: JP 2004-101197A

SUMMARY OF INVENTION

Technical Problem

Here, when the liquid crystal shutter disclosed in JP 2004-101197 is applied to the image display device 100' or 300' described above, the following problem occurs. In other words, as a result of a change in an incidence amount of external light caused by an operation of the liquid crystal shutter, an amount of external light incident on the first deflecting unit 130 or the first diffraction grating member 330 is changed. For this reason, there is concern that undesired stray light or the like is generated, which leads to deterioration of image display quality of the virtual image display device (image display device). In addition, since a dimmer is installed in the virtual image display device (image display device), there is concern that a whole weight of the virtual image display device (image display device) increases, which causes a feeling of discomfort to a user of the virtual image display device (image display device).

Therefore, a first objective of the present disclosure is to provide a display device in which there is no concern of causing deterioration of image display quality attributable to incidence of external light. In addition, a second objective of the present disclosure is to provide a display device having a configuration and a structure that minimize increase of its overall weight.

Solution to Problem

A display device according to a first aspect of the present disclosure for achieving the first objective described above or a display device according to a second aspect of the present disclosure for achieving the second objective described above is specifically a head mounted type display (HMD), and includes:

(I) an eyeglass-shaped frame mounted on the head of an observer; and (II) an image display device attached to the frame, wherein the image display device includes:

(A) an image forming device; and (B) an optical device on which light output from the image forming device is incident, in which the light is guided, and from which the light is output, and in which a dimmer configured to adjust an amount of external light incident from outside is installed on the side opposite to the side on which the image forming device of the optical device is disposed.

In addition, in the display device according to the first aspect of the present disclosure, a light shielding member configured to shield incidence of external light on the optical device is disposed in a region of the optical device on which light output from the image forming device is incident.

In addition, in the display device according to the second aspect of the present disclosure, the dimmer includes:

a first substrate facing the optical device and a second substrate facing the first substrate;

electrodes each provided in the first substrate and the second substrate; and a light transmission control material layer sealed between the first substrate and the second substrate in which the first substrate also serves as a constituent member of the optical device.

Advantageous Effects of Invention

In the display device according to the first aspect of the present disclosure, the light shielding member configured to shield incidence of external light on the optical device is disposed in the region of the optical device on which light output from the image forming device is incident. Thus, even when there is a change in an amount of incident external light caused by an operation of the dimmer, the external light is not incident on the region of the optical device on which light output from the image forming device is incident, and thus generation of unwanted stray light or the like and deterioration of display quality of an image in the display device do not occur. In addition, in the display device according to the second aspect of the present disclosure, since the first substrate constituting the dimmer also serves as a constituent member of the optical device, a reduction of a whole weight of the display device can be attained, and there is no concern of causing discomfort to a user of the display device.

BRIEF DESCRIPTION OF DRAWINGS

FIG. 3A and FIG. 3B are respectively a schematic diagram of the display device of Embodiment 1 as viewed from a side and a schematic diagram of the portion of an optical device and a dimmer of the display device of Embodiment 1 as viewed from a front side.

FIG. 4A and FIG. 4B are schematic cross-sectional diagrams of the dimmer schematically showing an operation of the dimmer in the display device of Embodiment 1.

FIG. 20 is a conceptual diagram of a state in which the display device of Embodiment 12 is being used.

FIG. 21 is a conceptual diagram of a display device of Embodiment 12.

FIG. 22 is a conceptual diagram of a display device of Embodiment 12.

FIG. 23A and FIG. 23B are diagrams showing examples of image signals in Embodiment 12 and Embodiment 13.

FIG. 24A, FIG. 24B, and FIG. 24C are schematic diagrams showing states in which images displayed by image display devices for the left eye and the right eye are deviated.

FIG. 25A and FIG. 25B are respectively a conceptual diagram of a format of an image signal to an image forming device and a signal to which information of an observation position from an observer (display device) to an observation object is added and a schematic diagram for describing adjustment of a convergence angle corresponding to the distance from the display device to the observation object.

FIG. 26A and FIG. 26B are a diagram schematically showing propagation of light in a light guide plate constituting an image display device of a display device of Embodiment 14 and a conceptual diagram showing a disposition state of the light guide plate and the like.

FIG. 28A and FIG. 28B are a diagram schematically showing propagation of light in a light guide plate constituting an image display device of a display device of Embodiment 15 and a conceptual diagram showing a disposition state of the light guide plate and the like.

FIG. 31A and FIG. 31B respectively are a block diagram of a system configuration of a transmission device of Embodiment 16 and a block diagram of a system configuration of a display device thereof.

FIG. 35A and FIG. 35B are conceptual diagrams of a display device of Embodiment 20.

FIG. 38A is a schematic cross-sectional diagram obtained when a fundamental liquid lens is cut along the arrow A-A of FIG. 38B, FIG. 38B is a schematic cross-sectional diagram obtained when the fundamental liquid lens is cut along the arrow B-B of FIG. 38A, and FIG. 38C is a schematic cross-sectional diagram obtained when the fundamental liquid lens is cut along the arrow C-C of FIG. 38A.

FIG. 39A, FIG. 39B, and FIG. 39C are each schematic cross-sectional diagrams obtained when the fundamental liquid lens is cut along the arrow C-C of FIG. 38A schematically showing an operation of the liquid lens.

FIG. 40 is a schematic cross-sectional diagram of Embodiment 22 the same as when the liquid lens is cut along the arrow A-A of FIG. 38B.

FIG. 41A, FIG. 41B, and FIG. 41C are each schematic cross-sectional diagrams obtained when the liquid lens is cut along the arrow C-C of FIG. 40 in Embodiment 22 schematically showing an operation of the liquid lens.

FIG. 42A and FIG. 42B are each schematic cross-sectional diagrams obtained when the liquid lens is cut along the arrow C-C of FIG. 40 in Embodiment 22 schematically showing an operation of the liquid lens.

FIG. 43 is a conceptual diagram of a liquid prism of Embodiment 23.

FIG. 48 is a conceptual diagram of an image display device of a modified example of the display device of the related art.

DESCRIPTION OF EMBODIMENTS

Figure 1:
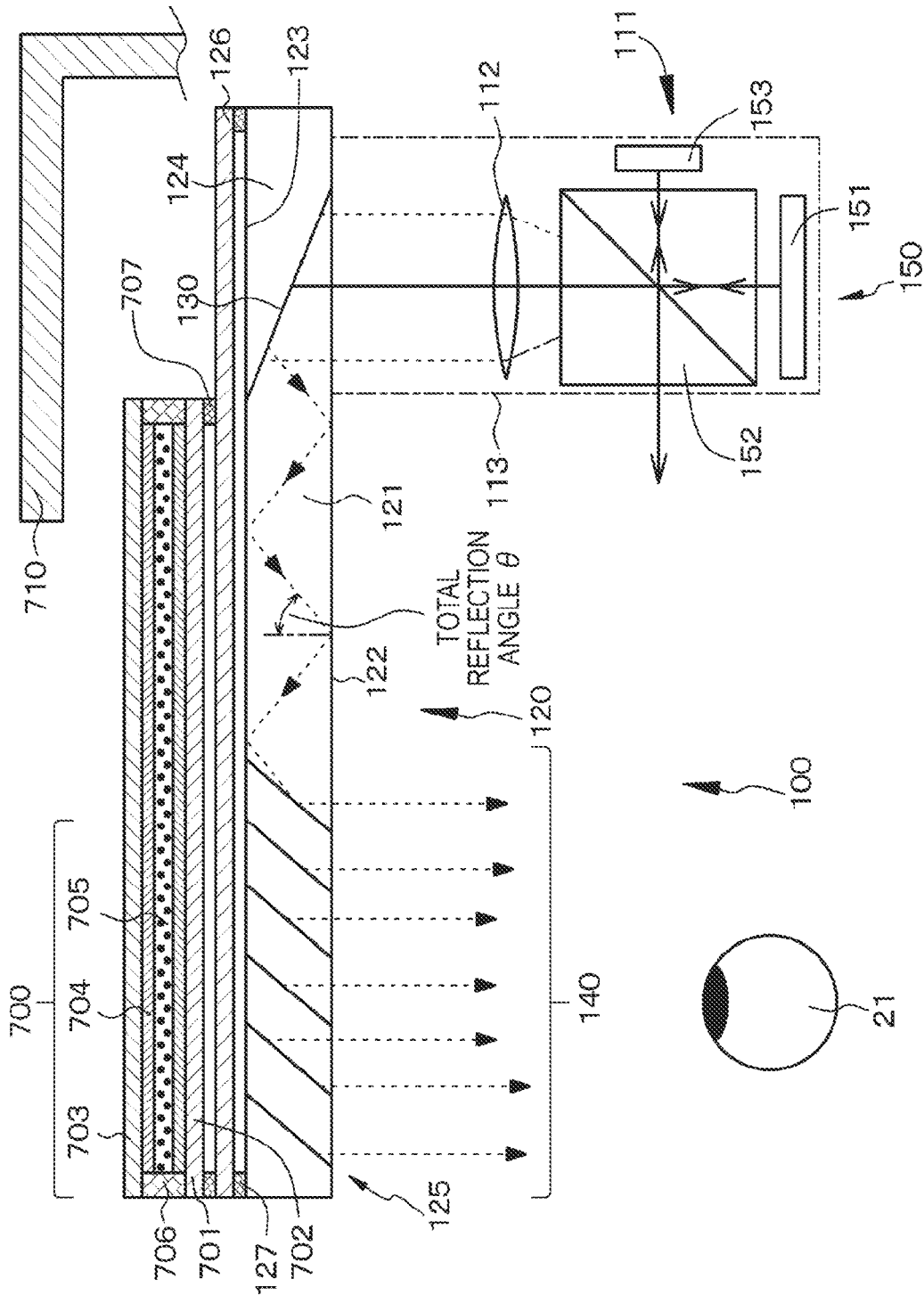
FIG. 1 is a conceptual diagram of a display device of Embodiment 1.

Hereinafter, the present disclosure will be described based on Embodiments with reference to the drawings, but the present disclosure is not limited to the examples, and numeric values and materials in Embodiments are mere examples. Note that description will be provided in the following order.

1. Description relating to overall factors of display devices according to a first aspect and a second aspect of the present disclosure 2. Embodiment 1 (A display device according to a first aspect of the present disclosure)

3. Embodiment 2 (Modification of Embodiment 1)

4. Embodiment 3 (Another modification of Embodiment 1)

5. Embodiment 4 (Modification of Embodiment 1 to Embodiment 3)

6. Embodiment 5 (The display device according to the second aspect of the present disclosure and a modification of Embodiment 4)

7. Embodiment 6 (Modification of Embodiment 1 to Embodiment 5)

8. Embodiment 7 (Another modification of Embodiment 1 to Embodiment 5)

9. Embodiment 8 (Still another modification of Embodiment 1 to Embodiment 5)

10. Embodiment 9 (Still another modification of Embodiment 1 to Embodiment 5)

11. Embodiment 10 (Still another modification of Embodiment 1 to Embodiment 5)

12. Embodiment 11 (Still another modification of Embodiment 1 to Embodiment 5)

13. Embodiment 12 (Display device of 1A to a display device of 1B of the present disclosure)

14. Embodiment 13 (Display device of 1C of the present disclosure)

15. Embodiment 14 (Modification of Embodiment 12 to Embodiment 13)

16. Embodiment 15 (Modification of Embodiment 14)

17. Embodiment 16 (Display device of 3A of the present disclosure)

18. Embodiment 17 (Display device of 3B of the present disclosure)

19. Embodiment 18 (Display device of 3C of the present disclosure)

20. Embodiment 19 (Display device of 3D of the present disclosure)

21. Embodiment 20 (Display device of 2A of the present disclosure)

22. Embodiment 21 (Display device of 2B of the present disclosure)

23. Embodiment 22 (Display device of 2C of the present disclosure)

24. Embodiment 23 (Display device of 2D of the present disclosure)

25. Embodiment 24 (Modification of Embodiment 20 to Embodiment 23)

26. Embodiment 25 (Modification of Embodiment 20 to Embodiment 24), and others

[Description Relating to Overall Factors of Display Devices According to a First Aspect and a Second Aspect of the Present Disclosure]

In a display device according to a first aspect of the present disclosure, a region of an optical device on which light output from an image forming device is incident is preferably included in a projection image of a light shielding member on an optical device.

In the display device according to the first aspect of the present disclosure that includes the preferable form, the light shielding member can be configured to be disposed separate from the optical device on the side opposite to the side on which the image forming device of the optical device is disposed. Note that, in such a configuration, the light shielding member may be formed of, for example, an opaque plastic material, and such a light shielding member can be formed such that the member integrally extends from a housing of the image display device, is mounted in the housing of the image display device, integrally extends from a frame, or is mounted in the frame. Furthermore, in the display device according to the first aspect of the present disclosure that includes the preferable form and configuration as described above, the light shielding member can have a configuration of being disposed in a portion of the optical device on the side opposite to the side on which the image forming device is disposed, and the light shielding member can also have a configuration of being disposed in a dimmer. Note that, in such a configuration, the light shielding member formed of an opaque material may be formed on a plane of the optical device based on, for example, a physical vapor deposition method (PVD method) or a chemical vapor deposition method (CVD method), may be formed using a printing method or the like, or may be bonded to a film, a sheet, or a foil formed of an opaque material (a plastic material, a metallic material, an alloy material, or the like).

Furthermore, the display device according to the first aspect of the present disclosure that includes the preferable forms and configurations as described above preferably has a configuration in which a projection image of an edge of the dimmer on an optical device is included in a projection image of the light shielding member on the optical device.

Furthermore, in the display device according to the first aspect of the present disclosure that includes the preferable forms and configurations described above, the dimmer can be constituted by:

a first substrate facing the optical device and a second substrate facing the first substrate;

electrodes each provided in the first substrate and the second substrate; and a light transmission control material layer sealed between the first substrate and the second substrate, and in this case, the second substrate can be thinner than the first substrate, and furthermore, in this case, the first substrate can also serve as a constituent member of the optical device.

In the display device according to the second aspect of the present disclosure, the second substrate can be configured to be thinner than the first substrate.

In the display device according to the first aspect or the second aspect of the present disclosure that includes the preferable forms and configurations described above, the dimmer can be constituted by a light shutter in which a light transmission control material layer is formed of a liquid crystal material layer, or the dimmer can be constituted by a light shutter in which the light transmission control material layer is formed of an inorganic electro-luminescence material layer. However, the dimmer is not limited thereto, and in addition to that, a light shutter configured by an electrophoretic dispersion liquid that includes a number of charged electrophoretic particles and a dispersion medium having a color different from that of the electrophoretic particles, a light shutter using an electrodeposition scheme (electrodeposition or electric field deposition) to which an electrodeposition and dissociation phenomenon caused by a reversible oxidation-reduction reaction of a metal (for example, silver particles) is applied, a light shutter to which a color change of a material caused by an oxidation-reduction reaction of an electrochromic material is applied, and a light shutter that controls a light transmittance using an electro-wetting phenomenon can also be used.

Here, when the dimmer is configured to be the light shutter in which the light transmission control material layer is formed of a liquid crystal material layer, a material forming the light transmission control material layer is not limited, but a TN (twisted nematic) type liquid crystal material, or an STN (super twisted nematic) type liquid crystal material can be exemplified. In addition, when the dimmer is configured by a light shutter in which the light transmission control material layer is formed of an inorganic electro-luminescence material layer, a material forming the light transmission control material layer is not limited, but tungsten oxide ($WO_3$) can be exemplified.

In the display device according to the first aspect or the second aspect of the present disclosure that includes the preferable forms and configurations described above, it is preferable to dispose the optical device and the dimmer in order from an observer side, but the devices may be disposed in the order of the dimmer and the optical device.

In the display device according to the first aspect or the second aspect of the present disclosure, as a specific material constituting the first substrate and the second substrate, a transparent glass substrate such as soda-lime glass or white plate glass, a plastic substrate, a plastic sheet, or a plastic film can be exemplified. Here, as a plastic, polyethylene terephthalate, polyethylene naphthalate, polycarbonate, a cellulose ester such as acetylcellulose, a fluorinated polymer such as a copolymer of polyvinylidene fluoride or polytetrafluoroethylene and hexafluoropropylene, a polyether such as polyoxymethylene, a polyolefin such as polyacetal, polystyrene, polyethylene, polypropylene, or a methyl pentene polymer, a polyimide such as polyamidimide or polyetherimide, polyamide, polyethersulfone, polyphenylenesulfide, polyvinylidene fluoride, tetra acetyl cellulose, brominated phenoxy, polyarylate, polysulfone, or the like can be exemplified. A plastic sheet or a plastic film may have rigidity that allows the sheet or the film not to easily bend, or may have flexibility. When the first substrate and the second substrate are constituted by transparent plastic substrates, a barrier layer constituted by an inorganic material or an organic material may be formed on an inner face of the substrates.

As a first electrode and a second electrode, a so-called transparent electrode can be exemplified, and to be specific, an indium-tin complex oxide (ITO, Indium Tin Oxide including Sn-doped $In_2O_3$, crystalline ITO, and amorphous ITO), fluorine-doped $SnO_2$ (FTO), IFO (F-doped $In_2O_3$), antimony-doped $SnO_2$ (ATO), $SnO_2$, ZnO (including Al-doped ZnO and B-doped ZnO), an indium-zinc complex oxide (IZO, Indium Zinc Oxide), a spinel-type oxide, an oxide having the structure $YbFe_2O_4$, or a conductive polymer such as polyaniline, polypyrrole, or polythiophene can be exemplified, but it is not limited thereto, and a combination of two or more kinds thereof can also be used. The first electrode and the second electrode can be formed based on a physical vapor deposition method (PVD method) such as a vacuum deposition method or a sputtering method, various kinds of chemical vapor deposition methods (CVD method), or various kinds of coating. Patterning of the electrodes is basically unnecessary, but when patterning is performed according to desire, the patterning can be performed using an arbitrary method such as an etching method, a lift-off method, or a method using various kinds of masking.

The first substrate and the second substrate are sealed and adhere together by a sealant in their outer edges. As the sealant that is also called a sealing agent, various kinds of thermosetting, photo-curable, moisture-curable, and anaerobic-curable resins such as an epoxy resin, a urethane resin, an acrylic resin, a vinyl acetate resin, a thiol-ene-based resin, a silicone-based resin, or a modified polymer resin can be used.

The display device according to the first aspect or the second aspect of the present disclosure that includes various preferable forms and configurations as described above (which may be collectively referred to hereinafter as "the display device and the like of the present disclosure") further includes an illuminance sensor that measures illuminance of an environment in which the display device is placed (which may be referred to as an "environment illuminance measuring sensor" for the sake of convenience) and can control a light transmittance of the dimmer based on a measurement result of the illuminance sensor (environment illuminance measuring sensor).

In addition, the display device and the like of the present disclosure that include the preferable forms described above further include the illuminance sensor that measures illuminance of the environment in which the display device is placed (environment illuminance measuring sensor), and can control luminance of an image formed by an image forming device based on a measurement result of the illuminance sensor (environment illuminance measuring sensor).

Furthermore, the display device and the like of the present disclosure that include the preferable forms described above further include a second illuminance sensor that measures illuminance based on light that has been transmitted by the dimmer from an external environment (which may be referred to as a "transmitted light illuminance measuring sensor" for the sake of convenience), and can control the light transmittance of the dimmer based on a measurement result of the second illuminance sensor (transmitted light illuminance measuring sensor).

Furthermore, the display device and the like of the present disclosure that include the preferable forms described above further include the second illuminance sensor that measures illuminance based on light that has been transmitted by the dimmer from the external environment (transmitted light illuminance measuring sensor), and can control luminance of an image formed by the image forming device based on a measurement result of the second illuminance sensor (transmitted light illuminance measuring sensor).

As described above, if the light transmittance of the dimmer is controlled based on a measurement result of the illuminance sensor (environment illuminance measuring sensor), luminance of an image formed by the image forming device is controlled based on a measurement result of the illuminance sensor (environment illuminance measuring sensor), the light transmittance of the dimmer is controlled based on a measurement result of the second illuminance sensor (transmitted light illuminance measuring sensor), and luminance of an image formed by the image forming device is controlled based on a measurement result of the second illuminance sensor (transmitted light illuminance measuring sensor), not only can a high contrast be given to the image observed by an observer, but also an observation state of the image can be optimized depending on illuminance of a periphery of the environment in which the display device is placed. The illuminance sensor (the environment illuminance measuring sensor or the transmitted light illuminance measuring sensor) can be configured by a known illuminance sensor, and control of the illuminance sensor may be performed based on a known control circuit.

Here, with regard to the display device and the like of the present disclosure that include the second illuminance sensor (transmitted light illuminance measuring sensor), it is desirable for the second illuminance sensor (transmitted light illuminance measuring sensor) to be disposed closer to an observer than the optical device.

The display device and the like of the present disclosure that include the various preferable forms described above can be configured to have a maximum light transmittance of the dimmer of 50% and a minimum light transmittance of the dimmer of 30% or lower. Note that as a lower limit value of the minimum light transmittance of the dimmer, 1% can be exemplified.

In addition, in the display device and the like of the present disclosure that include the various preferable forms and configurations described above, when the measurement result of the illuminance sensor (environment illuminance measuring sensor) is a predetermined value (which may be referred to as a "first illuminance measurement value" for the sake of convenience) or higher, the light transmittance of the dimmer can be configured to be a predetermined value (which may be referred to as a "first light transmittance" for the sake of convenience) or lower. Alternatively, when the measurement result of the illuminance sensor (environment illuminance measuring sensor) is a predetermined value (which may be referred to as a "second illuminance measurement value" for the sake of convenience) or lower, the light transmittance of the dimmer can be configured to be a predetermined value (which may be referred to as a "second light transmittance" for the sake of convenience) or higher. Furthermore, in view of illuminance of the environment illuminance measuring sensor, when the measurement result of the transmitted light illuminance measuring sensor does not reach desired illuminance or when a finer adjustment of illuminance is desired, the light transmittance of the dimmer may be adjusted while a value of the second illuminance sensor (transmitted light illuminance measuring sensor) is monitored. Here, as the first illuminance measurement value, 10 lux can be exemplified, as the first light transmittance, any value from 1% to 30% can be exemplified, as the second illuminance measurement value, 0.01 lux can be exemplified, and as the second light transmittance, any value from 51% to 99% can be exemplified. In addition, when an illuminance measurement value of the environment illuminance measuring sensor is $1\times10^{-3}$ lux or lower, for example, it is preferable that a drive voltage of the dimmer be controlled to shorten a drive time, and the light transmittance of the dimmer be caused to increase as quickly as possible.

Furthermore, in the display device and the like of the present disclosure that include the various preferable forms and configurations described above, light that has penetrated the dimmer can be configured to be colored in a desired color by the dimmer depending on cases. In addition, in this case, the color for the coloring by the dimmer can be configured to be changeable, or the color for the coloring by the dimmer can be configured to be fixed. Note that, in the former case, for example, a dimmer coloring light in red, a dimmer coloring light in green and a dimmer coloring light in blue may be laminated. In addition, in the latter case, a color for the coloring by the dimmer is not limited, and brown can be exemplified.

Furthermore, in the display device and the like of the present disclosure that include the various preferable forms and configurations described above, the dimmer can be disposed in a freely attachable or detachable manner depending on cases. In order to arrange the dimmer in a freely attachable or detachable manner, for example, the dimmer can be attached to a frame using a screw produced from transparent plastic, the frame is cut to form a groove so that the dimmer is engaged with the groove, the dimmer can be attached to the frame by attaching a magnet on the frame, or a slide portion may be provide in the frame so that the dimmer is fit to the slide portion. In addition, a connector is attached to the dimmer so that a control circuit (for example, which is included in a control device for controlling the image forming device) for controlling the light transmittance of the dimmer may be electrically connected to the dimmer via the connector and a wiring.

Furthermore, in the display device and the like of the present disclosure that include the various preferable forms and configurations described above, the optical device can include:

(a) a light guide plate from which incident light is output after the incident light propagates through an inside according to total reflection;

(b) a first deflecting unit configured to deflect the light incident on the light guide plate so that the light incident on the light guide plate is totally reflected inside the light guide plate; and (c) a second deflecting unit configured to deflect the light propagating through the inside of the light guide plate according to the total reflection a plurality of times so that the light propagating through the inside of the light guide plate according to the total reflection is output from the light guide plate.

Note that the term "total reflection" means inner total reflection or total reflection in the inside of the light guide plate. The same applies hereinbelow. In addition, in such a case, the second deflecting unit can be positioned inside a projection image of the dimmer, or the dimmer can be positioned inside a projection image of the second deflecting unit. Furthermore, as described above, the first deflecting unit and the second deflecting unit can be covered by one substrate (the first substrate) constituting the dimmer.

In the display device and the like of the present disclosure that include the various preferable forms and configurations described above, the optical device is of a semi-transmissive type (see-through type). To be specific, a portion of the optical device that at least faces both eyes of an observer is set to be semi-transmissive (see-through), and outside scenery can be viewed through the portion of the optical device. The display device may include one image display device or may include two image display devices.

Here, the first deflecting unit can be configured to reflect light incident on the light guide plate, and the second deflecting unit can be configured to transmit and reflect light propagating through the inside of the light guide plate according to the total reflection a plurality of times. In addition, in this case, the first deflecting unit can be configured to function as a reflecting mirror, and the second deflecting unit can be configured to function as a semi-transmissive mirror.

In this configuration, the first deflecting unit can include a light reflecting film (a type of mirror), which is formed of a metal including, for example, an alloy and reflects light incident on the light guide plate or a diffraction grating (for example, a hologram diffraction grating film) that diffracts the light incident on the light guide plate. In addition, the second deflecting unit can include a multi-layer laminated structure in which a plurality of dielectric laminated films are laminated, a half mirror, a polarization beam splitter, and a hologram diffraction grating film. Although the first or second deflecting unit is disposed inside the light guide plate (embedded inside the light guide plate), parallel light incident on the light guide plate is reflected or diffracted so that the parallel light incident on the light guide plate is totally reflected inside the light guide plate in the first deflecting unit. On the other hand, in the second deflecting unit, the parallel light propagating through the inside of the light guide plate according to the total reflection is reflected or diffracted a plurality of times, and output from the light guide plate in a state of parallel light.

Alternatively, the first deflecting unit can be configured to diffract light incident on the light guide plate, and the second deflecting unit can be configured to diffract light propagating through the inside of the light guide plate according to the total reflection a plurality of times. In addition, in this case, the first deflecting unit and the second deflecting unit can be formed by diffraction grating elements. Furthermore, the diffraction grating element can be formed by a reflective diffraction grating element or a transmissive diffraction grating element, or one diffraction grating element can be formed by the reflective diffraction grating element and the other diffraction grating element can be formed by the transmissive diffraction grating element. Note that a reflective volume hologram diffraction grating can be exemplified as the reflective diffraction grating element. For the sake of convenience, the first deflecting unit formed by the reflective volume hologram diffraction grating may be referred to as a "first diffraction grating member," and the second deflecting unit formed by the reflective volume hologram diffraction grating may be referred to as a "second diffraction grating member."

The image display device in accordance with the present disclosure can perform a single-color (for example, green) image display. When color image display is performed, P diffraction grating layers, each of which is formed by a reflective volume hologram diffraction grating, can be laminated to cause the first diffraction grating member or the second diffraction grating member to cope with diffraction and reflection of P types of light having P types (for example, P=3, that is, three types of red, green, and blue) of different wavelength bands (or wavelengths). Each diffraction grating layer is provided with interference fringes corresponding to one type of wavelength band (or wavelength). Alternatively, to cope with diffraction and reflection of P types of light having P types of different wavelength bands (or wavelengths), P types of interference fringes can be configured to be formed in the first diffraction grating member or the second diffraction grating member formed by one diffraction grating layer. Alternatively, for example, the angle of view can be divided into three equal parts, and the first diffraction grating member or the second diffraction grating member can be configured by laminating diffraction grating layers corresponding to angles of view. Alternatively, for example, a structure in which a first light guide plate, a second light guide plate, and a third light guide plate are laminated with gaps between them may be employed in such a way that a first diffraction grating member and a second diffraction grating member constituted by diffraction grating layers formed of reflective volume hologram diffraction gratings that diffract and reflect light having a wavelength band (or a wavelength) of red are disposed on the first light guide plate, a first diffraction grating member and a second diffraction grating member constituted by diffraction grating layers formed of reflective volume hologram diffraction gratings that diffract and reflect light having a wavelength band (or a wavelength) of green are disposed on the second light guide plate, and a first diffraction grating member and a second diffraction grating member constituted by diffraction grating layers formed of reflective volume hologram diffraction gratings that diffract and reflect light having a wavelength band (or a wavelength) of blue are disposed on the third light guide plate. In addition, by employing the configurations, improvement of diffraction efficiency, an increase of a diffraction acceptable angle, and optimization of a diffraction angle when light having each of the wavelength bands (or the wavelengths) is diffracted and reflected by the first diffraction grating members or the second diffraction grating members can be attained. It is preferable to dispose a protective member in order to prevent the reflective volume hologram diffraction gratings from coming into direct contact with the air.

As a material of the first diffraction grating member and the second diffraction grating member, a photopolymer material can be exemplified. It is only necessary that the constituent material and basic structure of the first diffraction grating member and the second diffraction grating member formed of the reflective volume hologram diffraction gratings be the same as those of the reflective volume hologram diffraction gratings of the related art. The reflective volume hologram diffraction grating refers to a hologram diffraction grating that diffracts and reflects only +1-order diffracted light. Although the diffraction grating member is provided with interference fringes extending from the inner side to the outer side of the diffraction grating member, a method of forming the interference fringes may be the same as adopted in the related art. Specifically, for example, it is only necessary that a member (e.g., a photopolymer material) constituting the diffraction grating member be irradiated with object light in a first predetermined direction on one side, a member constituting the diffraction grating member be simultaneously irradiated with reference light in a second predetermined direction on the other side, and interference fringes formed by the object light and the reference light be recorded in the member constituting the diffraction grating member. By appropriately selecting the first predetermined direction, the second predetermined direction, and wavelengths of the object light and the reference light, a desired pitch of the interference fringes and a desired slant angle (slant angle) of the interference fringes on the surfaces of the diffraction grating member can be obtained. The slant angle of the interference fringes refers to the angle formed between the surfaces of the diffraction grating member (or the diffraction grating layer) and the interference fringes. When the first diffraction grating member and the second diffraction grating member are formed by a laminated structure in which P diffraction grating layers, each of which is formed by a reflective volume hologram diffraction grating, are laminated, it is only necessary to separately manufacture P diffraction grating layers and then laminate (adhere) the P diffraction grating layers, for example, using an ultraviolet curing resin adhesive. In addition, the P diffraction grating layers may be formed by manufacturing one diffraction grating layer using an adhesive photopolymer material, and then adhering layers of the adhesive photopolymer material thereon in order to manufacture diffraction grating layers.

Alternatively, in the image display device in accordance with the present disclosure, the optical device can be formed by a semi-transmissive mirror on which light output from the image forming device is incident and from which the incident light is output toward the pupil of the observer. Note that a structure in which the light output from the image forming device propagates through the air and is incident on the semi-transmissive mirror may be provided. For example, a structure in which the light propagates inside a transparent member such as a glass plate or a plastic plate (specifically, a member formed of the same material as the material constituting the light guide plate to be described later) and incident on a semi-transmissive mirror may be provided. Note that the semi-transmissive mirror may be mounted on the image forming device via the transparent member, and the semi-transmissive mirror may be mounted on the image forming device via a member separate from the transparent member.

In the image display device according to the present disclosure that includes the various preferable forms and configurations described above, the image forming device can have a plurality of pixels arrayed in a two-dimensional matrix shape. Note that such a configuration of the image forming device is called an "image forming device of a first configuration" for the sake of convenience.

As the image forming device of the first configuration, for example, an image forming device constituted by a reflective spatial light modulating device and a light source; an image forming device constituted by a transmissive spatial light modulating device and a light source; and an image forming device constituted by a light emitting element such as an organic EL (Electro Luminescence), an inorganic EL, or a light emitting diode (LED) can be exemplified, but among them, the image forming device constituted by a reflective spatial light modulating device and a light source is preferred. As a spatial light modulating device, a light valve, for example, a transmissive or reflective liquid crystal display device such as an LCOS (Liquid Crystal On Silicon), or a digital micro-mirror device (DMD) can be exemplified, and as a light source, a light emitting element can be exemplified. Furthermore, the reflective spatial light modulating device can be configured to include a liquid crystal display device and a polarization beam splitter that reflects and guides part of light from a light source to the liquid crystal display device and then causes part of the light reflected by the liquid crystal display device to pass therethough and guides the light to an optical system. As the light emitting element constituting the light source, a red light emitting element, a green light emitting element, a blue light emitting element, and a white light emitting element can be exemplified, or white light can obtained by mixing red light, green light, and blue light output from the red light emitting element, the green light emitting element, and the blue light emitting element using a light pipe to perform luminance equalization. As the light emitting element, for example, a semiconductor laser element, a solid-state laser, or an LED can be exemplified. The number of pixels may be decided based on specifications necessary for the image display device, and as a specific value of the number of pixels, 320×240, 432×240, 640×480, 1024×768, 1920×1080, or the like can be exemplified.

Alternatively, with regard to the image display device according to the present disclosure that includes the preferable forms and configurations described above, the image forming device can include a light source and a scanning unit that scans parallel light output from the light source. Note that such a configuration of the image forming device is called an "image forming device of a second configuration" for the sake of convenience.

A light emitting element can be exemplified as a light source in the image forming device of the second configuration, and specifically a red light emitting element, a green light emitting element, a blue light emitting element, and a white light emitting element can be exemplified. Alternatively, white light may be obtained by mixing red, green, and blue light beams output from the red light emitting element, the green light emitting element, and the blue light emitting element using the light pipe and performing luminance equalization. As the light emitting element, for example, there are examples of a semiconductor laser element, a solid-state laser, and an LED. In the imaging forming device of the second configuration, the number of pixels (virtual pixels) may be determined based on specifications necessary for the image display device, and as a specific value of the number of pixels (virtual pixels), there are examples of 320×240, 432×240, 640×480, 1024×768, and 1920×1080. In addition, in case of displaying color images, when the light source includes the red light emitting element, the green light emitting element, and the blue light emitting element, it is preferable to perform color synthesis, for example, using a cross prism. As the scanning unit, for example, a MEMS (Micro Electro Mechanical System), which has a micro mirror rotatable in a 2D direction to horizontally and vertically scan light output from the light source, or a galvano mirror can be included.

In the image forming device of the first configuration and the image forming device of the second configuration, light that has been converted into a plurality of parallel light beams by an optical system (which is an optical system that converts output light into parallel light, and may be referred to as a "parallel light output optical system," and is specifically, for example, a collimated optical system or a relay optical system) is incident on a light guide plate, and the requirement that it be parallel light beams is based on the fact that it is necessary for optical wavefront information obtained when the light is incident on the light guide plate to be saved even after the light is output from the light guide plate via the first deflecting unit and the second deflecting unit. Note that, in order to generate the plurality of parallel light beams, for example, a light output unit of the image forming device may be positioned in, for example, a specific location (position) of a focal length of a parallel light output optical system. The parallel light output optical system has a function of converting position information of a pixel into angle information in an optical system of the optical device. As the parallel light output optical system, an optical system that includes an individual convex lens, concave lens, free curved surface prism, or hologram lens or a combination thereof with positive optical power as a whole can be exemplified. A light shielding unit with an opening portion may be arranged between the parallel light output optical system and the light guide plate to prevent undesired light from being output from the parallel light output optical system and then being incident on the light guide plate.

The light guide plate has two parallel surfaces (first and second surfaces) extending in parallel to an axial line (Y axis) of the light guide plate. When a surface of the light guide plate on which light is incident is an incidence surface of the light guide plate and a surface of the light guide plate from which light is output is an output surface of the light guide plate, both the incidence surface and the output surface of the light guide plate may be defined by the first surface, or the incidence surface of the light guide plate may be defined by the first surface and the output surface of the light guide plate may be defined by the second surface. The light guide plate can be formed of a glass material including optical glass such as quartz glass or BK7, or a plastic material (e.g., PMMA, a polycarbonate resin, an acrylic resin, amorphous polypropylene resin, or a styrene resin including an AS resin). The shape of the light guide plate is not limited to a flat plate, but may be curved.

In the display device according to the present disclosure, the frame can be configured to include a front portion arranged in front of an observer and two temple portions attached to both ends of the front portion via hinges so as to be freely turnable. Note that ear bend portions are respectively attached to tip end portions of the temple portions. The image display device is attached to the frame, and specifically, the image forming device may be attached to, for example, the temple portion. In addition, the front portion and the two temple portions can also be configured to be integrated. In other words, when the entire display device and the like of the present disclosure are viewed, the frame has substantially the same structure as general eyeglasses. A material constituting the frame including pad portions can be configured to be the same material as that constituting general eyeglasses such as a metal, an alloy, a plastic, or a combination thereof. Furthermore, the front portion can be configured to be attached with nose pads. In other words, when the entire display device and the like of the present disclosure is viewed, an assembled object of the frame and the nose pads have substantially the same structure as general eyeglasses except that it has no rims. The nose pads can also have a known configuration and structure.

In addition, from the viewpoint of design or ease of wearing of the device, as for the display device according to the present disclosure, it is preferable that wirings (signal lines, power lines, or the like) from one or two image forming devices be formed to extend from the tip end portion of the ear bend portion to the outside via the temple portion and the inside of the ear bend portion and to be connected to the control device (a control circuit or a control unit). Furthermore, it is preferable to configure such that each image forming device includes a headphone portion, and a wiring for the headphone portion from each image forming device can be configured to extend from the tip end portion of the ear bend portion to the headphone portion via the temple portion and the inside of the ear bend portion. Embodiments of the headphone portion are an inner-ear type of headphone portion and a canal type of headphone portion. More specifically, it is preferable to configure a form in which the wiring for the headphone portion from the tip end portion of the ear bend portion wraps around the rear side of the auricle (auditory capsule) and extends to the headphone portion. In addition, an imaging device can be configured to be attached to a center portion of the front portion. To be specific, the imaging device is constituted by, for example, a solid-state image sensor that includes a CCD or a CMOS and lenses. A wiring of the imaging device may be connected to one image display device (or the image forming device) via, for example, the front portion, and further, may be included in the wiring extending from the image display device (or the image forming device).

A further modified example of the display device and the like of the present disclosure that includes the various forms and configurations described above will be described hereinbelow.

When the display device has two image display devices for the right eye and the left eye attached to the frame, and an observer sees an image of the outer field superimposed on an image such as subtitles displayed in the image display devices, if there is a significant difference between a convergence angle (main light beam crossing angle on a horizontal plane, and the same applies hereinbelow) with respect to an image of the outer field (actual image) and a convergence angle with respect to an image (a virtual image displayed in the image display devices), the observer feels fatigue. In other words, it is necessary to adjust a convergence angle that depends on an observation position of the observer with respect to an observation object such as a stage or a screen.

In addition, there are two kinds of photoreceptor cells in human eyes, cone cells and rod cells, and it is known that the cone cells that can accept information with high resolution are distributed in the fovea with high density, making eyesight best in this position, and on the other hand, eyesight around the retina in which the rod cells are distributed is poorer than the eyesight of the center. For this reason, eyesight with respect to a focused portion is good, but eyesight surrounding the portion is poor. Here, when an image of the outer field is superimposed on an image such as subtitles, if a focused image of the outer field is fairly distant from a display position of an image, the image is difficult to visually recognize, and conversely, when the image is focused, the image of the outer field is difficult to visually recognize. For example, when a position of a performer who speaks his or her lines in a play is superimposed on a display position of subtitles for displaying the lines at a great distance, such a problem occurs.

When a color of an image of the outer field is similar to a display color of an image such as subtitles, or when the image of the outer field is complicated or fine (in other words, when a spatial frequency of the image of the outer field is high), the problem that the image is difficult to visually recognize occurs. A measure to solve this problem is disclosed in, for example, JP 3744984B. However, a performer in a play does not speak his or her lines at all times, and a performer in a movie does not speak his or her lines at all times either. However, if the measure disclosed in the patent publication is applied to subtitle display, subtitles are displayed in an information display device at all times, and the problem of waste of electric power occurs in the information display device.

For this reason, in order to attain optimization of a convergence angle that depends on an observation position of an observer with respect to an observation object, in the display device that includes two image display devices for the right eye and the left eye attached to the frame, by controlling an image signal to the image forming device constituting at least one image display device, the convergence angle may be adjusted depending on the observation position of the observer. Note that such a display device is called a "display device of 1A according to the present disclosure" for the sake of convenience.

In the display device of 1A according to the present disclosure or in a display device of 2A to a display device of 2D according to the present disclosure that will be described below, the convergence angle is adjusted depending on an observation position of an observer, in other words, the convergence angle corresponding to the distance from the display device to an observation object is adjusted, and accordingly, the distance between the observation object and the observer (a spectator) can be made equal to a virtual image distance of an image displayed by the image display devices or can be made as close to equal thereto as possible. For this reason, the observer (spectator) viewing the observation object can naturally view (observe) the image displayed by the image display devices without altering or changing the focus much, and the observer feels little fatigue. In other words, as long as the state is maintained, the distance between the observation object and the observer (spectator) and the virtual image distance of the image displayed by the image display devices can be said to be equal.

In addition, in order to attain optimization of a display position of the display device that depends on an observation position of an observer with respect to an observation object, in the display device that includes the two image display devices for the right and left eyes attached to the frame, by controlling an image signal to the image forming device constituting at least one image display device, a position of the image displayed in the optical device constituting at least one image display device is adjusted depending on the observation position of the observer. Note that such a display device is called a "display device of 1B according to the present disclosure" for the sake of convenience.

In the display device of 1B according to the present disclosure, since the position of the image displayed in the optical device is adjusted depending on the observation position of the observer, when the observer views the image superimposed on the image of the outer field, the focused image of the outer field is not widely separated from the display position of the image and thus the image can be visually recognized with ease.

In addition, in order to obtain a display device that can suppress waste of energy, after a predetermined time elapses from input of an image signal to the image forming device, image formation in the image forming device is stopped. Note that such a display device is called a "display device of 1C according to the present disclosure" for the sake of convenience.

In the display device of 1C according to the present disclosure, after the predetermined time elapses from the input of the image signal to the image forming device, the image formation in the image forming device is stopped. In other words, since the display device transitions to a power save mode, or a stand-by and pause mode after the elapse of the predetermined time, the problem of wasting electric power in the display device does not occur.

Alternatively, in order to attain optimization of the convergence angle that depends on the observation position of the observer with respect to the observation object, in the display device that includes the two image display devices for the right eye and the left eye attached to the frame, each of the image display devices further includes the optical system (parallel light output optical system) that converts light output from the image forming device into parallel light, and at least one of the image display devices (i.e., the image display device for the right eye, the image display device for the left eye, or the two image display devices for the right eye and the left eye, and the same applies hereinbelow) further includes a movement device that moves an optical axis of the image forming device and an optical axis of the optical system relative to a horizontal direction, and the convergence angle is adjusted depending on the observation position of the observer by causing the movement device to move the optical axis of the image forming device and the optical axis of the optical system relative to the horizontal direction. Note that such a display device is called a "display device of 2A according to the present disclosure" for the sake of convenience.

Alternatively, in order to attain optimization of the convergence angle that depends on the observation position of the observer with respect to the observation object, in the display device that includes the two image display devices for the right eye and the left eye attached to the frame, each of the image display devices further includes the optical system (parallel light output optical system) that converts light output from the image forming device into parallel light, and at least one of the image display devices further includes a turning device that turns the image forming device and the optical system, and the convergence angle is adjusted by turning the image forming device and the optical system using the turning device depending on the observation position of the observer and changing an incidence angle of the parallel light output from the optical system and incident on the optical device on the optical device. Note that such a display device is called a "display device of 2B according to the present disclosure" for the sake of convenience.

Alternatively, in order to attain optimization of the convergence angle that depends on the observation position of the observer with respect to the observation object, in the display device that includes the two image display devices for the right eye and the left eye attached to the frame, the optical system constituting at least one of the image display devices includes a liquid lens, and the convergence angle is adjusted through an operation of the liquid lens depending on the observation position of the observer. Note that such a display device is called a "display device of 2C according to the present disclosure" for the sake of convenience.

Alternatively, in order to attain optimization of the convergence angle that depends on the observation position of the observer with respect to the observation object, in the display device that includes the two image display devices for the right eye and the left eye attached to the frame, the optical system constituting at least one of the image display devices includes a liquid prism, and the convergence angle is adjusted through an operation of the liquid prism depending on the observation position of the observer. Note that such a display device is called a "display device of 2D according to the present disclosure" for the sake of convenience.

In the display device of 1A or the display device of 1B according to the present disclosure, by controlling an image signal to the image forming device constituting at least one of the image display devices, it is possible to achieve a rightward or leftward movement, an upward or downward movement, and an arbitrary combination of rotation movements of an image displayed in the optical device constituting at least one of the image display devices. For such movements of the image, for example, a non-display region may be secured in the optical device so that the portion is allocated for the movements of the image.

In addition, in the display device of 2A to the display device of 2D according to the present disclosure, by controlling an image signal to the image forming device constituting at least one of the image display devices, the convergence angle can be further adjusted. Here, by controlling the image signal to the image forming device constituting at least one of the image display devices, a rightward or leftward movement, an upward or downward movement, and an arbitrary combination of rotation movements of an image displayed in the optical device constituting at least one of the image display devices can be achieved. For such movements of the image, for example, a non-display region may be secured in the optical device so that the portion is allocated for the movements of the image. As described above, when mutual optical positions of the two image display devices are adjusted by controlling a position of the image displayed in the optical device constituting at least one of the image display devices, specifically, the position of the image displayed in the optical device constituting at least one of the image display devices may be controlled so that images displayed by the image display device for the left eye and the image display device for the right eye coincide with each other in a desired virtual image distance or a virtual image position. To be more specific, a display position correction signal may be added to the original image signal so that the images displayed by the image display device for the left eye and the image display device for the right eye coincide with each other in the desired virtual image distance or virtual image position when the observer wears the display device. In addition, the display position correction signal may be stored in the display device (specifically, the control device included in the display device). By employing such a configuration, the position of the image displayed in the optical device can be adjusted depending on the observation position of the observer, and when the observer views the image superimposed on the image of the outer field, the observer can visually recognize the image more easily without wide separation of the display position of the image from that of the focused image of the outer field.

In addition, in the display device of 1A or the display device of 1B according to the present disclosure that includes the preferable forms described above, information relating to the observation position of the observer (hereinafter referred to as "observation position information of an observer") can be transmitted to the display device from outside in addition to the image signal to the image forming device, or a position measurement unit that measures an observation position of an observer can also be further included.

In addition, in the display device of 2A to the display device of 2D according to the present disclosure that includes the preferable forms described above, the observation position information of an observer can be given to the display device in advance in addition to the image signal to the image forming device. Alternatively, the observation position information of the observer can be configured to be transmitted to the display device from outside, or the position measurement unit that measures an observation position of an observer can also be further included.

Here, in the configuration of the observation position information of the observer transmitted to the display device from outside, the observation position information of the observer may be transmitted to the display device (specifically, the control device included in the display device) in a wireless manner. In the configuration in which the position measurement unit that measures the observation position of the observer is further included, as the position measurement unit, specifically, a camera or an imaging device with an autofocus function (for example, a camera or an imaging device having an active type distance measuring device that radiates infrared light, ultrasonic waves, or the like to an observation object to detect a distance based on a time taken until the reflected waves return or a radiation angle, or a passive type distance measuring device), or a distance measuring device for a camera with an autofocus function (active type distance measuring device) can be exemplified. Alternatively, the distance from the display device to the observation object may be manually set by providing a button or a switch in the display device. Alternatively, a configuration in which the observation position information of the observer is set in the display device in advance can also be employed. Alternatively, the observation position information of the observer may be given to the display device from a personal computer, or for example, seat information or theater information (hall information, theater information, or the like and the same applies hereinbelow) in the form of barcodes printed on a ticket, or seat information or theater information included in ticket information displayed on a mobile telephone may be read using an appropriate measure or method and then observation position information of an observer based on the seat information or theater information may be given to the display device using an appropriate measure.

In the display device of 1C according to the present disclosure, in order to stop image formation of the image forming device, in other words, in order to perform transition to the power save mode or the stand-by and pause mode (the modes may be collectively referred to hereinafter as "a power save mode and the like") in the display device, a signal indicating an image display time in the image display device or a signal instructing stop of image formation in the image forming device may be added to, for example, an image signal. As a predetermined time, for example, a time taken for a general person to read subtitles displayed in the image forming device or a subtitle display time decided in advance according to lengths of lines can be exemplified.

Furthermore, in the display device of 2A to the display device of 2D according to the present disclosure that includes the preferable forms described above, image formation in the image forming device can also be configured to be stopped after a predetermined time elapses from input of an image signal to the image forming device. Then, since the transition to the power save mode or the stand-by and pause mode can be accordingly performed in the display device after the elapse of the predetermined time, the problem of waste of electric power and energy does not occur in the display device.

Furthermore, in the display device of 1A to the display device of 1C and the display device of 2A to the display device of 2D according to the present disclosure that includes the various preferable forms described above, a luminance signal of the image to be displayed in the optical device can be transmitted to the display device from outside in addition to the image signal to the image forming device. In such a configuration, the luminance signal may be transmitted to the display device from outside in a wireless manner.

In the display device of 1A to the display device of 1C according to the present disclosure and the display device of 2A to the display device of 2D according to the present disclosure that includes the various preferable forms described above, the image displayed in the optical device based on the image signal includes characters. Here, the image signal for displaying characters as the image (which may be referred to as "character data") is digitalized data and may be created in advance by an operator or based on a process performed by a computer or the like. A format of the character data may be appropriately selected depending on the display device or a system to be used, and for example can be set as text data that includes a string of characters, or can be set as image data in which a string of characters is made into an image.

In the display device of 1A to the display device of 1C according to the present disclosure and the display device of 2A to the display device of 2D according to the present disclosure, in order to reduce eye fatigue of the observer caused by continuous viewing of the image displayed in a fixed position (for example, subtitles or virtual images), a position of an image (image position) formed by two optical devices or the distance (image distance) from the two optical devices to an image (for example, subtitles or a virtual image) formed by the two optical devices can be configured to be changed over time. Here, a change over time means that, for example, a position of an image in the horizontal direction is changed by, for example, + two pixels or − one pixel in the image forming device for, for example, one minute to three minutes, for example, once every five to ten minutes, and then returns to the original position.

In the display device of 1A or the display device of 1B according to the present disclosure, a display position correction signal may be added to the original image signal so that images displayed by the image display device for the left eye and the image display device for the right eye coincide with each other in a desired virtual image distance or virtual image position when the observer wears the display device. In addition, the display position correction signal may be stored in the display device (specifically, the control device included in the display device), or an image signal obtained by adding the display position correction signal to the original image signal may be transmitted to the display device. In addition, in the display device of 1A to the display device of 1C and the display device of 2A to the display device of 2D according to the present disclosure that includes the various preferable forms described above, the image signal can be configured to be transmitted to the display device in a wireless manner. Here, in such a configuration, the image signal is accepted by, for example, the control device to cause the control device to perform a process for image display. Alternatively, the image signal can be configured to be stored in the display device (control device), and in this case, the display position correction signal may be transmitted to the display device. In addition, the position of the image displayed in the optical device constituting at least one of the image display devices is controlled and accordingly mutual optical positions of the two image display devices are adjusted, and to be specific, the position of the image displayed in the optical device constituting at least one of the image display devices may be controlled so that the images displayed by the image display device for the left eye and by the image display device for the right eye coincide with each other in a desired virtual image distance or a virtual image position. The control device (a control circuit or a control unit) can be configured by a known circuit.

The display device of 1A to the display device of 1C according to the present disclosure and the display device of 2A to the display device of 2D according to the present disclosure that includes the various preferable forms and configurations described above can be configured such that the control device included in the display device has a storage unit, the storage unit stores a data group constituted by a plurality of image signals (for example, character data)

for displaying an image, a data identification code is given to each of the image signals constituting the data group, and a designation identification code and display time information are transmitted to the control device from outside at a predetermined time interval, and in the control device, an image signal of which the data identification code coincides with the transmitted designation identification code is read from the storage unit and an image based on the image signal is displayed in the display device for the time corresponding to the transmitted display time information. Note that the "time corresponding to the display time information" may be set as a "predetermined time" in the display device of 1C according to the present disclosure. The configuration may be referred to as a "display device of 3A according to the present disclosure" for the sake of convenience.

In the display device of 3A according to the present disclosure described above, the designation identification code and the display time information are transmitted from outside to the control device at a predetermined time interval, and in the control device, the image signal of which the data identification code coincides with the transmitted designation identification code is read from the storage unit and the image is displayed in the image forming device based on the image signal for the time corresponding to the transmitted display time information. Thus, even when the control device fails to receive the transmitted designation identification code and/or the display time information from outside for any reason, reception of the designation identification code and the display time information can be attempted again or repeatedly, and thus the designation identification code and the display time information can be reliably received. As a result, even when the designation identification code and the display time information are received by a plurality of display devices, for example, the plurality of display devices can reliably display the same image at the same time, and the problem of the display devices being unable to display an image can be reliably avoided.

Alternatively, the display device of 1A to the display device of 1C according to the present disclosure and the display device of 2A to the display device of 2D according to the present disclosure that includes the various preferable forms and configurations described above can be configured such that the control device included in the display device has the storage unit, the storage unit stores a data group constituted by the plurality of image signals (for example, character data) for displaying an image, a data identification code is given to each of the image signals constituting the data group, each of the image signals is constituted by a plurality of pieces of different size display data, the pieces of data having different display sizes, and a designation identification code is transmitted to the control device from outside, and in the control device, one piece of different size display data out of the plurality of pieces of different size display data among the image signals of which the data identification code coincides with the transmitted designation identification code is read from the storage unit depending on the distance between the observation object and the display device, and an image is displayed in the display device based on the one piece of different-sized display data. Note that the configuration may be referred to as a "display device of 3B according to the present disclosure" for the sake of convenience.

In the display device of 3B according to the present disclosure described above, in the control device, the one piece of different size display data out of the plurality of pieces of different size display data among the image signals of which the data identification code coincides with the transmitted designation identification code is read from the storage unit depending on the distance between the observation object and the display device, the image is displayed in the image forming device based on the one piece of different-sized display data, and thus a disparity between the size of the viewed observation object and the size of the image is rarely found.

Alternatively, the display device of 1A to the display device of 1C according to the present disclosure and the display device of 2A to the display device of 2D according to the present disclosure that includes the various preferable forms and configurations described above can be configured such that the control device included in the display device has the storage unit, the storage unit stores a data group constituted by the plurality of image signals (for example, character data) for displaying an image, a data identification code is given to each of the image signals constituting the data group, each of the image signals is constituted by a plurality of pieces of different language display data, the pieces of data having different display languages, and a designation identification code is transmitted to the control device from outside, and in the control device, one piece of different language display data out of the plurality of pieces of different language display data among the image signals of which the data identification code coincides with the transmitted designation identification code is read from the storage unit, and an image is displayed in the display device based on the one piece of different language display data. Note that the configuration may be referred to as a "display device of 3C according to the present disclosure" for the sake of convenience. As a method of selecting a language as a display language, for example, a method of manually selecting a language as a display language by providing a button or a switch in the control device can be exemplified.

In the display device of 3C according to the present disclosure as described above, in the control device, the one piece of different language display data out of the plurality of pieces of different language display data among the image signals of which the data identification code coincides with the transmitted designation identification code is read from the storage unit, the image is displayed in the image forming device based on the one piece of different language display data, and thus image display can be easily performed using the language used by the observer (spectator).

Alternatively, the display device of 1A to the display device of 1C according to the present disclosure and the display device of 2A to the display device of 2D according to the present disclosure that includes the various preferable forms and configurations described above can be configured such that the control device included in the display device has the storage unit, the storage unit stores a data group constituted by the plurality of image signals (for example, character data) for displaying an image, a data identification code is given to each of the image signals constituting the data group, and a designation identification code is transmitted to the control device from outside, and in the control device, an image signal of which the data identification code coincides with the transmitted designation identification code is read from the storage unit, and by performing a data process depending on the distance between the observation object and the display device, an image based on the image signal (data-processed image signal) is displayed in the display device in a state in which, for example, the convergence angle is controlled. Note that the configuration may be referred to as a "display device of 3D according to the present disclosure" for the sake of convenience. Here, based on the distance from the display device to the observation object, an image process may be performed on the image signals to the image forming device constituting at least one of the image display devices.

In the display device of 3D according to the present disclosure as described above, the convergence angle corresponding to the distance from the display device to the observation object is adjusted, and accordingly, the distance between the observation object and the observer (spectator) and the virtual image distance of the image displayed by the image display devices can be made equal, or as close to equal as possible, and thus the observer (spectator) who views the observation object can naturally view (observe) the image displayed by the image display devices without altering or changing the focus much.

In the display device of 2A to the display device of 2D according to the present disclosure that includes the various preferable forms and configurations described above, a size of a display screen (image display region) displayed in the optical device, an angle of view of the display screen (image display region), and resolution of the display screen may be changed according to the observation position of the observer or the distance between the observation object and the display device. Note that such a configuration may be referred to as a "display device of 2E according to the present disclosure" for the sake of convenience.

Note that the display device of 2A to the display device of 2E according to the present disclosure can be appropriately combined. In addition, the display device of 3A to the display device of 3D according to the present disclosure can also be appropriately combined. In the display device of 2A to the display device of 2E according to the present disclosure and the display device of 3A to the display device of 3D according to the present disclosure, the control device itself may be configured by a known circuit, and the storage unit itself may also be configured by a known storage unit, for example, a memory card. In addition, a transmission device can be configured to transmit the designation identification code and the display time information in a wireless manner, the transmission device further includes a display device, and the display device can be configured to display the designation identification code, the data group, and a total display time of each of the image signals or each piece of the display data. However, the configuration is not limited thereto and a wired manner is possible. The transmission device itself for transmitting the designation identification code to the control device may be realized by a known transmission device, and the display device included in the transmission device may also be realized by a known display device.

According to the observation position of the observer, the movement device is operated in the display device of 2A according to the present disclosure, the turning device is operated in the display device of 2B according to the present disclosure, the liquid lens is operated in the display device of 2C according to the present disclosure, the liquid prism is operated in the display device of 2D according to the present disclosure, and the operations are controlled using a control signal from the control device based on the observation position information of the observer.

In the display device of 2A according to the present disclosure, the optical axis of the image forming device and the optical axis of the optical system are relatively moved in the horizontal direction (X axis direction) by the movement device, and to be specific, a configuration in which, while the positional relationship of the optical axis of the image forming device and the optical axis of the optical system of one image display device is fixed, the positions of the optical axis of the image forming device and the optical axis of the optical system of the other image display device are relatively moved in the horizontal direction (X axis direction) can be exemplified. Alternatively, a configuration in which the positions of the optical axis of the image forming device and the optical axis of the optical system in each of the image display devices are relatively moved in the horizontal direction (X axis direction) can be exemplified. In such a configuration, a change occurs in an incidence angle of parallel light on the optical device which is output from the optical system and incident on the optical device (which is an angle formed by a central incident light beam that will be described later and a Y-Z plane and referred to as a "Y-Z plane incidence angle" hereinbelow). In addition, in such a configuration, a scheme in which any one of the image forming device and the optical system is placed in a movement guide portion constituted by, for example, a rack gear portion, and then the one of the image forming device and the optical system is moved on the movement guide portion using a motor and a pinion gear may be employed, or a scheme in which any one of the image forming device and the optical system is placed in the movement guide portion and then the one of the image forming device and the optical system is moved on the movement guide portion using a piezoelectric element and an ultrasonic motor may be employed.

In the display device of 2B according to the present disclosure, the image forming device and the optical system are turned by the turning device, and to be specific, while the positional relationship of the optical axis of the image forming device and the optical axis of the optical system in each of the two image display devices is fixed, at least one of the image display devices may be turned using the Z axis as a turning axis by operating the piezoelectric element, the motor, and the ultrasonic motor. In such a configuration, a change occurs in the Y-Z plane incidence angle of the parallel light with respect to the optical device, the parallel light being output from the optical system and incident on the optical device.

In the display device of 2C according to the present disclosure, the liquid lens is operated, and the liquid lens constituting the optical system may be configured by a known liquid lens that uses an electro-wetting phenomenon. With the operation of the liquid lens, the optical axis of the optical system can be moved in the horizontal direction (X axis direction) while the relationship of the optical axis of the optical system and the Y axis is constantly maintained, or an angle of the optical axis of the optical system with respect to the Y-Z plane can be changed. In such a configuration, a change occurs in the Y-Z plane incidence angle of the parallel light with respect to the optical device, the parallel light being output from the optical system and incident on the optical device.

In the display device of 2D according to the present disclosure, the liquid prism is operated, and the liquid prism constituting a part of the optical system may be configured by a known liquid prism that uses the electro-wetting phenomenon. With the operation of the liquid prism, an angle of the optical axis of the optical system with respect to the Y-Z plane can be changed. In such a configuration, a change occurs in the Y-Z plane incidence angle of the parallel light with respect to the optical device, the parallel light being output from the optical system and incident on the optical device.

Here, the number of data groups is basically arbitrary, and the number of image signals (for example, character data) constituting the data groups and the number of pieces of display data constituting the image signals (character data) are also basically arbitrary. As a data structure of the image signal or the display data, for example, text data constituted by a string of characters is possible or image data in which a string of characters is made into an image is possible. As display data having different display sizes, text data constituted by strings of characters with different font sizes is possible or image data in which strings of characters with different font sizes are made into images is possible. A display language of the display data is basically arbitrary. By performing a predetermined signal process on the image signals or display data, an image signal can be obtained.

Any code can be used for the designation identification code and the data identification code as long as it can identify image signals, and for example, numbers, letters, and a combination of numbers and letters can be exemplified.

The designation identification code and the display time information are transmitted from outside to the control device at a predetermined time interval, and here, if a total display time is set to $T_{total}$, the display time information is set to $T_{Inf}$, and the predetermined time interval is set to $T_{int}$, the following expression is established.

$$T_{Inf}(m)=T_{total}-(m-1) \times T_{int}$$

Note that "m" is a positive integer indicating the number of times that the designation identification code and the display time information are transmitted from outside to the control device. For example, if the following is set:

$$T_{total}=10.0 \text{ seconds, and}$$

$$T_{int}=0.1 \text{ seconds}$$

the display time information $T_{Inf}(m)$ when the designation identification code and the display time information are transmitted from outside to the control device in a first time (m=1) is:

$$T_{Inf}(1)=10.0 \text{ seconds.}$$

In addition, pieces of the display time information $T_{Inf}(m)$ when the designation identification code and the display time information are transmitted from outside to the control device in a second time (m=2) and an eleventh time (m=11) are:

$$T_{Inf}(2)=9.9 \text{ seconds; and}$$

$$T_{Inf}(11)=9.0 \text{ seconds.}$$

In addition, for the time corresponding to the display time information $T_{Inf}(m)$, an image is displayed in the image forming device based on an image signal or one pieces of display data.

Here, even when the same designation identification code and different pieces of display time information are transmitted to the control device after the image starts to be displayed in the image forming device once, the control device may cause the image to be continuously displayed, ignoring the designation identification code and display time information. For such an operation, one kind of flag (reception completion flag) may be set in the control device. On the other hand, when the control device fails to receive the designation identification code and/or the display time information from outside from the first time to an $(m'-1)^{th}$ time for any reason, and the control device succeeds in receiving the designation identification code and/or the display time information from outside in an $m'^{th}$ time for the first time, an image may be displayed in the image forming device based on an image signal or one piece of display data for a time of:

$$T_{Inf}(m')=T_{total}-(m'-1) \times T_{int}$$

An instruction of transmission of the designation identification code and display time information of the first time (m=1) may be given by, for example, an operator, or may be performed based on control of a computer or the like, or performed based on a change in a movement of an observation object, a change in the voice of a performer that is an observation object, a change in an environment occupied by an observation object (for example, a change in luminance or a sound), or the like.

A light beam that is output from the center of the image forming device and passes through a node on the image forming device side of the optical system is called a "center light beam," and one that is perpendicularly incident on the optical device among the center light beams is called a "center incident light beam." In addition, a point of the optical device on which the center incident light beam is incident is set as an optical device center point, an axial line that passes through the optical device center point and is parallel to an axial line direction of the optical device is set as an X axis, and an axial line that passes through the optical device center point and coincides with the normal line of the optical device is set as a Y axis. A horizontal direction with regard to the display device and the like of the present disclosure is the direction parallel to the X axis and may be referred to as an "X axis direction" hereinbelow. Here, the optical system is disposed between the image forming device and the optical device, and converts light output from the image forming device into parallel light. In addition, a light flux converted into parallel light by the optical system is incident on and guided in the optical device and then output. In addition, a center point of the first deflecting unit is set as an "optical device center point."

In the display device of 1A to the display device of 1C and the display device of 2A to the display device of 2D according to the present disclosure, although not being limited in the image display devices, the center incident light beam can be configured to intersect with the X-Y plane at an angle (θ) other than 0 degrees, and accordingly, there is little restriction on an attachment angle of the image display devices when the image display devices are attached to attachment portions of an eyeglass-shaped frame, and thus a high degree of freedom in design can be obtained. In addition, in such a case, the center incident light beam preferably has a configuration of being included in the Y-Z plane in the viewpoint of treatment, setting, and ease of attachment of the image display devices. In addition, the optical axis of the optical system is configured to be included in the Y-Z plane and to intersect with the X-Y plane at an angle other than 0 degrees, or the optical axis of the optical system can be configured to be parallel with the Y-Z plane and with the X-Y plane, and to pass through a position deviated from the center of the image forming device. In addition, when the X-Y plane is assumed to coincide with a horizontal plane, the angle θ at which the center incident light beam intersects with the X-Y plane can be configured as an elevation angle. In other words, the center incident light beam can be configured to face the X-Y plane from a lower side of the X-Y plane and collide with the X-Y plane. In addition, in this case, the X-Y plane preferably intersects with a perpendicular plane at an angle other than 0 degrees, and the X-Y plane preferably intersects with the perpendicular plane at an angle θ'. Note that there is no limitation on a maximum value of the angle θ', and 5 degrees can be exemplified. Here, the horizontal plane is a plane that includes a line of sight of an observer when he or she views an object positioned in the horizontal direction (for example, an object at an infinite distance in the horizontal direction such as the horizon or the sea horizon) ("a line of sight of an observer in the horizontal direction") and includes two pupils of the observer, which are positioned horizontally. In addition, the perpendicular plane is a plane perpendicular to the horizontal plane. Alternatively, when the observer views an object positioned in the horizontal direction (for example, an object at an infinite distance in the horizontal direction such as the horizon or the sea horizon), a center incident light beam output from the optical device and incident on the pupils of the observer can be configured to form a depression angle. As the depression angle with respect to the horizontal plane, for example, 5 degrees to 45 degrees can be exemplified.

The display device and the like according to the present disclosure that includes the various modified examples described above can be used in, for example, display of moving images and still images; display of subtitles of movies and the like; display of descriptive text and closed captions with regard to videos synchronized therewith; and display of various kinds of descriptions and descriptive text for describing the content, the progress, the background of observation objects with regard to a play, kabuki, Noh, kyogen, an opera, a concert, a ballet, various performances, a recreational park (amusement park), an art museum, a tourist attraction, a resort, a tour guide, and the like, and can be used in display of various kinds of descriptions, symbols, signs, impressions, marks, patterns, and the like during driving, operation, maintenance, disassembly, and the like of an observation object of various devices; display of various kinds of descriptions, symbols, signs, impressions, marks, patterns, and the like of an observation object such as a person or an article; and display of closed captions functioning as a text display device. With regard to a play, kabuki, Noh, kyogen, an opera, a concert, a ballet, various performances, a recreational park (amusement park), an art museum, a tourist attraction, a resort, a tour guide, and the like, text as an image relating to the observation object may be displayed in the display device at a proper timing. To be specific, for example, an image signal is transmitted to the display device or a designation identification code is transmitted to the control device through an operation of an operator or under control of a computer or the like based on a predetermined schedule and time distribution according to the progress of a movie or the like or the progress of a play or the like, and thereby an image is displayed by the display device. In addition, when display of various kinds of descriptions with regard to various devices or an observation object such as a person or an article is performed, by installing an imaging device in the display device, photographing the various devices or the observation garget such as a person or an article using the imaging device and then analyzing the photographed content in the display device, various kinds of descriptions with regard to the various devices and the observation object such as a person or an article created in advance can be displayed by the display device. Alternatively, the display device and the like of the present disclosure can also be used as a stereoscopic display device. In such a case, a polarization plate or a polarization film may be attached to the optical device so as to be freely attachable or detachable or a polarization plate or a polarization film may be pasted with the optical device.

An image signal to the image forming device can include not only an image signal (for example, character data) as described above but also, for example, luminance data (luminance information), chromaticity data (chromaticity information), or luminance data and chromaticity data with regard to an image to be displayed. The luminance data can be set to luminance data corresponding to luminance of a predetermined region including an observation object viewed through the optical device, and the chromaticity data can be set to chromaticity data corresponding to chromaticity of a predetermined region including an observation object viewed through the optical device. As described above, luminance (brightness) of the image to be displayed can be controlled by including luminance data of an image, chromaticity (color) of the image to be displayed can be controlled by including chromaticity data of an image, and luminance (brightness) and chromaticity (color) of the image to be displayed can be controlled by including luminance data and chromaticity data of an image. When luminance data is set corresponding to luminance of a predetermined region including an observation object viewed through the image display devices, as a value of the luminance of the predetermined region including the observation object viewed through the image display devices increases, a value of luminance data may be set so that a value of luminance of an image increases (in other words, the image is displayed more brightly). In addition, when chromaticity is set corresponding to chromaticity of a predetermined region including an observation object viewed through the image display devices, a value of chromaticity may be set so that the chromaticity of the predetermined region including the observation object viewed through the image display devices and chromaticity of an image to be displayed are substantially in the relationship of complementary colors. Complementary colors refer to combinations of colors in the relationship in which the colors lie in opposite positions on the color wheel (color circle). These include complementary color pairs of red and green, yellow and purple, blue and orange, and the like. They also refer to colors that cause a decrease in color saturation when mixed with each other color in the right proportions to create white in the case of light or black in the case of an object, and complementariness of a visual effect when complementary colors are arranged side by side is different from that when the colors are mixed. They are also referred to as complementary colors, contrasting colors, or opposite colors. However, whereas an opposite color directly refers to a color facing a complementary color, a range that a complementary color deals with is slightly wider. A combination of complementary colors has a synergetic effect of causing both colors to stand out, which is called complementary color harmony.

Embodiment 1

Figure 2:
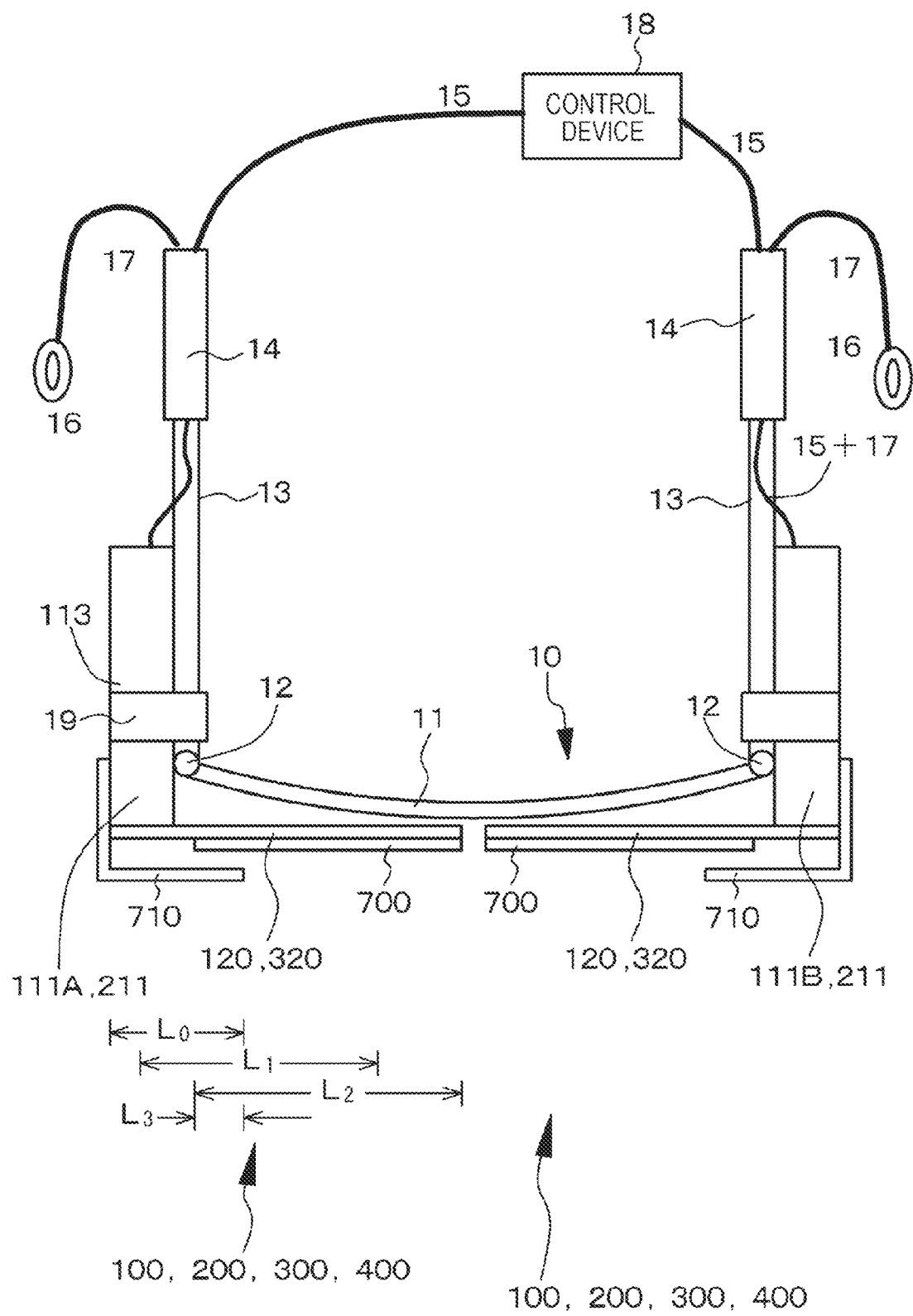
FIG. 2 is a schematic diagram of the display device of Embodiment 1 as viewed from above.

Embodiment 1 relates to a display device according to a first aspect of the present disclosure. FIG. 1 shows a conceptual diagram of an image display device of Embodiment 1, FIG. 2 shows a schematic diagram of the display device of Embodiment 1 (specifically, a head mounted type display device or HMD) as viewed from above, FIG. 3A shows a schematic diagram thereof as viewed from a side, FIG. 3B is a schematic diagram of the portion of an optical device and a dimmer as viewed from a front side, and FIGS. 4A and 4B show schematic cross-sectional diagrams of the dimmer schematically showing an operation of the dimmer in the display device of Embodiment 1. Note that, in FIG. 3A, a light shielding member is indicated by dashed lines.

The display device of Embodiment 1 or Embodiment 2 to Embodiment 11 that will be described below includes:

(a) an eyeglass-shaped frame 10 mounted on the head of an observer (for example, a spectator); and (b) an image display device 100, 200, 300, 400, or 500 attached to the frame 10. Note that the display devices of Embodiment 1 or Embodiment 2 to Embodiment 11 to be described later are specifically set to be a binocular type having two image display devices, but may be a monocular type having one. In addition, an image forming device 111 or 211 displays, for example, monochromic images.

In addition, the image display devices 100, 200, 300, 400, or 500 of Embodiment 1 or Embodiment 2 to Embodiment 11 that will be described below each have:

(A) an image forming device 111 or 211; and (B) an optical device 120, 320, or 520 on which light output from the image forming device 111 or 211 is incident, in which the light is guided, and from which the light is output. The image display devices each further have:

(C) an optical system (parallel light output optical system) 112 or 254 that converts light output from the image forming device 111 or 211 into parallel light, and a light flux converted into parallel light by the optical system 112 or 254 is incident on the optical device 120, 320, or 520, guided, and output.

In addition, in Embodiment 1 or Embodiment 2 to Embodiment 11 that will be described below, a dimmer 700 that adjusts an amount of external light incident from outside is disposed on the side opposite to the side on which the image forming device 111 or 211 of the optical devices 120, 320, or 520 is disposed. To be specific, the dimmer 700 that is a kind of light shutter is fixed to the optical device 120, 320, or 520 (specifically, a protective member (protective plate) 126 or 326 that protects the light guide plate 121 or 321 or a semi-transmissive mirror 520) using an adhesive 707. In addition, the dimmer 700 is arranged in the regions of the optical device 120, 320, or 520 on the side opposite to an observer. The protective member (protective plate) 126 or 326 is adhered to a second face 123 or 323 of the light guide plate 121 or 321 by an adhesive member 127 or 327.

In Embodiment 1 or any one of Embodiments 2 to 8 and Embodiments 10 and 11 to be described later, the optical device 120 or 320 includes:

(a) a light guide plate 121 or 321 from which incident light is output after the incident light propagates through an inside according to total reflection, (b) a first deflecting unit 130 or 330, which deflects light incident on the light guide plate 121 or 321 so that the light incident on the light guide plate 121 or 321 is totally reflected inside the light guide plate 121 or 321, and (c) a second deflecting unit 140 or 340, which deflects light propagating through the inside of the light guide plate 121 or 321 according to the total reflection a plurality of times so that the light propagating through the inside of the light guide plate 121 or 321 according to the total reflection is output from the light guide plate 121 or 321. In addition, the second deflecting unit 140 or 340 is positioned within a projection image of the dimmer 700. Furthermore, the first deflecting unit 130 or 330 and the second deflecting unit 140 or 340 are covered by one side of a substrate (a first substrate 701) constituting the dimmer 700. The optical devices 120 and 320 are a see-through type (semi-transmissive type).

In Embodiment 1, the first deflecting unit 130 and the second deflecting unit 140 are disposed inside the light guide plate 121. The first deflecting unit 130 reflects light incident on the light guide plate 121, and the second deflecting unit 140 transmits and reflects light propagating through the inside of the light guide plate 121 according to total reflection a plurality of times. That is, the first deflecting unit 130 functions as a reflecting mirror, and the second deflecting unit 140 functions as a semi-transmissive mirror. More specifically, the first deflecting unit 130 provided inside the light guide plate 121 includes a light reflecting film (a type of mirror) formed of aluminum (Al), which reflects light incident on the light guide plate 121. On the other hand, the second deflecting unit 140 provided inside the light guide plate 121 is formed by a multilayer laminated structure in which a plurality of dielectric laminated films are laminated. The dielectric laminated film is formed by, for example, a $TiO_2$ film as a high-dielectric-constant material and a $SiO_2$ film as a low-dielectric-constant material. A multilayer laminated structure in which a plurality of dielectric laminated films are laminated is disclosed in JP 2005-521099A. Although a six-layer dielectric laminated film is illustrated in the drawing, the present disclosure is not limited thereto. A thin section formed of the same material as the material constituting the light guide plate 121 is sandwiched between dielectric laminated films. In the first deflecting unit 130, the parallel light incident on the light guide plate 121 is reflected (or diffracted) so that the parallel light incident on the light guide plate 121 is totally reflected inside the light guide plate 121. On the other hand, in the second deflecting unit 140, the parallel light propagating through the inside of the light guide plate 121 according to total reflection is reflected (or diffracted) a plurality of times, and output toward the pupil 21 of the observer in a state of parallel light from the light guide plate 121.

For the first deflecting unit 130, it is only necessary that a slant surface on which the first deflecting unit 130 is to be formed on the light guide plate 121 be provided by cutting out a portion 124 on which the first deflecting unit 130 of the light guide plate 121 is provided, and the cut-out portion 124 of the light guide plate 121 be adhered to the first deflecting unit 130 after a light reflecting film is vacuum evaporated on the slant surface. In addition, for the second deflecting unit 140, it is only necessary that a multilayer laminated structure in which a plurality of membranes of the same material (e.g., glass) as the material constituting the light guide plate 121 and a plurality of dielectric laminated films (for example, formable by vacuum evaporation) are laminated be manufactured, a slant surface be formed by cutting out a portion 125 on which the second deflecting unit 140 of the light guide plate 121 is provided, the multilayer laminated structure be adhered to the slant surface, and the external form be arranged by polishing or the like. Thereby, the optical device 120 having the first deflecting unit 130 and the second deflecting unit 140 provided inside the light guide plate 121 can be obtained.

Here, in Embodiment 1 or Embodiments 2 to 8 and Embodiments 10 and 11 to be described later, the light guide plate 121 or 321 formed of an optical glass or a plastic material has two parallel faces (a first face 122 or 322 and a second face 123 or 323) extending in parallel with the light propagating direction (X axis) according to total reflection inside the light plate guide 121 or 321. The first face 122 or 322 and the second face 123 or 323 face each other. In addition, parallel light is incident on the first face 122 or 322 corresponding to a light incidence face, propagates through the inside according to total reflection, and is then output from the first face 122 or 322 corresponding to a light output face. However, the present disclosure is not limited thereto, and the second face 123 or 323 may configure a light incidence face and the first face 122 or 322 may configure a light output face.

In Embodiment 1 or 7 to be described later, the image forming device 111 is the first embodiment of an image forming device, which has a plurality of pixels arranged in a 2D matrix. Specifically, the image forming device 111 includes a reflective spatial light modulating device 150 and a light source 153 formed by LEDs that emits white light. Each entire image forming device 111 is fitted inside a housing 113 (denoted by a dashed-dotted line in FIG. 1), and an opening portion (not illustrated) is provided in the housing 113, and light is output from the optical system (the parallel light output optical system or collimating optical system) 112 through the opening portion. The reflective spatial light modulating device 150 is formed by an liquid crystal display device (LCD) 151 formed by an LCOS as a light valve and a polarization beam splitter 152 that reflects part of the light output from the light source 153 to guide the reflected light to the LCD device 151 and passes part of light reflected by the liquid crystal display device 151 to guide the passed light to the optical system 112. The liquid crystal display device 151 includes a plurality (for example, 640× 480) of pixels (liquid crystal cells) arranged in a 2D matrix. The polarization beam splitter 152 has a well-known configuration and structure. Unpolarized light output from the light source 153 collides with the polarization beam splitter 152. The polarization beam splitter 152 passes and outputs a P-polarized component outside the system. On the other hand, an S-polarized component is reflected by the polarization beam splitter 152, incident on the liquid crystal display device 151, reflected inside the LCD device liquid crystal display device 151, and output from the liquid crystal display device 151. Here, a large number of P-polarized components are included in light output from pixels used for displaying "white" in the light output from the liquid crystal display device 151, and a large number of S-polarized components are included in light output from pixels used for displaying "black." Accordingly, the P-polarized component within the light that is output from the liquid crystal display device 151 and collides with the polarization beam splitter 152 passes through the polarization beam splitter 152 and is guided to the optical system 112. On the other hand, the S-polarized component is reflected by the polarization beam splitter 152 and returned to the light source 153. The optical system 112, for example, includes a convex lens. To generate parallel light, the image forming device 111 (more specifically, the liquid crystal display device 151) is disposed at a place (position) of a focal distance of the optical system 112.

The frame 10 is formed by a front portion 11 arranged on the front side of the observer, two temple portions 13 pivotably mounted on both ends of the front portion 11 via hinges 12, and ear bend portions (also referred to as tip cells or ear pads) 14 mounted on tip end portions of the temple portions 13. In addition, nose pads (not shown) are mounted thereon. That is, the assembly of the frame 10 and the nose pads has basically substantially the same structure as ordinary glasses. Furthermore, each housing 113 is mounted to be attachable to or detachable from the temple portion 13 using a mounting member 19. The frame 10 is manufactured using metal or plastic. Each housing 113 may be mounted not to be attachable to or detachable from the temple portion 13 using the mounting member 19. Further, when the observer owns and wears glasses, each housing 113 may be attachable to nor detachable from the temple portion of the frame of the glasses owned by the observer using the mounting member 19. In addition, each housing 113 may be mounted outside the temple portion 13 or inside the temple portion 13.

Furthermore, a wiring 15 (a signal line, a power source line, or the like) extending from one image forming device 111A is connected to a control device (a control circuit or a control unit) 18 via the temple portion 13 and the inside of the ear bend portion 14 extending from a tip end portion of the ear bend portion 14 to the outside. Furthermore, each of the image forming device 111A and 111B includes a headphone portion 16 and a headphone portion wiring 17 extending from each of the image forming device 111A and 111B extends to the headphone portion 16 from the tip end portion of the ear bend portion 14 via the temple portion 13 and the inside of the ear bend portion 14. To be more specific, the headphone portion wiring 17 extends toward the headphone portion 16 from the tip end portion of the ear bend portion 14 going around the rear side of an auricle (pinna). With this configuration, the display device can be elegant without giving an impression of the headphone portion 16 and the headphone portion wiring 17 being complicated.

The dimmer 700 of Embodiment 1 is configured to be a light shutter in which a light transmission control material layer 705 is formed of a liquid crystal material layer. In other words, the dimmer 700 includes a transparent first substrate 701 facing the optical device 120 and a transparent second substrate 703 facing the first substrate 701; electrodes 702 and 704 each provided in the first substrate 701 and the second substrate 703; and the light transmission control material layer 705 sealed between the first substrate 701 and the second substrate 703. Here, the first substrate 701 and the second substrate 703 are formed of a plastic material. In addition, the first electrode 702 and the second electrode 704 are formed of transparent electrodes that include indium-tin complex oxides (ITO) and are formed based on a combination of a PVD method such as a sputtering method and a lift-off method. In addition, the light transmission control material layer 705 specifically includes a liquid crystal layer formed of a TN (Twisted Nematic) liquid crystal material. The first electrode 702 and the second electrode 704 are so-called solid electrodes which are not patterned. The first electrode 702 and the second electrode 704 are connected to the control device 18 via a connector and a wiring that are not shown. Outer edge portions of the two substrates 701 and 703 are sealed by a sealant 706. Furthermore, the first substrate 701 of the dimmer 700 is adhered to the protective member 126 (which protects the light guide plate 121) by the adhesive 707. In addition, polarization films are pasted to the outer face of the first substrate 701 and the outer face of the second substrate 702, but the polarization films are not illustrated. Note that the first substrate 701 of the dimmer 700 is shorter than the light guide plate 121 and the first substrate 701 of the dimmer 700 is fixed to the protective member 126 using the adhesive 707. The adhesive 707 is disposed in the outer edge portion of the first substrate 701. The same also applies in Embodiment 1 to Embodiment 4 to be described below. Note that the optical device 120 and the dimmer 700 are disposed in order from the side of the observer.

In the display device of Embodiment 1, a light shielding member 710 that shields incidence of light toward the optical device 120 is disposed in the region of the optical device 120 on which light output from the image forming device 111A or 111B is incident, specifically, the region in which the first deflecting unit 130 is provided. Here, in a projection image of 710 on the optical device 120, the region of the optical device 120 on which light output from the image forming device 111A or 111B is incident is included. In addition, in the projection image of the light shielding member 710 on the optical device 120, a projection image of an edge portion of the dimmer 700 on the optical device 120 is included.

In Embodiment 1, the light shielding member 710 is disposed separate from the optical device 120 on the side opposite to the side on which the image forming device 111A or 111B of the optical device 120 is disposed. The light shielding member 710 is made of, for example, a non-transparent plastic material, and the light shielding member 710 integrally extends from the housing 113 of the image display device 111A or 111B, is mounted in the housing 113 of the image display device 111A or 111B, integrally extends from the frame 10, or is mounted in the frame 10. Note that, in the example shown in the drawing, the light shielding member 710 integrally extends from the housing 113 of the image display device 111A or 111B.

A light transmittance of the dimmer 700 can be controlled using a voltage applied to the first electrode 702 and the second electrode 704. To be specific, when a voltage is applied to the first electrode 702 in a state in which the second electrode 704 is grounded, for example, the liquid crystal arrangement state of the liquid crystal material layer constituting the light transmission control material layer 705 is changed and accordingly light transmittance of the liquid crystal material layer is changed (refer to FIGS. 4A and 4B). The voltage applied to the first electrode 702 and the second electrode 704 can be applied by the observer operating a control knob provided in the control device 18. In other words, as the observer observes an image from the optical device 120 or 320 and adjusts the light transmittance of the dimmer 700, contrast of the image may be enhanced. Note that, as a result of various tests, it has been determined that desirable maximum light transmittance of the dimmer 700 is 50% and minimum light transmittance is 30% or lower (preferably, 1% or higher and 30% or lower).

In the display device of Embodiment 1, the light shielding member that shields incidence of external light on the optical device is disposed in the region of the optical device on which light output from the image forming device is incident. Thus, even when there is a change in an incidence amount of external light due to an operation of the dimmer, undesired stray light or the like is not generated since external light is not incident on the region of the optical device on which light output from the image forming device is incident, specifically, on the first deflecting unit 130, and thus deterioration in image display quality in the display device is not caused.

Embodiment 2

Figure 5:
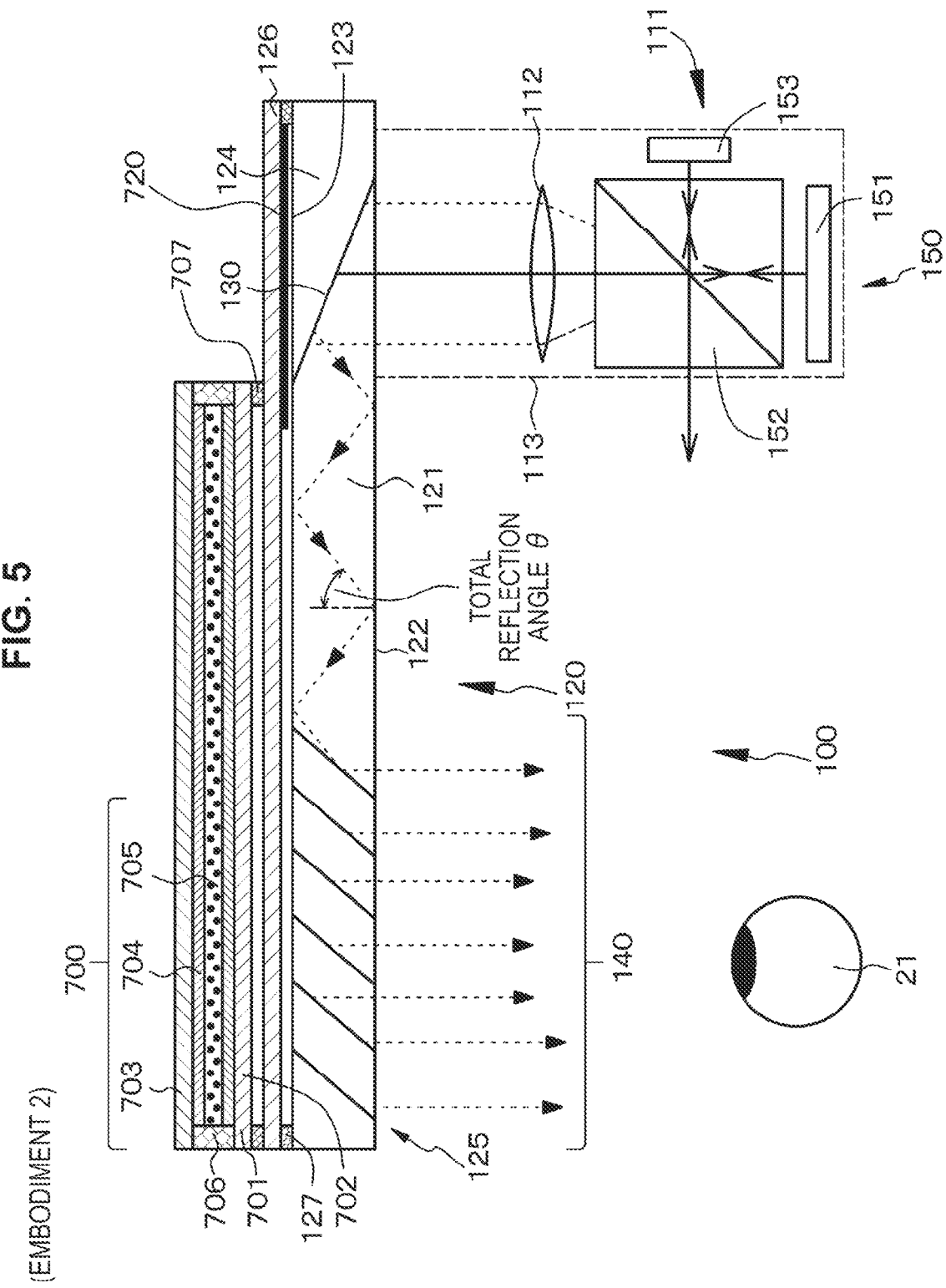
FIG. 5 is a conceptual diagram of a display device of Embodiment 2.

Embodiment 2 is a modification of Embodiment 1. As in a conceptual diagram shown in FIG. 5, in the display device of Embodiment 2, a light shielding member 720 is disposed in a portion of the optical device 120 on the side opposite to the side on which the image forming device 111A or 111B is disposed, unlike in Embodiment 1. To be specific, the light shielding member 720 can be formed by printing non-transparent ink on the optical device 120 (specifically, an inner face of the protective member 126). Except for this point, the display device of Embodiment 2 has the same configuration and structure as the display device of Embodiment 1, and thus detailed description thereof will be omitted. Note that the light shielding member 720 of Embodiment 2 and the light shielding member 710 of Embodiment 1 can be combined. Note that the light shielding member 720 may be formed on an outer face of the protective member 126.

Embodiment 3

Figure 6:
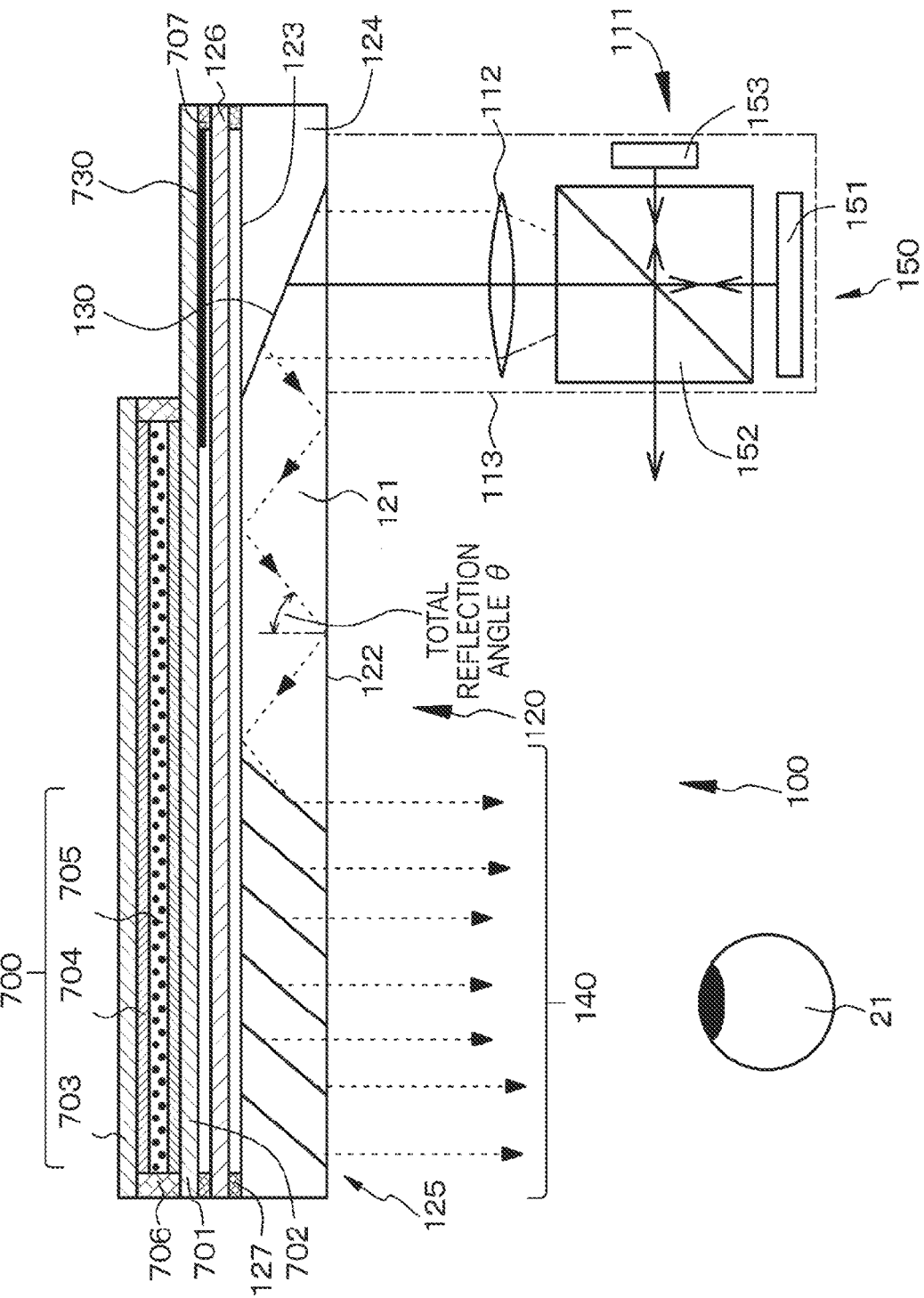
FIG. 6 is a conceptual diagram of a display device of Embodiment 3.
Figure 7:
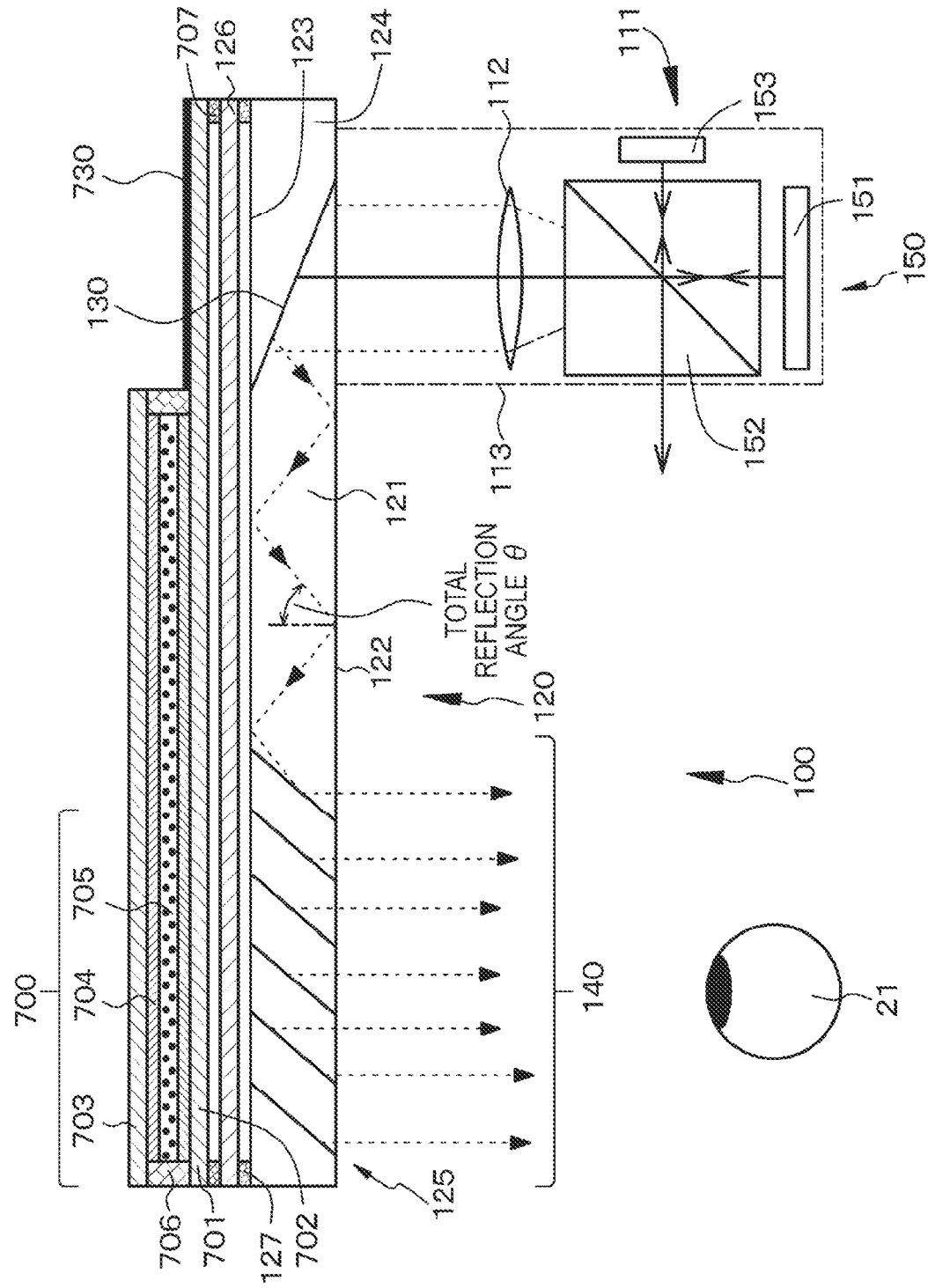
FIG. 7 is a conceptual diagram of a modified example of the display device of Embodiment 3.

Embodiment 3 is also a modification of Embodiment 1. As in a conceptual diagram shown in FIG. 6 or FIG. 7, in the display device of Embodiment 3, a light shielding member 730 is disposed in the dimmer 700, unlike in Embodiments 1 and 2. To be specific, the light shielding member 730 can be formed by printing non-transparent ink in the dimmer 700. Note that, in the example shown in FIG. 6, the light shielding member 730 is formed on an outer face of the first substrate 701 of the dimmer 700, and in the example shown in FIG. 7, the light shielding member 730 is formed on an inner face of the first substrate 701 of the dimmer 700. Except for this point, the display device of Embodiment 3 has the same configuration and structure as the display device of Embodiment 1, and thus detailed description thereof will be omitted. Note that the light shielding member 730 of Embodiment 3 and the light shielding member 710 of Embodiment 1 can be combined, the light shielding member 730 of Embodiment 3 and the light shielding member 720 of Embodiment 2 can be combined, or the light shielding member 730 of Embodiment 3, the light shielding member 710 of Embodiment 1, and the light shielding member 720 of Embodiment 2 can be combined.

Embodiment 4

Figure 8:
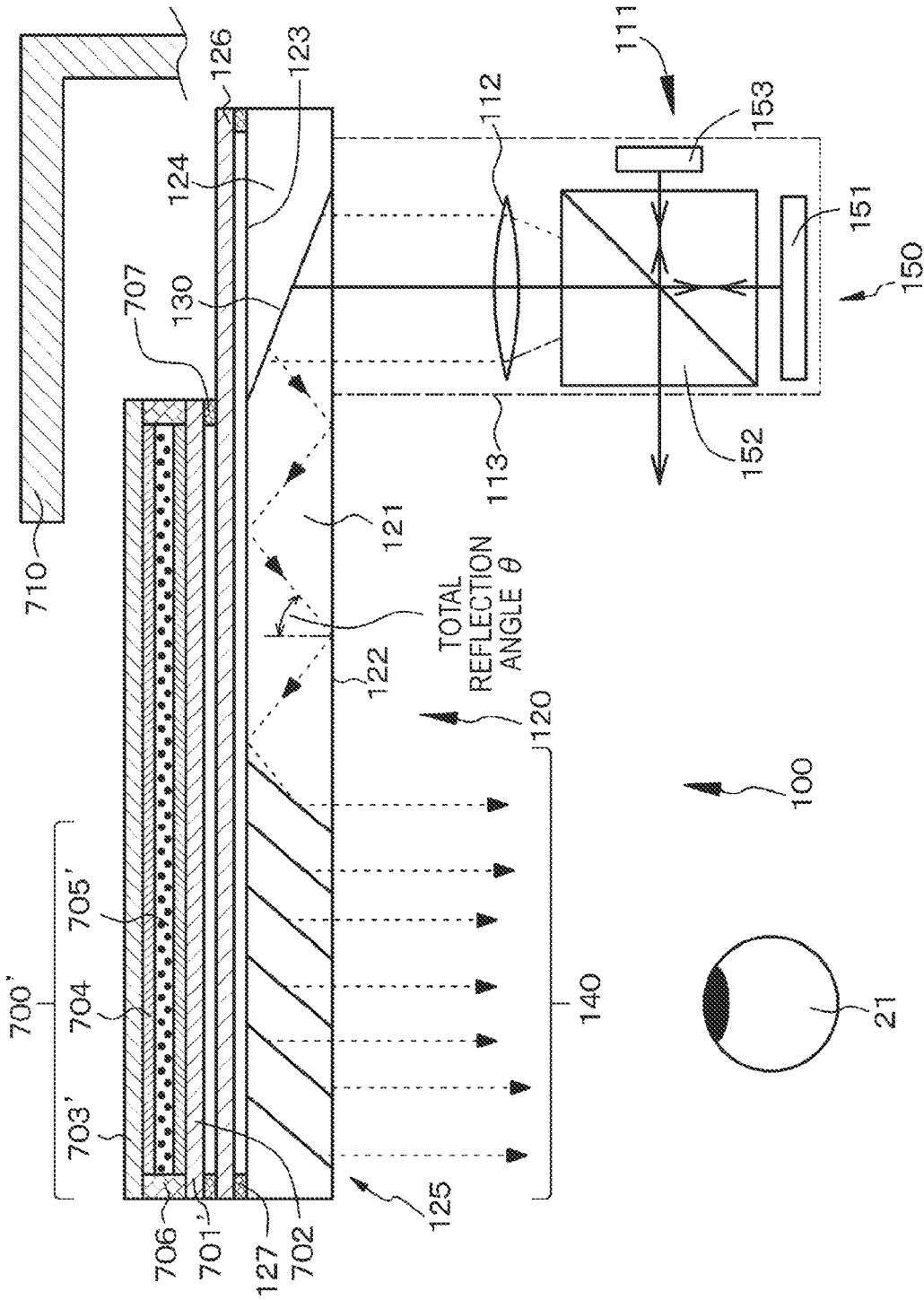
FIG. 8 is a conceptual diagram of a display device of Embodiment 4.

Embodiment 4 is a modification of Embodiments 1 to 3. In Embodiments 1 to 3, the light transmission control material layer 705 includes the liquid crystal material layer. On the other hand, as in a conceptual diagram shown in FIG. 8, in the display device of Embodiment 4, a dimmer 700' is configured to be a light shutter in which a light transmission control material layer 705' is formed of an inorganic electro-luminescence material layer. Here, as a material forming the inorganic electro-luminescence material layer, tungsten oxide ($WO_3$) is used. In addition, a first substrate 701' and a second substrate 703' constituting the dimmer 700' are configured to be a transparent glass substrate of soda-lime glass, white plate glass, or the like, and the second substrate 703' is formed to be thinner than the first substrate 701'. To be specific, a thickness of the second substrate 703' is set to be 0.2 mm and a thickness of the first substrate 701' is set to be 0.4 mm. Except for these points, the display device of Embodiment 4 has the same configuration and structure as the display device of Embodiments 1 to 3, and thus detailed description thereof will be omitted. Note that the first substrate 701' of the dimmer 700' and the protective member 126 are adhered to each other by the adhesive 707 as in Embodiment 1.

Embodiment 5

Figure 9:
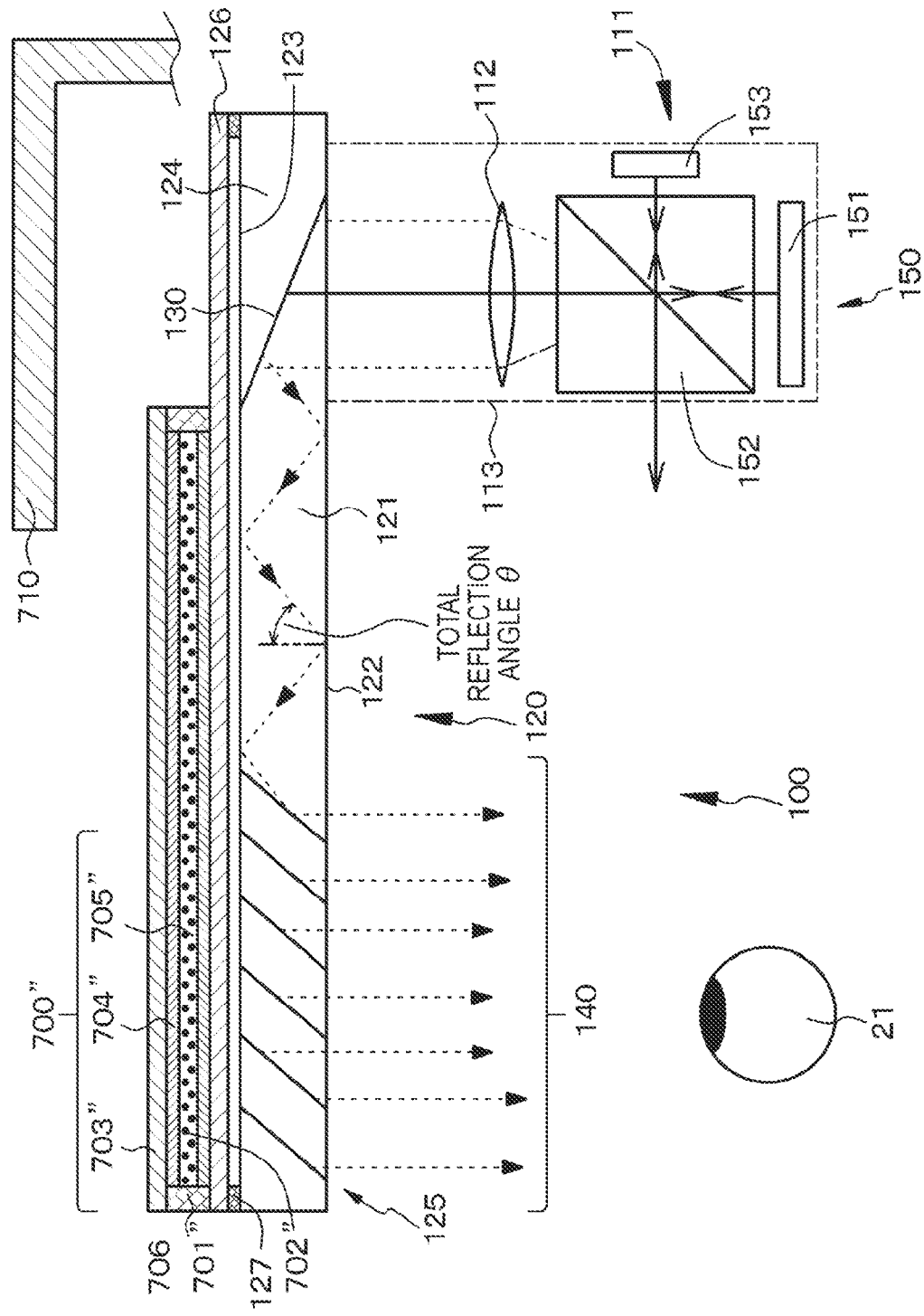
FIG. 9 is a conceptual diagram of a display device of Embodiment 5.

Embodiment 5 relates to a display device according to a second aspect of the present disclosure and to a modification of Embodiment 4. As in a conceptual diagram shown in FIG. 9, in the display device of Embodiment 5, the dimmer 700" includes a first substrate 701" facing the optical device 120 and a second substrate 703" facing the first substrate 701"; electrodes 702" and 704" each provided in the first substrate 701" and the second substrate 703"; and a light transmission control material layer 705" sealed between the first substrate 701" and the second substrate 703". In addition, the first substrate 701" also serves as a constituent member (to be specific, the protective member 126) of the optical device 120. In other words, the first substrate 701" and the protective member 126 are a shared member being used together.

As described above, in Embodiment 5, since the first substrate 701" constituting the dimmer 700" serves as a constituent member (the protective member 126) of the optical device 120, a whole weight of the display device can be reduced, and there is no fear of causing discomfort to a user of the display device.

Since the display device of Embodiment 5 has the same configuration and structure as the display device of Embodiment 4 except for this point, detailed description thereof will be omitted. In addition, since a light shielding member of the display device of Embodiment 5 can have the same configuration and structure as the dimmers of the display devices of Embodiments 1 to 3, detailed description thereof will be omitted.

Embodiment 6

Figure 10:
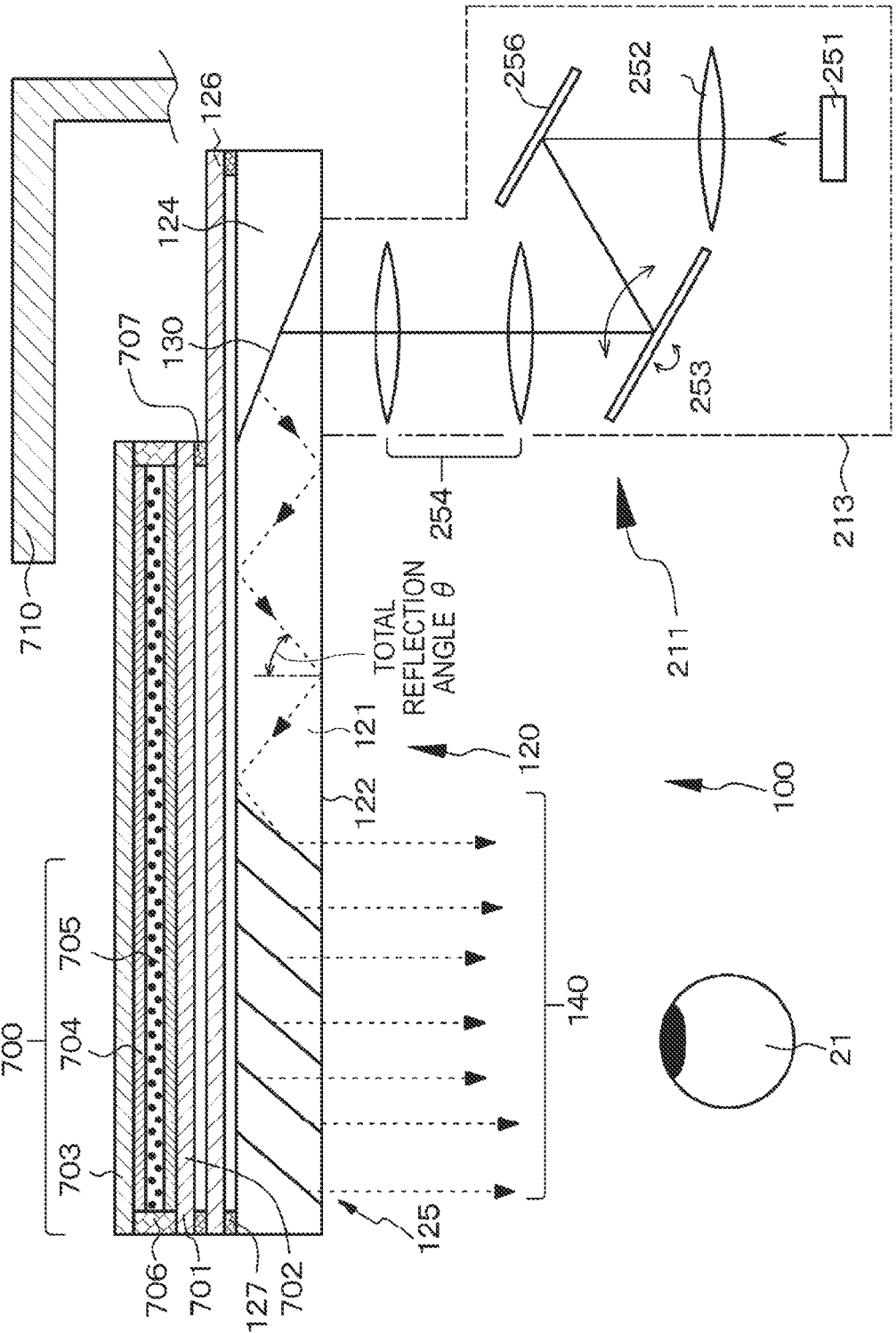
FIG. 10 is a conceptual diagram of an image display device of a display device of Embodiment 6.

Embodiment 6 is a modification of Embodiments 1 to 5. As in a conceptual diagram of the image display device 200 of a display device (a head mounted type display) of Embodiment 6 shown in FIG. 10, an image forming device 211 is configured to be an image forming device of a second configuration in Embodiment 6. In other words, the image forming device includes a light source 251 and a scanning unit 253 that scans parallel light output from the light source 251. To be more specific, the image forming device 211 includes:

(a) the light source 251; (b) a collimating optical system 252 that converts light output from the light source 251 into parallel light;

(c) the scanning unit 253 that scans the parallel light output from the collimating optical system 252; and (d) a relay optical system 254 that relays and then outputs the parallel light scanned by the scanning unit 253. Note that the entire image forming device 211 is accommodated in a housing 213 (indicated by a dashed-dotted line in FIG. 10), an opening portion (not shown) is provided in the housing 213, and light is output from the relay optical system 254 via the opening portion. In addition, each housing 213 is mounted to be attachable to or detachable from the temple portion 13 using the mounting member 19.

The light source 251 is constituted by a light emitting element that emits white light. In addition, light output from the light source 251 is incident on the collimating optical system 252 having a positive optical power as a whole and output therefrom as parallel light. In addition, the parallel light is reflected by a total-reflection mirror 256, converted into a kind of two-dimensional image by undergoing horizontal scanning and vertical scanning by the scanning unit 253 that includes an MEMS in which a micro-mirror is set to be freely rotatable in a two-dimensional direction to scan the incident parallel light in a two-dimensional manner, and thereby virtual pixels (the number of pixels can be, for example, the same as in Embodiment 1) are generated. In addition, light from the virtual pixels passes through the relay optical system (parallel light output optical system) 254 constituted by a known relay optical system and then a light flux that has been converted into parallel light is incident on the optical device 120.

The optical device 120, on which the light flux converted into the parallel light by the relay optical system 254 is incident, in which the light flux is guided, and from which the light flux is output, has the same configuration and structure as the optical device described in Embodiment 1, and thus detailed description thereof will be omitted. In addition, since the display device of Embodiment 6 has substantially the same configuration and structure as the display devices of Embodiments 1 to 5 except for the difference of the image forming device 211, detailed description thereof will be omitted.

Embodiment 7

Figure 11:
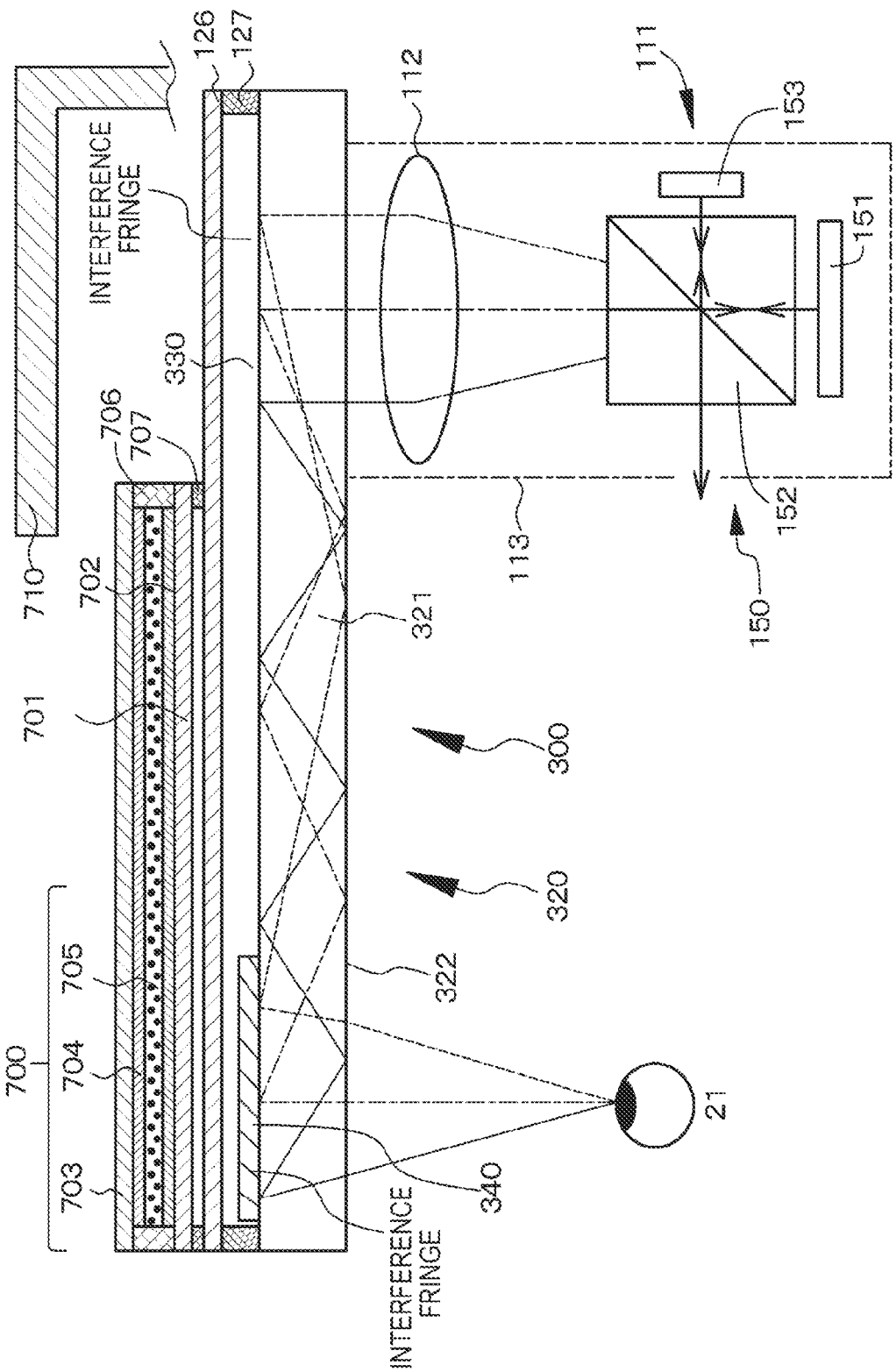
FIG. 11 is a conceptual diagram of a display device of Embodiment 7.
Figure 12:
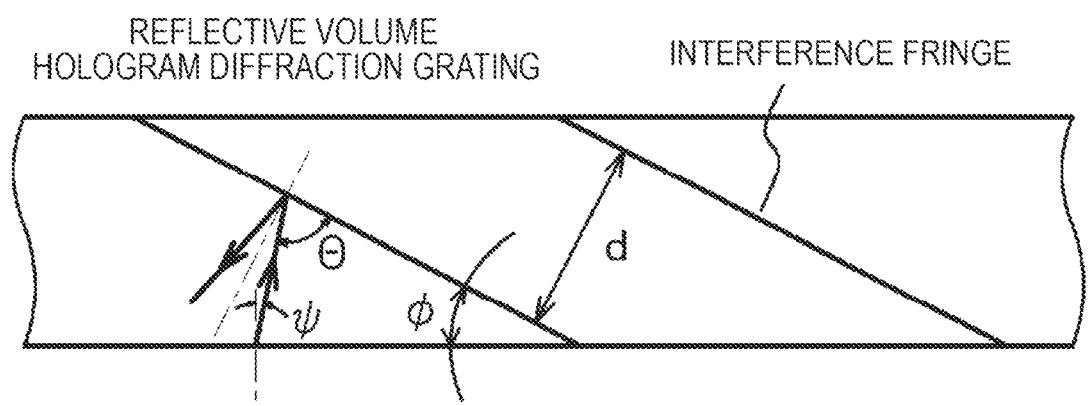
FIG. 12 is a schematic cross-sectional diagram showing an enlarged part of a reflective volume hologram diffraction grating of the display device of Embodiment 7.

Embodiment 7 is a modification of Embodiments 1 to 5. A conceptual diagram of the image display device 300 of a display device (a head mounted type display) of Embodiment 7 is shown in FIG. 11. In addition, a schematic cross-sectional diagram showing an enlarged portion of a reflective volume hologram diffraction grating is shown in FIG. 12. In Embodiment 7, the image forming device 111 is configured to be an image forming device of the first configuration the same as in Embodiment 1. In addition, an optical device 320 has the same basic configuration and structure as the optical device 120 of Embodiment 1 except for a difference in configurations and structure of the first deflecting unit and the second deflecting unit.

In Embodiment 7, the first deflecting unit and the second deflecting unit are disposed on a surface of a light guide plate 321 (specifically, a second surface 323 of the light guide plate 321). The first deflecting unit diffracts light incident on the light guide plate 321, and the second deflecting unit diffracts light propagating through the inside of the light guide plate 321 according to total reflection a plurality of times. Here, the first deflecting unit and the second deflecting unit are formed by diffraction grating elements, specifically, reflective diffraction grating elements, and more specifically, reflective volume hologram diffraction gratings. In the following description, the first deflecting unit formed by the reflective volume hologram diffraction grating is referred to as a "first diffraction grating member 330" for the sake of convenience, and the second deflecting unit formed by the reflective volume hologram diffraction grating is referred to as a "second diffraction grating member 340" for the sake of convenience.

In addition, in Embodiment 7 or Embodiment 8 to be described later, the first diffraction grating member 330 and the second diffraction grating member 340 include one diffraction grating layer laminated. Note that, in each diffraction grating layer formed by a photopolymer material, interference fringes corresponding to one type of wavelength band (or wavelength) are formed, and manufactured using a method of the related art. The pitch of the interference fringes formed in the diffraction grating layer (diffractive optical element) is constant, and the interference fringes have a linear shape and extend in parallel to the Z axis. Note that the axial lines of the first diffraction grating member 330 and the second diffraction grating member 340 are parallel to the X axis, and the normal lines thereof are parallel to the Y axis.

A schematic partial cross-sectional diagram in which the reflective volume hologram diffraction grating is enlarged is illustrated in FIG. 12. In the reflective volume hologram diffraction grating, interference fringes having a slant angle $\phi$ are formed. Here, the slant angle $\phi$ represents an angle formed by the surface of the reflective volume hologram diffraction grating and the interference fringes. The interference fringes are formed from the inside of the reflective volume hologram diffraction grating to the surface thereof. The interference fringes satisfy a Bragg condition. Here, the Bragg condition is a condition that satisfies the following Expression (A). In Expression (A), m represents a positive integer, $\lambda$ represents a wavelength, d represents the pitch of the grating surface (a gap of virtual planes including the interference fringes in the direction of the normal line), and Θ represents a complementary angle of an angle at which light is incident on the interference fringes. In addition, when light penetrates into the diffraction grating member at an incidence angle ψ, the relationship among Θ, the slant angle φ, and the incidence angle ψ is shown in Expression (B).

$$m \cdot \lambda = 2 \cdot d \cdot \sin(\Theta) \tag{A}$$

$$\Theta = 90° - (\phi + \psi) \tag{B}$$

As described above, the first diffraction grating member 330 is disposed on (adhered to) the second surface 323 of the light guide plate 321 and diffracts and reflects parallel light incident on the light guide plate 321 so that the parallel light incident from the first surface 322 to the light guide plate 321 is totally reflected inside the light guide plate 321. Further, as described above, the second diffraction grating member 340 is disposed on (adhered to) the second surface 323 of the light guide plate 321 and diffracts and reflects the parallel light propagating through the inside of the light guide plate 321 according to total reflection a plurality of times, and the parallel light is directly output from the first surface 322 of the light guide plate 321.

Then, the parallel light propagates through the inside of the light guide plate 321 according to total reflection and then is output therefrom. At this time, because the light guide plate 321 is thin, and a path of light that propagates through the inside of the light guide plate 321 is long, the number of total reflections until the parallel light reaches the second diffraction grating member 340 differs according to an angle of view. In more detail, the number of reflections of parallel light incident at an angle in a direction close to the second diffraction grating member 340 among parallel light beams incident on the light guide plate 321 is less than that of parallel light incident on the light guide plate 321 at an angle in a direction away from the second diffraction grating member 340. This is because parallel light incident on the light guide plate 321 at an angle close to the second diffraction grating member 340 among parallel light beams diffracted and reflected in the first diffraction grating member 330 has a smaller angle formed with the normal line of the light guide plate 321 when light propagating through the inside of the light guide plate 321 collides with the inner surface of the light guide plate 321 than parallel light incident on the light guide plate 321 at an angle in a direction reverse thereto. In addition, the shape of the interference fringes formed inside the second diffraction grating member 340 and the shape of the interference fringes formed inside the first diffraction grating member 330 are symmetrical with respect to a virtual plane vertical to the axial line of the light guide plate 321. The face of the first diffraction grating member 330 and the second diffraction grating member 340 that does not face the light guide plate 321 is covered by a protective member (protective plate) 326, which prevents the first diffraction grating member 330 and the second diffraction grating member 340 from being damaged. Note that the light guide plate 321 and the protective member 326 are adhered to their outer circumferential portions using an adhesive 327. In addition, the light guide plate 321 may be protected by pasting a transparent protective film on the first face 322.

The light guide plate 321 in accordance with Embodiment 8 to be described later also basically has the same configuration and structure as those of the light guide plate 321 described above.

Since the display device of Embodiment 7 has substantially the same configuration and structure as the display devices of Embodiments 1 to 5 except for the difference from the optical device 320 as described above, detailed description thereof will be omitted.

Embodiment 8

Figure 13:
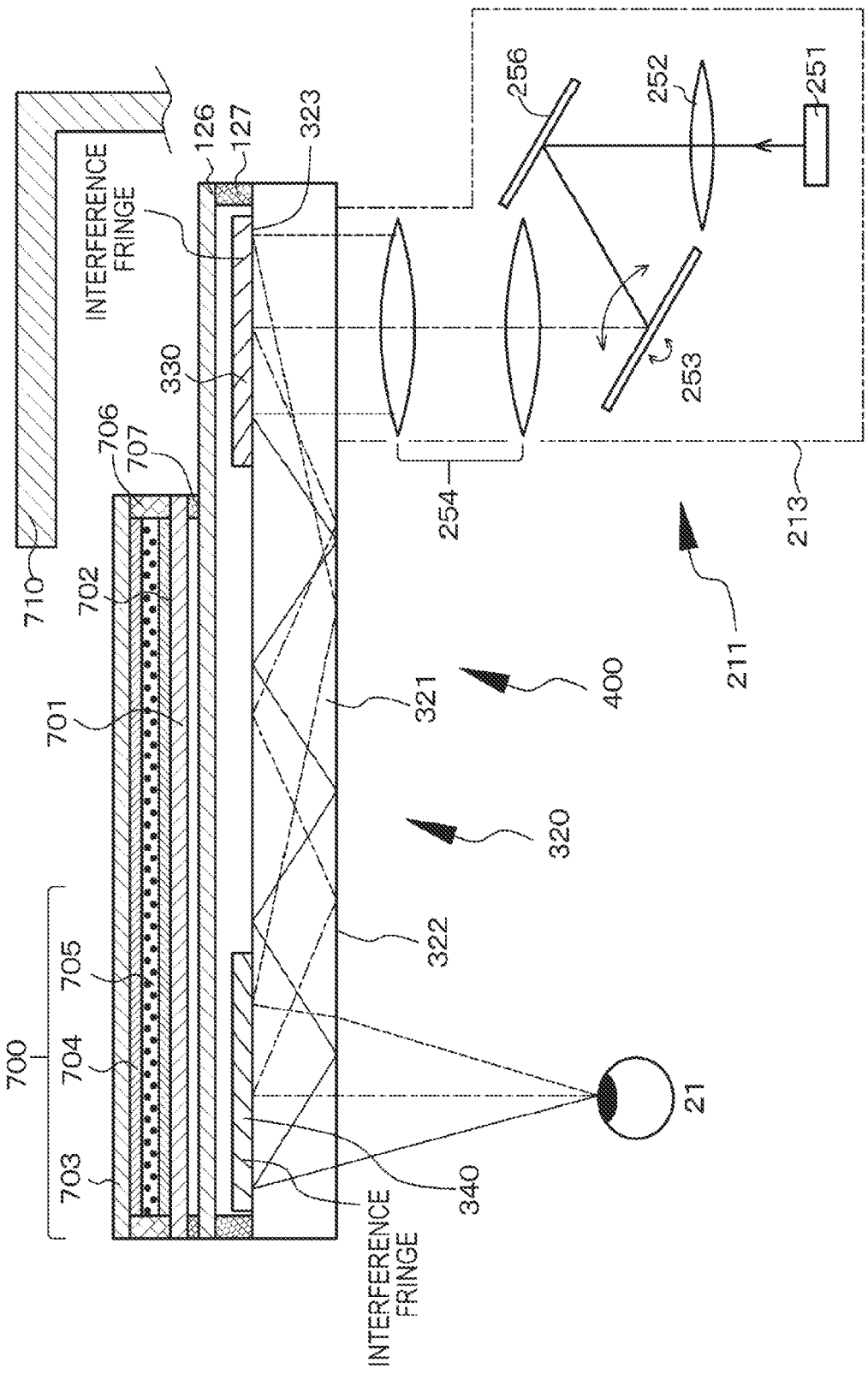
FIG. 13 is a conceptual diagram of a display device of Embodiment 8.

Embodiment 8 is a modification of Embodiment 7. A conceptual diagram of the image display device of the display device (head mounted type display) of Embodiment 8 is shown in FIG. 13. The light source 251, the collimating optical system 252, the scanning unit 253, the parallel light output optical system (relay optical system 254), and the like of the image display device 400 of Embodiment 8 have the same configuration and structure as those of Embodiment 6 (the image forming device of the second configuration). In addition, the optical device 320 of Embodiment 8 has the same configuration and structure as the optical device 320 of Embodiment 7. Since the display device of Embodiment 8 has substantially the same configuration and structure as the display device of Embodiments 1 to 5, detailed description thereof will be omitted.

Embodiment 9

Figure 14:
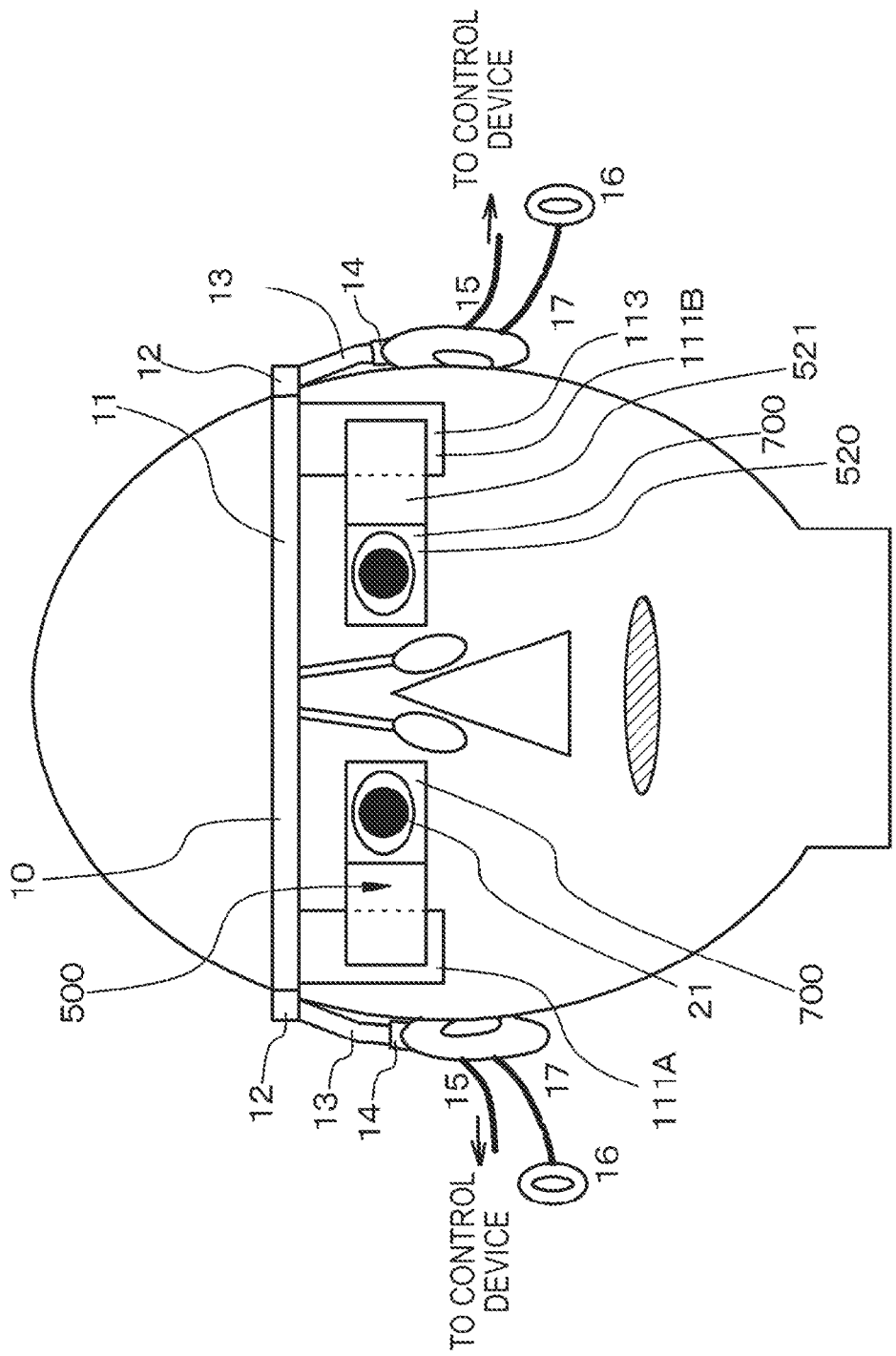
FIG. 14 is a schematic diagram of a display device of Embodiment 9 as viewed from a front side.
Figure 15:
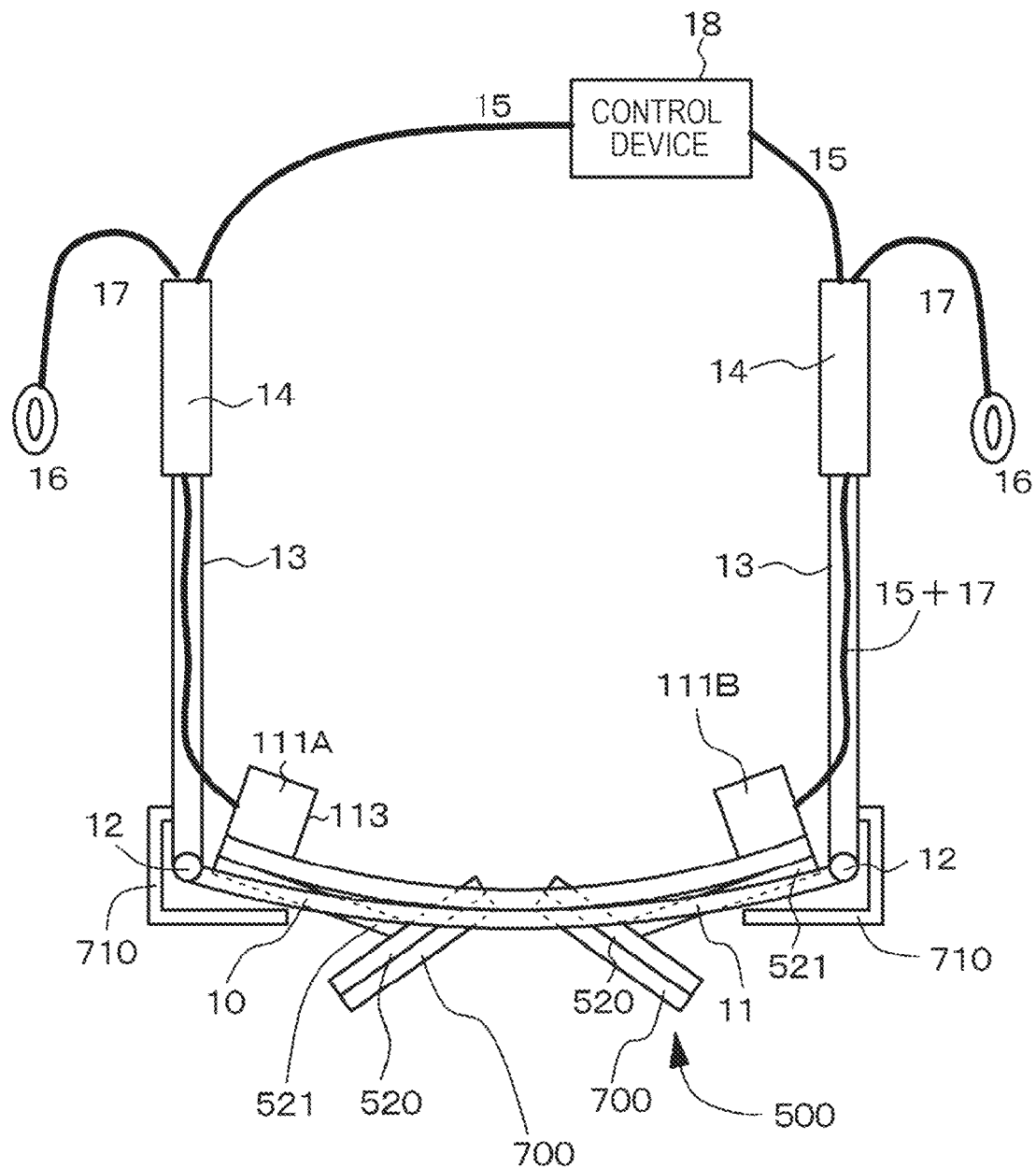
FIG. 15 is a schematic diagram of the display device of Embodiment 9 as viewed from above.

Embodiment 9 is also a modification of the image display devices of Embodiments 1 to 8. A schematic diagram of a display device of Embodiment 9 as viewed from a front side is shown in FIG. 14 and a schematic diagram thereof as viewed from above is shown in FIG. 15. Note that, in FIG. 14, a light shielding member is not illustrated.

In Embodiment 9, an optical device 520 constituting the image forming device 500 includes a semi-transmissive mirror on which light output from the image forming device 111A or 111B is incident and from which light is output toward the pupil 21 of the observer. Note that, in Embodiment 9, light output from the image forming device 111A or 111B is configured to propagate through the inside of a transparent member 521 such as a glass plate or a plastic plate and then to be incident on the optical device 520 (semi-transmissive mirror), but may be configured to propagate through the air and then to be incident on the optical device 520. In addition, the image forming device can be set as the image forming device 211 described in Embodiment 6.

Each of the image forming devices 111A and 111B is mounted in the front portion 1 using, for example, a screw. In addition, the member 521 is mounted in each of the image forming devices 111A and 111B, the optical device 520 (semi-transmissive mirror) is mounted in the member 521, and the dimmer 700 is mounted in the optical device 520 (semi-transmissive mirror). In addition, a light shielding member is mounted in the frame. Since the display device of Embodiment 9 has substantially the same configuration and structure as the display devices of Embodiments 1 to 8 except for the differences described above, detailed description thereof will be omitted.

Embodiment 10

Figure 16:
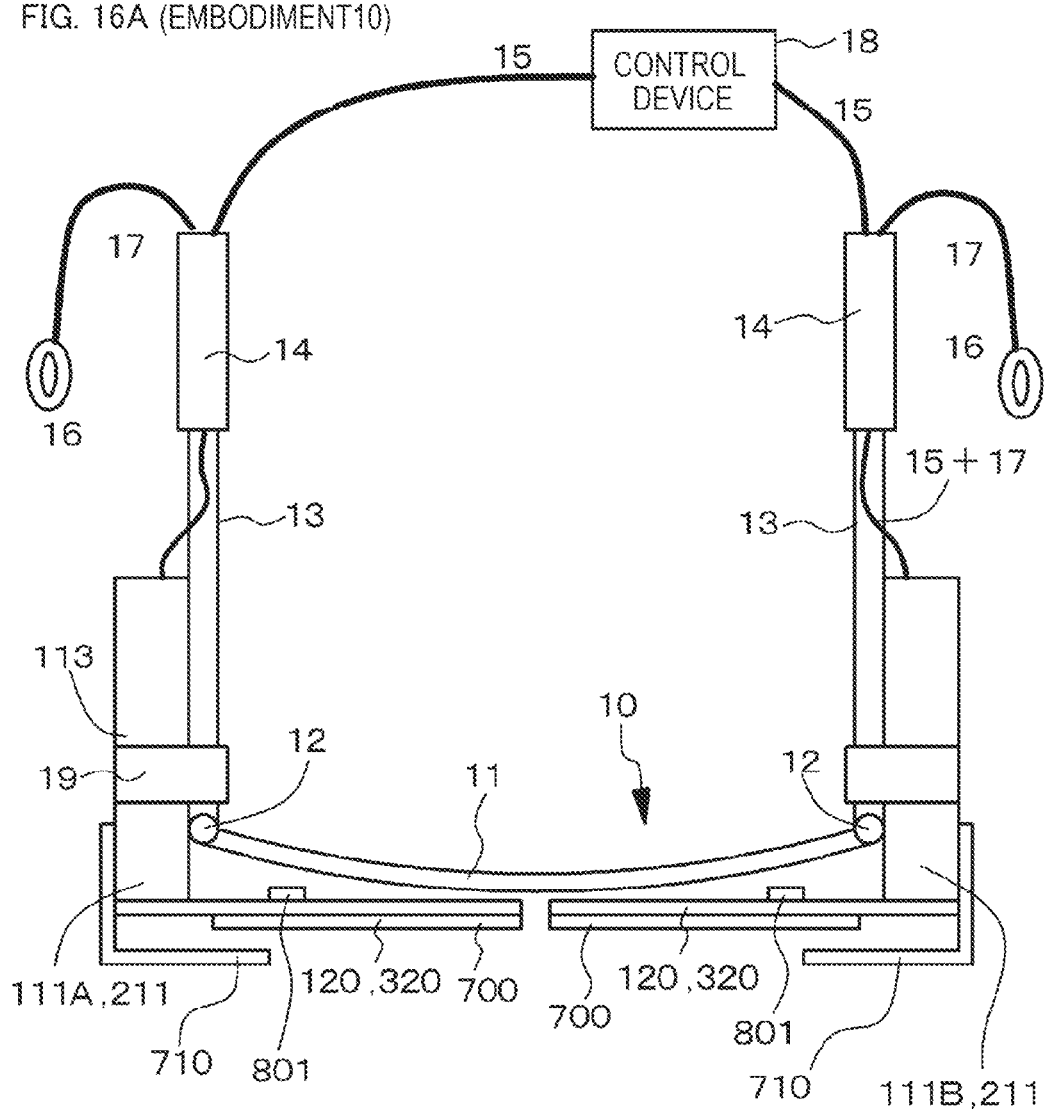
FIG. 16A and FIG. 16B are respectively a schematic diagram of a display device of Embodiment 10 as viewed from above and a schematic diagram of a circuit that controls an illuminance sensor.
Figure 16B:
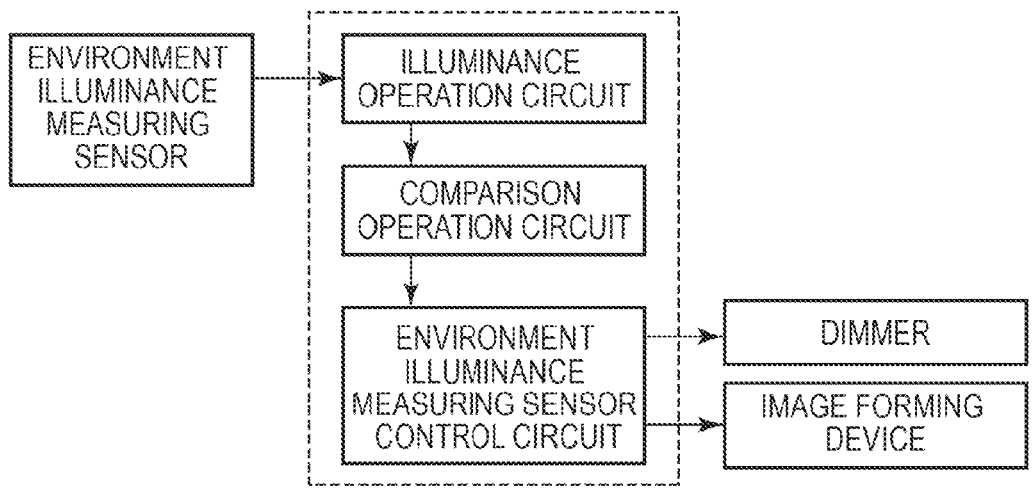

Embodiment 10 is also a modification of Embodiments 1 to 5. A schematic diagram of a display device of Embodiment 10 as viewed from above is shown in FIG. 16A. In addition, a schematic diagram of a circuit that controls an illuminance sensor is shown in FIG. 16B.

The display device of Embodiment 10 further includes the illuminance sensor (environment illuminance measuring sensor) 801 that measures illuminance of an environment in which the display device is placed, and controls light transmittance of the dimmer 700 based on a measurement result of the illuminance sensor (environment illuminance measuring sensor) 801. The display device controls luminance of an image formed by the image forming device 111 or 211 based on the measurement result of the illuminance sensor (environment illuminance measuring sensor) 801 in a parallel or separate manner. When the environment illuminance measuring sensor 801 having a known configuration and structure may be disposed on, for example, the outer face of the light shielding member 710, or in the outer side edge portion of the optical device 120 or 320 or in the outer side edge portion of the dimmer when being provided with the light shielding member 720 or the like without the light shielding member 710. The environment illuminance measuring sensor 801 is connected to the control device 18 via a connector and a wiring that are not shown. The control device 18 includes circuits that control the environment illuminance measuring sensor 801. The circuits that control the environment illuminance measuring sensor 801 include an illuminance operation circuit that receives a measurement value from the environment illuminance measuring sensor 801 to obtain illuminance, a comparison operation circuit that compares the value of the illuminance obtained by the illuminance operation circuit to a reference value, and an environment illuminance measuring sensor control circuit that controls the dimmer 700 and/or the image forming device 111 or 211 based on the value obtained by the comparison operation circuit, and the circuits can be configured to be known circuits. For control of the dimmer 700, light transmittance of the dimmer 700 is controlled, and on the other hand, for control of the image forming device 111 or 211, luminance of an image formed by the image forming device 111 or 211 is controlled. Note that the control of the light transmittance of the dimmer 700 and the control of luminance of the image of the image forming device 111 or 211 may be performed independently or in correlation with each other.

For example, when the measurement result of the illuminance sensor (environment illuminance measuring sensor) 801 is equal to or higher than a predetermined value (a first illuminance measurement value), the light transmittance of the dimmer 700 is set to be equal to or lower than a predetermined value (a first light transmittance). On the other hand, when the measurement result of the illuminance sensor (environment illuminance measuring sensor) 801 is equal to or lower than a predetermined value (a second illuminance measurement value), the light transmittance of the dimmer 700 is set to be equal to or higher than a predetermined value (a second light transmittance). Here, 10 lux can be exemplified as the first illuminance measurement value, any value from 1% to 30% can be exemplified as the first light transmittance, 0.01 lux can be exemplified as the second illuminance measurement value, and any value from 51% to 99% can be exemplified as the second light transmittance.

Note that the illuminance sensor (environment illuminance measuring sensor) 801 of Embodiment 10 can be applied to the display devices described in Embodiments 2 to 9. In addition, when the display device has an imaging device, a light receiving element for exposure measurement included in such an imaging device can also constitute the illuminance sensor (environment illuminance measuring sensor) 801.

In the display device of Embodiment 10 or Embodiment 11 to be described next, the light transmittance of the dimmer is controlled based on the measurement result of the illuminance sensor (environment illuminance measuring sensor), the luminance of the image formed by the image forming device is controlled based on the measurement result of the illuminance sensor (environment illuminance measuring sensor), the light transmittance of the dimmer is controlled based on a measurement result of a second illuminance sensor (transmitted light illuminance measuring sensor), and the luminance of the image formed by the image forming device is controlled based on the measurement result of the second illuminance sensor (transmitted light illuminance measuring sensor), and thus not only can a high contrast be given to an image observed by an observer, but also an observation state of an image can be optimized according to illuminance of the periphery of the environment in which the display device is placed.

Embodiment 11

Figure 17:
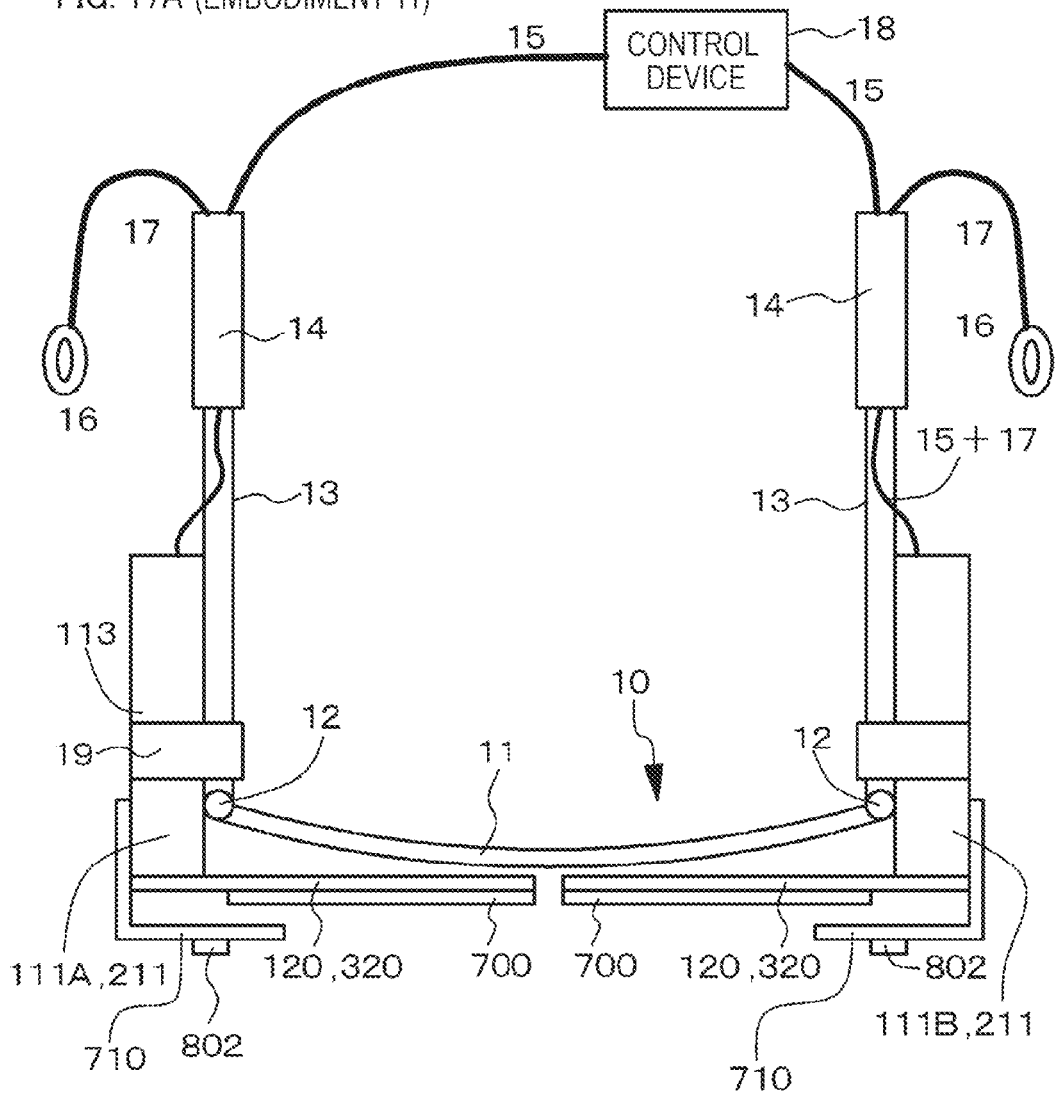
FIG. 17A and FIG. 17B are conceptual diagrams of a display device of Embodiment 11.
Figure 17B:
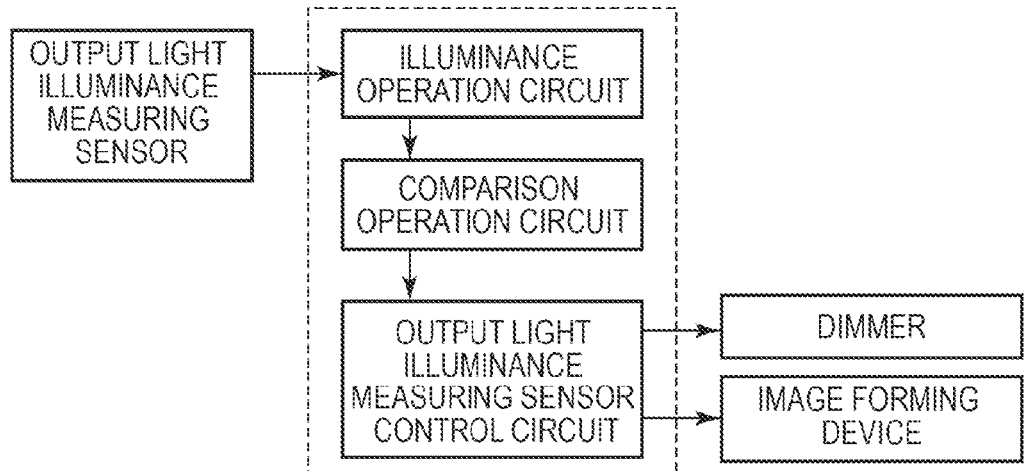

Embodiment 11 is also a modification of Embodiments 1 to 5. A schematic diagram of a display device of Embodiment 11 as viewed from above is shown in FIG. 17A. In addition, a schematic diagram of a circuit that controls an illuminance sensor is shown in FIG. 17B.

The display device of Embodiment 11 further includes a second illuminance sensor (transmitted light illuminance measuring sensor) 802 that measures illuminance based on light transmitted through the dimmer from an external environment, i.e., measures a desired illuminance to which environmental light that has been transmitted through the dimmer is adjusted for incidence, and light transmittance of the dimmer 700 is controlled based on a measurement result of the second illuminance sensor (transmitted light illuminance measuring sensor) 802. Based on the measurement result of the second illuminance sensor (transmitted light illuminance measuring sensor) 802, luminance of an image formed by the image forming device 111 or 211 is controlled in parallel thereto or independently thereof. The transmitted light illuminance measuring sensor 802 having a known configuration and structure is disposed closer to the observer than the optical device 120, 320, or 520. To be specific, the transmitted light illuminance measuring sensor 802 may be disposed, for example, on the face of the light guide plate 121 or 321 on the observer side. The transmitted light illuminance measuring sensor 802 is connected to the control device 18 via a connector and a wiring that are not shown. The control device 18 includes circuits that control the transmitted light illuminance measuring sensor 802. The circuits that control the transmitted light illuminance measuring sensor 802 include an illuminance operation circuit that receives a measurement value from the transmitted light illuminance measuring sensor 802 to obtain illuminance, a comparison operation circuit that compares the value of the illuminance obtained by the illuminance operation circuit to a reference value, and a transmitted light illuminance measuring sensor control circuit that controls the dimmer 700 and/or the image forming device 111 or 211 based on the value obtained by the comparison operation circuit, and the circuits can be configured to be known circuits. For control of the dimmer 700, light transmittance of the dimmer 700 is controlled, and on the other hand, for control of the image forming device 111 or 211, luminance of an image formed by the image forming device 111 or 211 is controlled. Note that the control of the light transmittance of the dimmer 700 and the control of luminance of the image of the image forming device 111 or 211 may be performed independently or in correlation with each other. Furthermore, when it is difficult to control the measurement result of the transmitted light illuminance measuring sensor 802 to desired illuminance in consideration of the illuminance of the environment illuminance measuring sensor 801, in other words, when the measurement result of the transmitted light illuminance measuring sensor 802 fails to reach the desired illuminance or when finer adjustment of illuminance is required, the light transmittance of the dimmer may be adjusted while monitoring the value of the transmitted light illuminance measuring sensor 802.

Note that the second illuminance sensor (transmitted light illuminance measuring sensor) 802 of Embodiment 11 can be applied to the display devices described in Embodiments 2 to 9. Alternatively, the second illuminance sensor (transmitted light illuminance measuring sensor) 802 of Embodiment 11 may be combined with the environment illuminance measuring sensor 801 of Embodiment 10, and in this case, various tests may be performed and then control of the light transmittance of the dimmer 700 and control of the luminance of the image of the image forming device 111 or 211 may be performed independently or in correlation with each other.

Embodiment 12

In Embodiments 12 to 25 below, modified examples of the display devices of Embodiments 1 to 11 will be described. Note that, in the drawings relating to Embodiments 12 to 25, the dimmer will not be illustrated.

Figure 18:
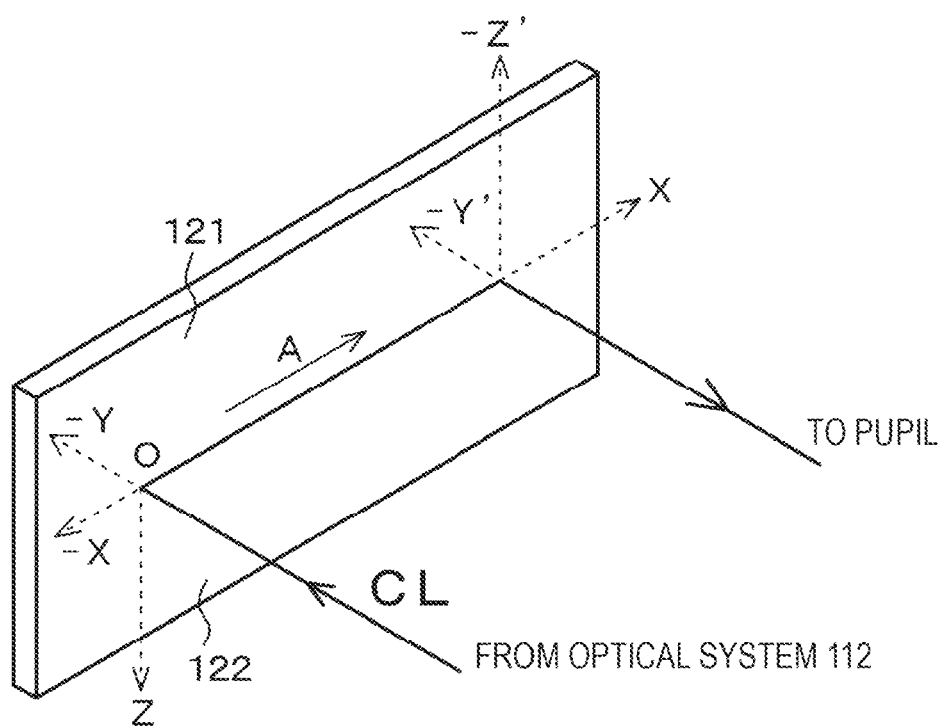
FIG. 18 is a diagram schematically showing propagation of light in a light guide plate constituting an image display device of a display device of Embodiment 12.
Figure 19:
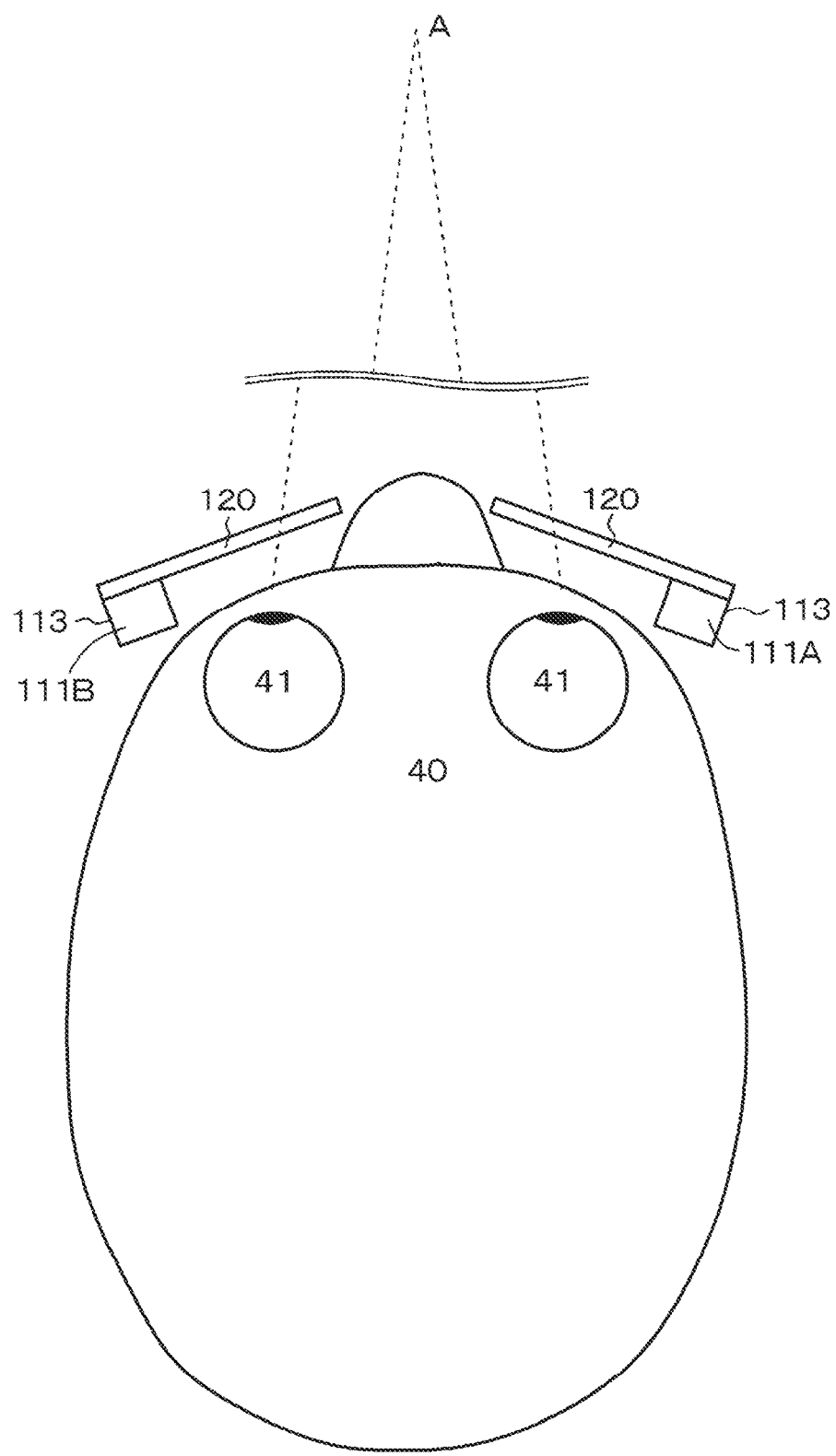
FIG. 19 is a diagram of a state of the display device of Embodiment 12 mounted on the head of an observer viewed from above (however, only the image display device is shown and a frame thereof is not illustrated).

Embodiment 12 is a modification of the display devices of Embodiments 1 to 11, specifically relates to the display devices of 1A and 1B according to the present disclosure, and more specifically relates to a display device displaying subtitles (subtitle display device). FIG. 18 schematically shows, for example, propagation of light in the light guide plate constituting the image display device of the display device of Embodiment 12. Furthermore, FIG. 19 shows a diagram of a state of the display device of Embodiment 12 mounted on the head of an observer viewed from above (however, only the image display device is shown and a frame thereof is not illustrated), and FIGS. 20 and 21 show conceptual diagrams of states in which the display device of Embodiment 12 is being used. In addition, FIG. 22 shows a conceptual diagram of the control device 18 constituting the display device of Embodiment 12, and FIG. 23A shows an example of an image signal in Embodiment 12.

Note that, in Embodiment 12 or Embodiments 13 to 19 to be described below, a point of the optical device 120, 320, or 520 on which a center incident light beam CL incident perpendicular to the optical device 120, 320, or 520 among light beams (center light beams), which are output from the center of the image forming device 111 or 211 and then pass through a node on the image forming device side of the optical system 112 or 254, is incident is set to be an optical device center point O, an axial line which passes through the optical device center point O and is parallel to the axial line direction of the optical device 120, 320, or 520 is set to be an X axis, and an axial line which passes through the optical device center point O and coincides with the normal line of the optical device 120, 320, or 520 is set to be a Y axis. Note that the center point of the first deflecting unit 130 or 330 is the optical device center point O.

In addition, an imaging device (not illustrated) having a solid-state image sensor formed by a CCD or CMOS sensor and a lens (these are not illustrated) are mounted on a center portion of the front portion 11 using an appropriate mounting member (not illustrated). A signal output from the imaging device is transmitted to the image forming devices 111A and 211 via a wiring (not illustrated) extending from the imaging device.

The wiring (a signal line, a power source line, or the like) 15 is connected to the control device (control circuit) 18 as described above. Image signals (for example, character data) are wirelessly transmitted to the control device 18. In addition, the control device 18 processes the image signals (character data) for image display (for example, display of subtitles). The control device 18 can be constituted by known circuits.

As shown in FIG. 22, the control device 18 is constituted by a command reception circuit 18A that receives an image signal (including a command) wirelessly transmitted via a character data wireless transmission device 32 that will be described below, a signal processing circuit 18B that receives the image signal from the command reception circuit 18A to perform various kinds of analyses and processes, a timing adjustment circuit 18C that receives various kinds of data from the signal processing circuit 18B and transmits various signals, and a transmission circuit 18D that receives the various kinds of signals from the timing adjustment circuit 18C to adjust a timing at which an image from a display position is reproduced and transmits image signals to each of the image forming devices 111 (111A and 111B) and 211 via the wiring 15. The control device 18 further includes a timing generation circuit 18E that generates timing signals for displaying received image signals, and the timing adjustment circuit 18C achieves adjustment of timings based on various timing clocks and timing signals from the timing generation circuit 18E.

As shown in FIG. 23A, an image signal includes, for example, "SYNC" that is a command start flag, "MSG_ID" that is a command type specification ID, "LENG" that is data indicating the length of the entire command, "POS_X" that is data indicating a display start position of an image in the horizontal direction, "POS_Y" that is data indicating a display start position of the image in the vertical direction, "DATA" that is data of an image to be displayed, and "FCS" that is for command error checking.

Display of an image (for example, subtitles) in the display device of Embodiment 12 will be described below.

Specifically, in the display device of Embodiment 12, by controlling an image signal (character data, an input image signal, input image data) to the image forming device 111 or 211 constituting at least one of the image display devices (in Embodiment 12, two image display devices 100, 200, 300, 400, or 500 for the right eye and the left eye), a convergence angle is adjusted according to an observation position of an observer, or a position of an image displayed in the optical device constituting at least one of the image display devices is adjusted according to the observation position of the observer. Note that, in Embodiment 12, both the adjustment of the convergence angle and the adjustment of the position of the image according to the observation position of the observer are performed, but only one of them may be performed.

To be specific, an image signal is transmitted to the control device 18 in a wireless manner (or a wired manner in some cases). Then, the control device 18 processes the image signal for display of the image, and based on data "DATA," the image (subtitles) is generated in the image forming device 111 or 211. The image finally reaches both eyes of the observer (spectator) wearing the display device via the optical system 112 or 254 and the optical device 120, 320, or 520.

In addition, the image displayed in the optical device 120, 320, or 520 is moved right and left or up and down and rotated via the display device 18, specifically, using a switch (not shown) arranged in the display device 18 so that the images displayed by the image display device 100, 200, 300, 400, or 500 for the left eye and the right eye coincide with (or are superimposed on) each other in a desired position (for example, in a desired position on a stage or on a screen). In other words, the image displayed in the optical device 120, 320, or 520 is moved right and left or up and down and rotated so that, for example, the point "A" in FIG. 19 is located in the desired position. In this manner, the image signal is controlled through the operation of the switch arranged in the control device 18. In other words, a display position correction signal is generated in the control device 18, and the display position correction signal is added to the image signal.

FIG. 24A schematically shows a state of the images displayed by the image display devices 100, 200, 300, 400, or 500 for the left eye and the right eye deviated from the desired position to the right or left, FIG. 24B schematically shows a state thereof deviated upward or downward, and FIG. 24C schematically shows a state thereof rotated and deviated. Here, the drawings on the right sides of FIGS. 24A, 24B, and 24C show images displayed by the image display device 100, 200, 300, 400, or 500 for the right eye, and the drawings on the left sides of FIGS. 24A, 24B, and 24C show images displayed by the image display device 100, 200, 300, 400, or 500 for the left eye. In addition, the dotted lines in the drawings on the right sides of FIGS. 24A, 24B, and 24C indicate superimposition of the image displayed by the image display device 100, 200, 300, 400, or 500 for the left eye.

Here, in order to move the image (characters) in the horizontal direction, a signal changing the position of the image based on the image signal in the horizontal direction by +i pixels or −i pixels may be generated in the control device 18 as the display position correction signal. Alternatively, a signal changing a timing of a horizontally synchronized signal by +i pixels or −i pixels may be generated in the control device 18. In addition, in order to move the image (characters) in the vertical direction, a signal changing the position of the image based on the image signal in the vertical direction by +j pixels or −j pixels may be generated in the control device 18 as the display position correction signal, or a signal changing a timing of a vertically synchronized signal by +j pixels or −j pixels may be generated in the control device 18. In other words, such generation can be realized by delaying or advancing a timing of a memory reading position of an image, or by deviating a timing of the vertically synchronized signal or the horizontally synchronized signal. Furthermore, in order to rotate the image (characters), a signal for rotating the image based on a known method may be generated in the control device 18 as the display position correction signal.

In addition, the display position correction signal when the images displayed by the image display devices 100, 200, 300, 400, or 500 for the left eye and the right eye coincide with (are superimposed on) each other in the desired position is stored in the control device 18. Such an operation can be performed using, for example, a button (not shown) provided in the control device 18. In addition, the operation may be performed once, for example, after an observer sits down. In addition, in the operation, a type of a test pattern that is a combination of, for example, the line extending in the horizontal direction, the line extending in the vertical direction, and the line extending in the oblique direction as shown in FIGS. 24A, 24B, and 24C may be used. In this manner, the position of the image displayed in the optical device 120, 320, or 520 constituting at least one of the image display device 100, 200, 300, 400, or 500 can be controlled, and accordingly both positions of the two images in the two image display devices 100, 200, 300, 400, or 500 can be adjusted. In other words, both the adjustment of the convergence angle and adjustment of the positions of the images according to the observation position of the observer can be performed.

The display position correction signal is stored in the control device (control circuit or control unit) 18 as described above. The image signal (character data) reproduced by, for example, a character data reproduction device 31 or an image data and character data reproduction device 31' having a known configuration is wirelessly transmitted to the control device 18 via the character data wireless transmission device 32. Start of the transmission of the image signal may be performed, for example, according to the progress of a movie or the like, or according to the progress of a play or the like, based on a predetermined schedule or time distribution through an operation of an operator or under control of a computer or the like. In addition, the control device 18 processes the image signal for display of an image. In other words, the display position correction signal is added to the image signal (specifically, the data "POS_X" or "POS_Y") in the control device 18. In this manner, by controlling the image signal to the image forming device 111 or 211 constituting at least one of the image display devices (in Embodiment 12, the two image display devices 100, 200, 300, 400, or 500 for the right eye and the left eye) based on the distance from the display device to an observation object, in other words, by adjusting the distance (gap) between two images obtained by the two image display devices 100, 200, 300, 400, or 500 for the right eye and the left eye in the horizontal direction, the convergence angle corresponding to the distance from the display device to the observation object can be adjusted. To be specific, the convergence angle may be smaller, for example, as the distance from the display device to the observation object becomes longer. In addition, by moving the two images obtained by the two image display devices 100, 200, 300, 400, or 500 for the right eye and the left eye in parallel, the position of the image displayed in the optical device 120, 320, or 520 constituting the image display device 100, 200, 300, 400, or 500 can be adjusted according to the observation position of the observer. To be specific, for example, when the observation object is positioned at a certain angle with respect to the display device in the vertical direction (for example, like the state in which an observer looks up at the screen when sitting in the front row in a movie theater), and the observer sees the displayed image (subtitles) superimposed on the image of the outer field (observation object) by moving the position of the image upward, the image can be easily recognized without causing the focused image of the outer field to be farther away from the display position of the image. Alternatively, performance progresses based on a scenario made in advance in a movie or a play. Thus, it is possible to predict the image (observation object) of the screen or the stage when an image is superimposed thereon. In addition, based on a sound generation source such as a character speaking his or her part, it is possible to predict a position of the character or the like on the screen or the stage. For this reason, based on such prediction, by adjusting the position of the image displayed in the optical device 120, 320, or 520 constituting the image display device 100, 200, 300, 400, or 500 according to the observation position of the observer, the image (subtitles) can be displayed in a position of the optical device 120, 320, or 520 that has good visibility.

Alternatively, in addition to the image signal to the image forming device 111 or 211, observation position information (distance information) from the observer (display device) to the observation object may be configured to be transmitted to the display device from outside. An example of a conceptual diagram of a format of such a signal is shown in FIG. 25A. In addition, in such a configuration, a signal changing the position of an image based on the image signal by +k pixels or −k pixels in the horizontal direction (display position correction signal or convergence angle control signal) may be generated in the control device 18 based on the observation position information (distance information). When the position of the image in the horizontal direction is changed by 1 pixel, a degree of the convergence angle to be changed or a degree of a virtual image distance to be changed may be investigated in advance and the relationship may be stored in the control device 18. Note that a display position correction signal for changing the position of the image in the horizontal direction by +i pixels or −i pixels, a display position correction signal for changing the position of the image in the vertical direction by +j pixels or −j pixels, and further a display position correction signal for rotating the image can be configured to be added to the signal and then transmitted to the image forming device 111 or 211. In this manner, by moving two images obtained by the two image forming devices 100, 200, 300, 400, or 500 for the right eye and the left eye based on the observation position information (or a left or right image shift amount), a virtual image can be disposed in a desired position. In other words, by adjusting the distance (gap) between the two images in the horizontal direction displayed in the optical device 120, 320, or 520 constituting the image display device 100, 200, 300, 400, or 500, the convergence angle corresponding to the distance from the display device to the observation object can be adjusted. In addition, by moving the two images obtained by the two image display devices 100, 200, 300, 400, or 500 for the right eye and the left eye in parallel, a virtual image can be disposed in a desired position. In other words, the positions of the images displayed in the optical device 120, 320, or 520 constituting the image display device 100, 200, 300, 400, or 500 can be adjusted according to the observation position of the observer.

Based on FIG. 25B, adjustment of the convergence angle corresponding to the distance from the display device to the observation object will be described. Here, a virtual image distance of an image (character) based on an image signal displayed by the image display device is set to be "a" and a convergence angle (in the X axis direction) of the image at that time is set to be "α" In addition, "γ" is set to be a convergence angle of the image when the virtual image distance a is lengthened by "c" and "β" is set to be a convergence angle of the image when the virtual image distance a is shortened by "b." Furthermore, the distance between the right and left pupils is set to be "D." Here, if D=61.5 mm and a=4000 mm are set, α=53 minutes (53′).

One pixel in the image forming device is defined to be 3 minutes (3′). Here, if an image display position is set to be deviated from a predetermined position by one pixel in the horizontal direction to the inner side, β=56 minutes (56′) and b=225 mm. On the other hand, when the image display position is set to be deviated from the predetermined position by one pixel in the horizontal direction to the outer side, γ=50 minutes (50′) and c=228 mm. In addition, when a=8000 mm, if the image is shifted by one pixel, the virtual image distance can be shifted by about 1 m.

As described above, by deviating the image display position from the predetermined position by a desired number of pixels in the horizontal direction, the convergence angle can be adjusted. In other words, by controlling the image signal to the image forming device 111 or 211 constituting the two image display devices 100, 200, 300, 400, or 500 for the right eye and the left eye based on the display position correction signal, the convergence angle corresponding to the distance from the display device to the observation object can be accurately adjusted, and as a result, the distance between the observation object to the observer (spectator) can be equal or as close to equal as possible to the virtual image distance of the image (subtitles) displayed by the image display device, and thus the observer (spectator) who views the observation object can view the image naturally displayed by the image display device without altering or changing the focus much.

Note that it is desirable for the virtual image distance a and the convergence angle α to be in the following relationship.

$$a \times \tan(\alpha/2) = D/2$$

Here, D (unit: mm) satisfies, for example, 56≤D≤74. When the value of α is 0, the value of "a" is infinite. However, the virtual image distance a and the convergence angle α are not independently computed according to a movement speed of the observer, and only the correspondence relationship of one of them is defined, with the other being automatically decided accordingly.

A position measuring unit (distance measuring device) that measures the distance from the display device to the observation object is further included, and the position measuring unit (distance measuring device) may obtain observation position information (distance information). As the position measuring unit (distance measuring device), for example, an imaging device may be set to be an imaging device with an autofocusing function (imaging device having a passive type distance measuring device). Alternatively, a button or a switch may be provided in the control device 18 to manually set the distance from the display device to the observation object. In this configuration, a proper display position correction signal is generated in the control device 18 and the display position correction signal is added to the image signal. Alternatively, a display device in which the convergence angle, the position of an image (subtitles) displayed in the optical device, a virtual image position, and a virtual image distance are set according to the position in which an observer (spectator) sits in a cinema or a theater in advance may be loaned to an observer (spectator). In such a configuration, a proper display position correction signal is decided in advance and stored in the control device 18, and the display position correction signal is added to the image signal.

When the display device is used in, for example, a theater, descriptive text for describing the content, the progress, the background of a play or the like may be displayed in the display device as images, and a virtual image distance is required to be a desired distance. In other words, according to a position in which a theatergoer sits, the distance between the observation object and the observer (spectator) and the virtual image distance of the image (for example, characters) displayed by the image display device are changed. Thus, according to the position of the theatergoer, it is necessary to optimize the virtual image distance, and in the display device of Embodiment 12, the convergence angle corresponding to the distance from the display device to the observation object is optimized as described above, and thus the virtual image distance is optimized according to the position of the theatergoer. In addition, there are cases in which the virtual image distance is desired to be changed depending on scenes, and such cases can be easily handled by transmitting observation position information (distance information) from the observer (display device) to the observation object to the display device from outside.

Alternatively, an observer (a spectator or a user) can set a virtual image distance to be a desired distance or set a virtual image position to be a desired position. To be specific, a virtual image can be arranged at a desired distance or position when a switch or a button is disposed in the control device 18 and an observer operates it. When a background is changed, for example, a virtual image distance and a virtual image position can be arbitrarily changed. The operation can be automatically performed, for example, based on an image signal, or may be appropriately performed by an observer during observation of an observation object, and the operation is specifically an operation of adding a display position correction signal and a convergence angle control signal to the image signal in the control device 18. Alternatively, it is an operation of causing a movement device 40 that will be described later to be activated. Then, accordingly, the image (for example characters such as subtitles) can be clearly read without causing a spectator to move his or her line of sight much, and thus images (for example, subtitles or the like and to be specific, for example, subtitles written in another language or the like) suitable for each spectator can be easily displayed simultaneously.

An image signal is digitalized data, and created in advance before display. An image display position may be set to be a position in which view of an observation object is not obstructed. In addition, display of an image is wirelessly transmitted to the control device 18 by the character data wireless transmission device 32 specifically, for example, based on a predetermined schedule or time distribution, according to the progress of an observation object, or under control of a computer (not shown) provided in the character data reproduction device 31 or the image data and character data reproduction device 31' as described above.

With regard to the display device of Embodiment 12, when luminance data or chromaticity data relating to characters to be displayed and character data are included as an image signal, it is possible to reliably prevent difficulty of recognizing the characters of the image (for example, subtitles or the like) due to a background of the characters. Note that, as the luminance data, luminance data corresponding to luminance of a predetermined region (for example, a region corresponding to one third of the lower part of an entire stage) including an observation object (a character, a background, or the like) viewed through the image display device can be exemplified. In addition, as the chromaticity data, chromaticity data corresponding to chromaticity of a predetermined region that includes the observation object viewed through the image display device can be exemplified. Particularly, it may be difficult to satisfactorily observe subtitles, a screen, a stage, or the like when balance between brightness of a screen or a stage viewed over a semi-transmissive type (see-through type) optical device and brightness and the color of characters displayed in the optical device is not in a certain range, but brightness and the color of the characters to be displayed can be matched with the screen, the stage, or the like, and then the characters can be satisfactorily recognized. In other words, it is possible to reliably prevent the difficulty of recognizing the characters for describing the observation object or the like viewed by the observer (spectator) due to a background of the characters. In addition, when the display device of Embodiment 12 is used, for example, characters relating to an observation object (for example, descriptive text relating to a situation of a background of a play, descriptive text of a character, dialogue between characters, or the like) may be displayed by the image display device 100, 200, 300, 400, or 500 at a proper timing while watching a play. Specifically, for example, character data may be transmitted to the image display device 100, 200, 300, 400, or 500 according to the progress of the play, through an operation of an operator, or under control of a computer or the like, and the characters may be displayed by the image display device 100, 200, 300, 400, or 500.

Furthermore, the eyes are said to feel fatigue when a virtual image position is fixed. This is because movements of the eyeballs are reduced when the focus is fixed. For this reason, by appropriately changing a virtual image distance or moving a virtual image position, the effect of reducing fatigue of the eyes is obtained. In other words, a virtual image position formed by two optical devices, or the distance from the two optical devices to a virtual image formed by the two optical devices (virtual image distance) may be changed according to the passage of time. Specifically, for example, the position of an image in the horizontal direction may be changed once every five minutes, for example, by +2 pixels in the image forming device, for example, for one minute, and then the position may return to the original one.

Embodiment 13

Embodiment 13 relates to the display device of 1C according to the present disclosure. Since a basic configuration and structure of the display device of Embodiment 13 are the same as those of the display device of Embodiment 12, detailed description thereof will be omitted.

In the display device of Embodiment 13, after a predetermined time elapses from input of an image signal to the image forming device, image formation in the image forming device is stopped. In order to stop the image formation in the image forming device, in other words, in order to transition to a power save mode or the like in the display device, a signal indicating an image display time in the image display device or a signal instructing stop of image formation in the image forming device is added to an image signal.

An example of such an image signal of Embodiment 13 is shown in FIG. 23B, and data "TIME" indicating an image display time that is a signal indicating the image display time in the image display device is added to the image signal of Embodiment 12 shown in FIG. 23A. In the control device 18, an image (subtitles) is displayed in the image display device for the length of time (T seconds) of the data "TIME," and then the display of the image (subtitles) in the image display device is stopped, and by further operating only the command reception circuit 18A, transition to the power save mode for stopping operations of the signal processing circuit 18B, the timing adjustment circuit 18C, the transmission circuit 18D, and the timing generation circuit 18E is performed based on a command from the command reception circuit 18A. In addition, when the command reception circuit 18A receives an image signal again, the operations of the signal processing circuit 18B, the timing adjustment circuit 18C, the transmission circuit 18D, and the timing generation circuit 18E are resumed based on a command from the command reception circuit 18A.

As described above, in the display device of Embodiment 13, after a predetermined time elapses from input of an image signal to the image forming device, image formation in the image forming device is stopped. In other words, since transition to the power save mode or the like is performed in the display device after the elapse of the predetermined time, the problem of waste of electric power in the display device does not occur.

Embodiment 14

Figure 26:
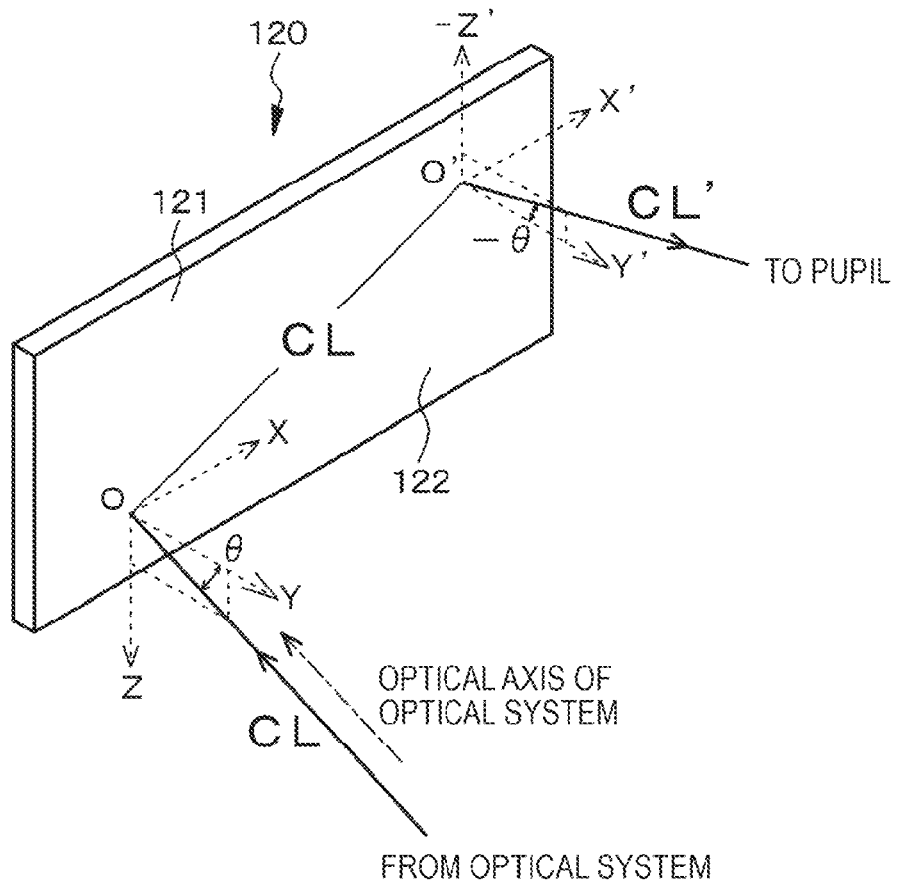
Figure 26B:
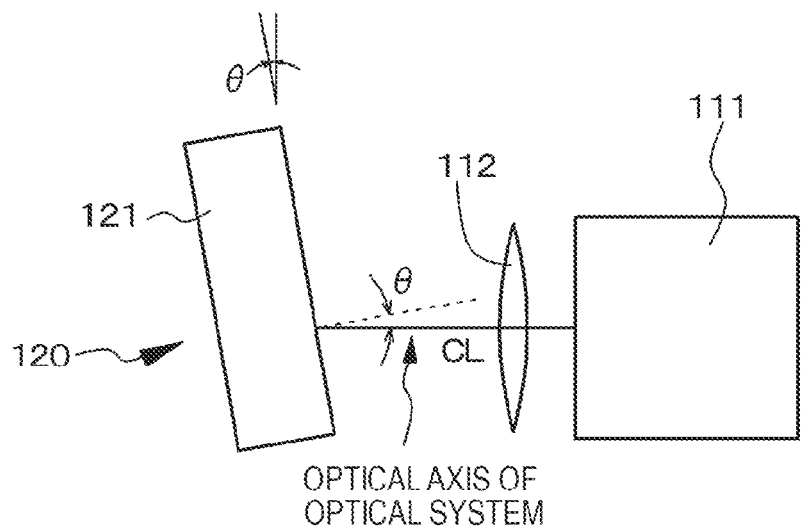
Figure 27:
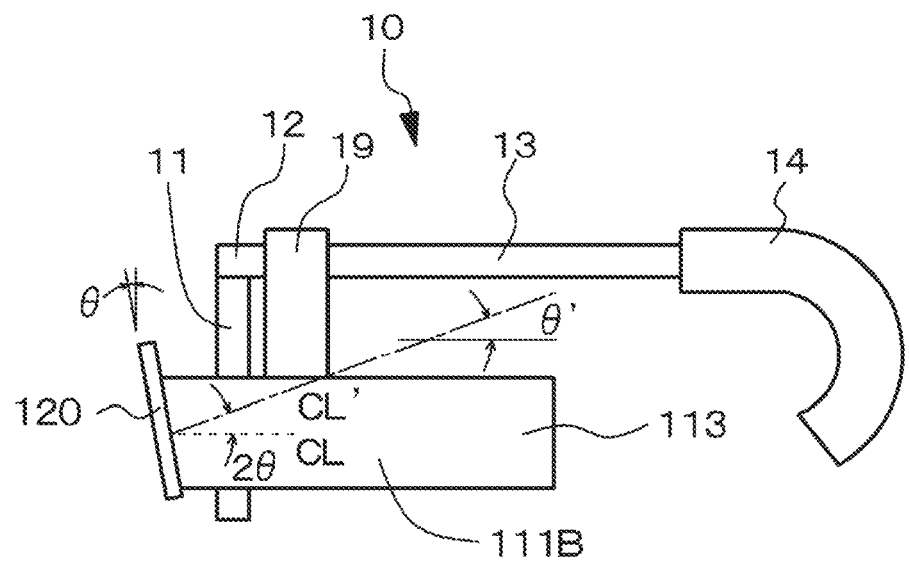
FIG. 27 is a schematic diagram of the display device of Embodiment 14 viewed from a side.

Embodiment 14 is a modification of the image display devices of Embodiments 12 and 13. With regard to the display device of Embodiment 14, conceptual diagrams showing an arrangement state of the light guide plate and the like constituting the image display device are shown in FIGS. 26A and 26B, and a schematic diagram of the display device of Embodiment 14 as viewed from a side is shown in FIG. 27. Note that, in FIG. 27, the dimmer and the light shielding member are not illustrated.

As shown in FIG. 18, with regard to Embodiments 12 and 13, the center incident light beam CL which is output from the center of the image forming device 111 or 211 and passes through the node on the image forming device side of the optical system 112 or 254 is designed to vertically collide with the light guide plate 121 or 321 in the image display device 100 or 300. In other words, the center incident light beam CL is designed to be incident on the light guide plate 121 or 321 at an incidence angle of 0 degrees. In addition, in this case, the center of a displayed image coincides with the first face 122 or 322 of the light guide plate 121 or 321 in the vertical direction.

That is, in such an image display device represented by the image display device 100, as illustrated in FIG. 18, the center incident light beam CL output from the center of the image forming device 111 or 211 on the optical axis of the collimating optical system 112 is converted into approximately parallel light by the collimating optical system 112 and then incident vertically on the first face (incidence face) 122 of the light guide plate 121. Then, the parallel light propagates in a propagation direction A while being totally reflected between the first face 122 and the second face 123 by the first diffracting unit 130. Subsequently, the center incident light beam CL is reflected and diffracted by the second deflecting unit 140 and output vertically from the first face 122 of the light guide plate 121, and reaches the pupil 21 of the observer (spectator).

Figure 29:
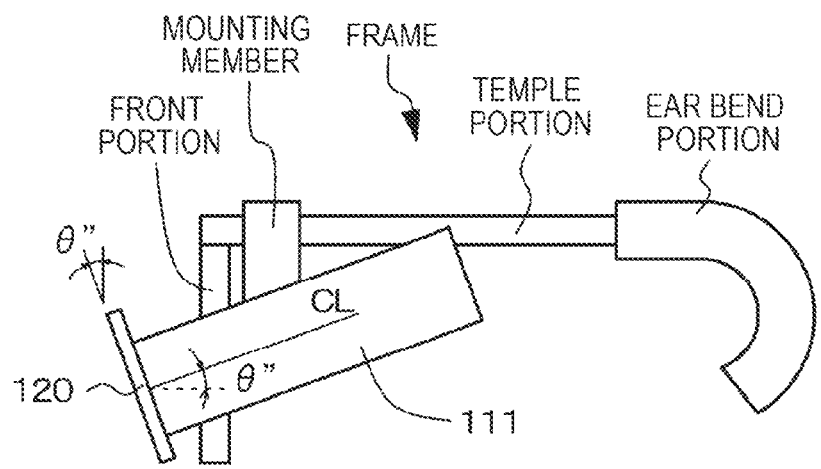
FIG. 29 is a schematic diagram of a head mounted display of the past viewed from a side in comparison to Embodiment 12.

In a see-through type display device, it is preferable to shift the optical device 120, 320, or 520 to be arranged below the line of sight of the observer in the horizontal direction (the horizontal-direction line of sight of the observer) so that the optical device 120, 320, or 520 does not obstruct the observer viewing an observation object located in the horizontal direction. In such a case, the entire image display device 100 or 300 is arranged below the horizontal-direction line of sight of the observer. In such a configuration, as illustrated in FIG. 29, it is necessary to incline the entire image display device 100 by an angle θ", and the angle θ" by which the image display device 100 can be inclined may be limited, or the degree of freedom in design may decrease from the relationship with the mounting portion (temple portion) of the eyeglass type frame to be mounted on the head of the observer. Therefore, it is more preferable to form the arrangement of a high degree of freedom and an image display device having a high degree of freedom in design without obstructing the horizontal-direction line of sight of the observer.

In Embodiment 14, the center incident light beam CL is configured to intersect with the X-Y plane at an angle (θ) other than 0 degrees. Furthermore, the center incident light beam CL is configured to be included in the Y-Z plane. Furthermore, in Embodiment 14 or Embodiment 15 to be described later, the optical axis of the optical system 112 or 254 is included in the Y-Z plane, and intersects the X-Y plane at an angle θ, specifically, an angle other than 0 degrees (refer to FIGS. 26A and 26B). In addition, in Embodiment 14 or Embodiment 15 to be described later, when the X-Y plane is assumed to coincide with a horizontal plane, the angle θ at which the center incident light beam CL intersects the X-Y plane is an elevation angle. In other words, the center incident light beam CL faces the X-Y plane from the lower side of the X-Y plane and collides with the X-Y plane. Then, the X-Y plane intersects the vertical plane at an angle θ, specifically, an angle other than 0 degrees.

Figure 28:
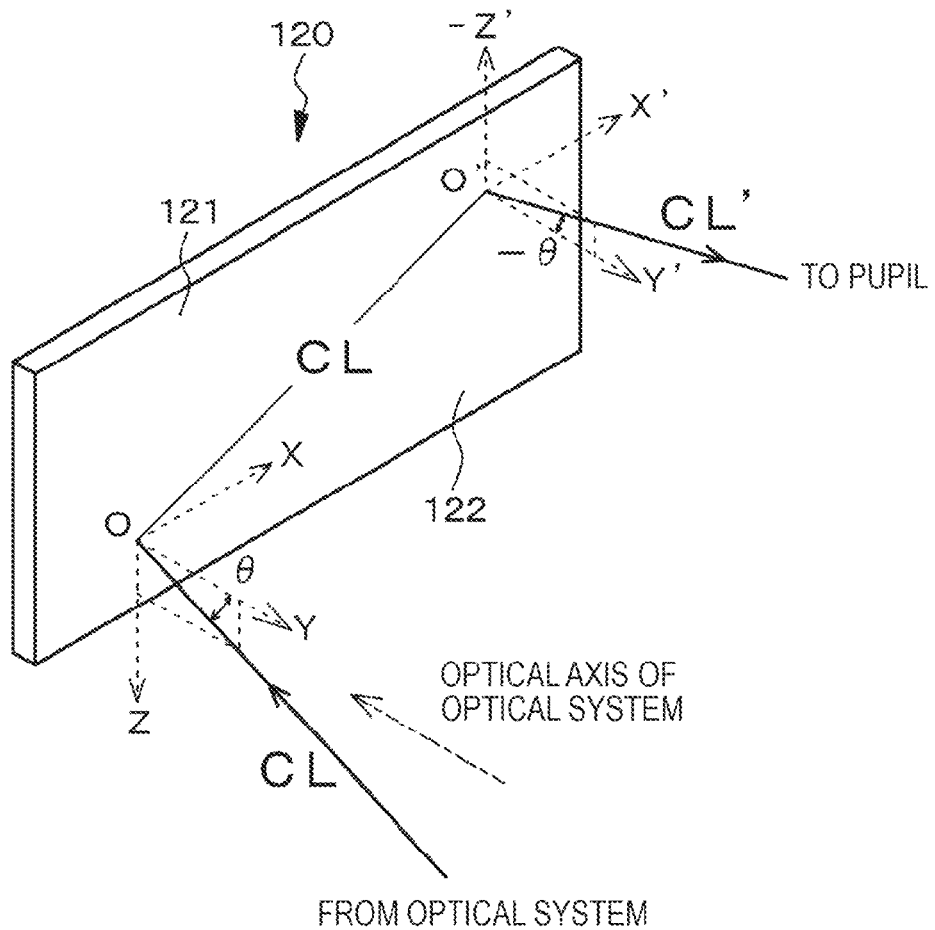

In Embodiment 14, θ=5 degrees is set. To be more specific, in such a configuration, the center incident light beam CL (indicated by the dotted line in FIG. 27) is included in the horizontal plane. In addition, the optical device 120, 320, or 520 is inclined with respect to the vertical plane by the angle θ. In other words, the optical device 120, 320, or 520 is inclined with respect to the horizontal plane by an angle (90−θ) degrees. In addition, a center incident light beam CL' (indicated by the dashed-dotted line in FIG. 27) output from the optical device 120, 320, or 520 is inclined with respect to the horizontal plane by an angle 2θ. In other words, when the observer views an object positioned at an infinite distance in the horizontal direction, the center incident light beam CL' output from the optical device 120, 320, or 520 and incident on the pupil of the observer forms a depression angle θ' (=2θ) (refer to FIG. 27). The angle formed by the center incident light beam CL' and the normal line of the optical device 120, 320, or 520 is θ. In FIG. 26A or FIG. 28A to be described later, a point at which the center incident light beam CL' output from the optical device 120, 320, or 520 is indicated by "O'" and axial lines parallel to the X axis, the Y axis, and the Z axis passing through the point O' are indicated by an X' axis, Y' axis, and Z' axis, respectively.

With regard to the image display device of Embodiment 14, the center incident light beam CL intersects the X-Y plane at an angle (θ) other than 0 degrees. Here, the center incident light beam CL' output from the optical device and incident on the pupil of the observer (spectator) forms the depression angle θ' and the following relationship is established.

θ'=2θ

On the other hand, in the example shown in FIG. 29, when the same depression angle is to be obtained, it is necessary to incline the entire image display device by an angle θ" and here, the relationship between θ" and θ is:

θ"=2θ, and ultimately, in the example shown in FIG. 29, the optical device should be inclined with respect to the vertical plane by 2θ. On the other hand, in Embodiment 14, the optical device may be inclined with respect to the vertical plane by θ, and the image forming device may be horizontally maintained. Thus, there is little limitation on a mounting angle of the image display device when the image display device is mounted on the mounting portion of the eyeglass-shaped frame, and a high degree of freedom in design can be obtained. In addition, since the inclination of the optical device with respect to the vertical plane is smaller than in the example shown in FIG. 29, the phenomenon in which external light is reflected by the optical device and incident on the pupil of the observer (spectator) seldom occurs. For this reason, an image with higher quality can be displayed.

Since the display device of Embodiment 14 has the same configuration and structure as the display devices of Embodiments 12 and 13 except for the difference described above, detailed description thereof will be omitted.

Embodiment 15

Figure 28B:
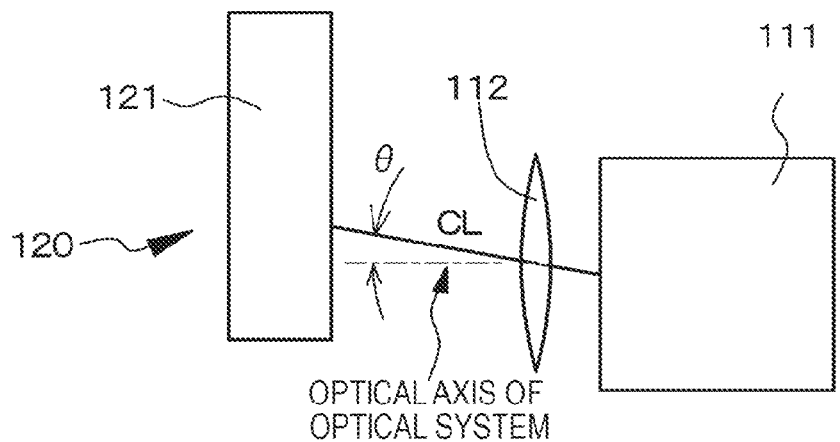

Embodiment 15 is a modification of the image display device of Embodiment 14. FIGS. 28A and 28B show conceptual diagrams showing an arrangement state of the light guide plate and the like constituting the image display device of Embodiment 15. Here, in Embodiment 15, the optical axis of the optical system (parallel light output optical system or collimating optical system) 112 is parallel to the Y-Z plane and to the X-Y plane, and passes through a position deviated from the center of the image forming device 111 or 211. By having such a configuration, the center incident light beam CL is included in the Y-Z plane and intersects the X-Y plane forming the elevation angle θ. Since the display device of Embodiment 15 has the same configuration and structure as the display devices of Embodiments 12 to 14 except for the difference described above, detailed description thereof will be omitted.

Embodiment 16

Embodiments 16 to 19 are modifications of the display devices described in Embodiments 12 to 15, and Embodiment 16 relates to the display device of 3A according to the present disclosure. Since basic configurations and structures of the display devices of Embodiment 16 or Embodiments 17 to 19 to be described later are the same as those of the display devices described in Embodiments 12 to 15, detailed description thereof will be omitted.

Figure 30:
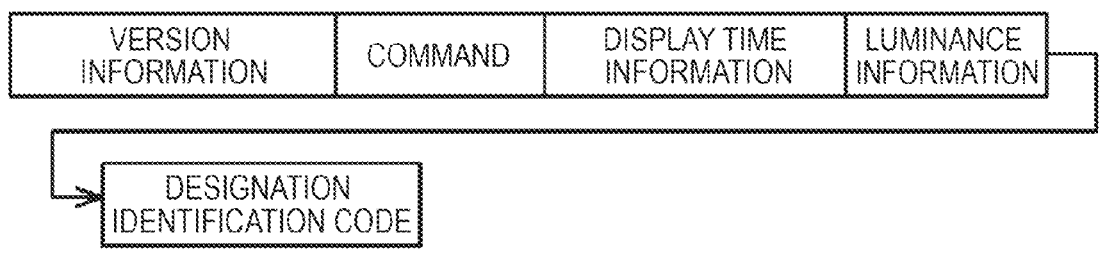
FIG. 30 is a diagram showing a concept of a file structure of data constituting a data group of Embodiment 16.

With regard to the display device of Embodiment 16, dialogue and the like of performers is displayed as subtitles by the display device in a play. Data groups are stored in a storage unit (not shown) constituted by a memory card provided in a control device 618 configured by known circuits. Here, in Embodiment 16, a data group is defined to be a collective set of character data that is image data obtained by converting strings of characters into an image by editing dialogue and the like of performers in a play, for example, scene by scene. A file form of image data (image signals) is basically arbitrary. FIG. 30 conceptually illustrates a data structure of an image signal (character data) constituting a data group. Here, a designation identification code is given to each piece of character data constituting a data group. The designation identification code is formed by, for example, numbers.

Figure 32:
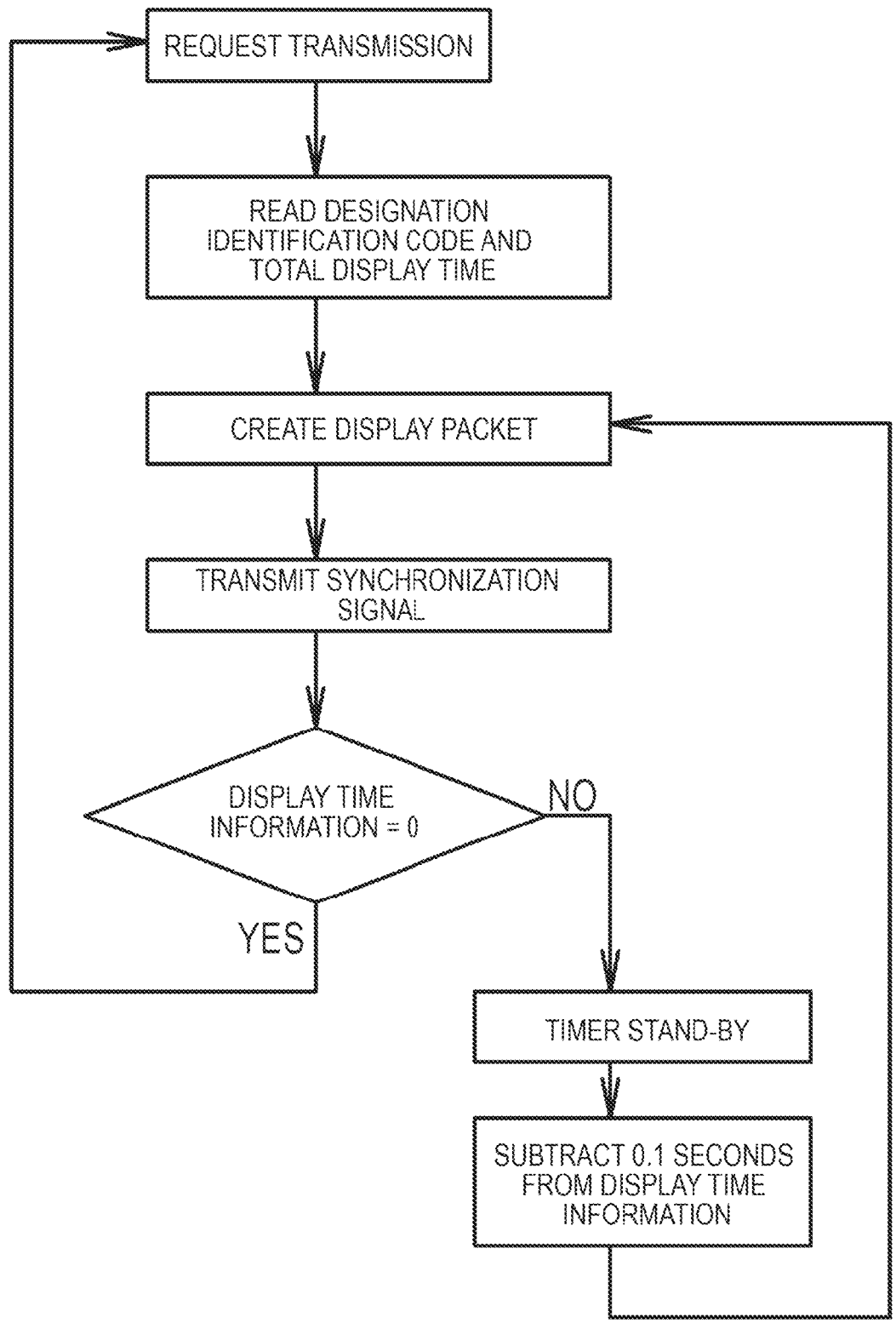
FIG. 32 is a diagram describing a flow of a transmission process performed by the transmission device of Embodiment 16.
Figure 33:
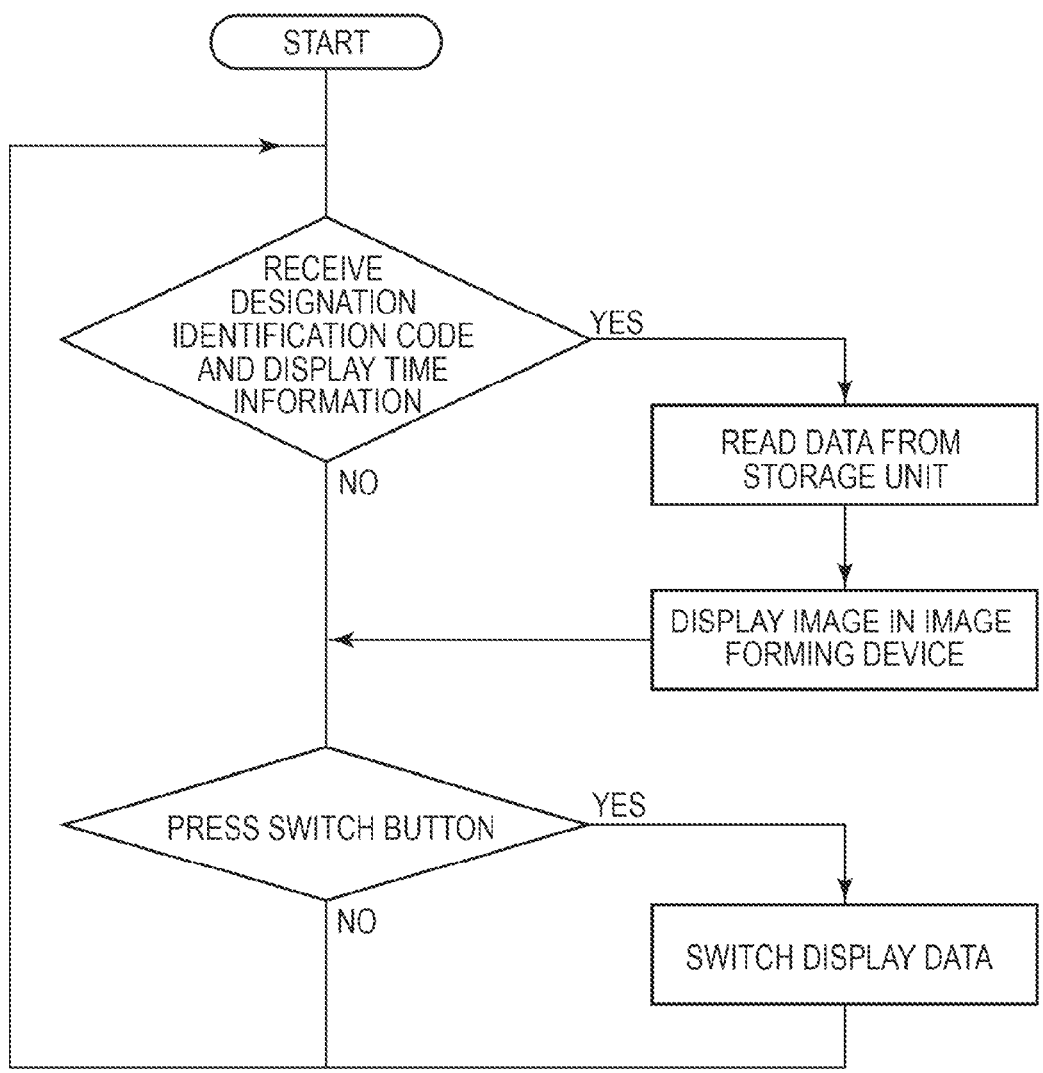
FIG. 33 is a diagram describing a flow of a reception process performed by the display device of Embodiment 16.

FIGS. 31A and 31B respectively show a block diagram of a system configuration of a transmission device (transmission unit) 651 and a block diagram of a system configuration of the control device 618 of the display device of Embodiment 16, FIG. 32 shows a diagram for describing a flow of a transmission process performed by the transmission device 651 of Embodiment 16, and FIG. 33 shows a diagram for describing a flow of a reception process performed by the control device 618 of Embodiment 16.

Figures 34, 34A, 34B:
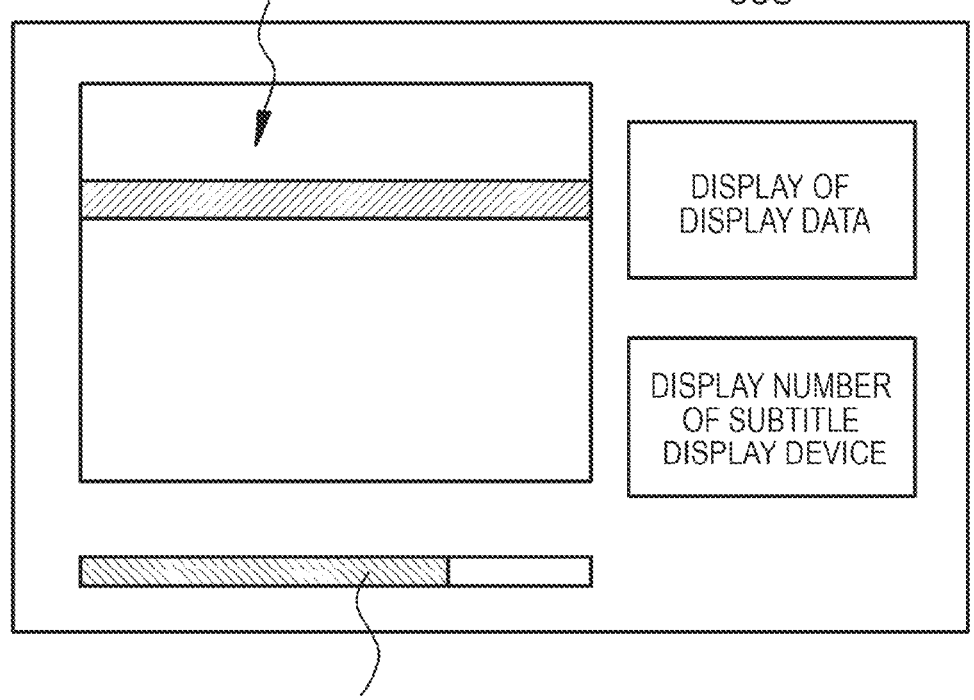
FIG. 34A and FIG. 34B are diagrams schematically showing designation identification numerals, data groups, a plurality of pieces of data constituting the data groups, and entire display times which are the content displayed in the display device constituting the transmission device in Embodiment 16.

The transmission device 651 constituted by know circuits includes, for example, a personal computer 652 and a display device 653 constituted by a known liquid crystal display device. In addition, the display device 653 shows, for example, a designation identification code, a plurality of pieces of character data constituting a data group, a total display time of each piece of character data, and luminance information as shown in FIGS. 34A and 34B. Note that the display device 653 is provided with a region in which display data (different size display data or different language display data) constituting the character data is displayed, and also a region in which the number of display devices that receive various kinds of information from the transmission device 651 is displayed. Furthermore, a region in which a ratio of display time information $T_{Inf}$ to the total display time $T_{total}$ is displayed using a "crossbar" is also provided. In a "display region for a designation identification code and the like," the portion with slashes indicates a line on which a cursor has been placed and a display color has been inverted.

In addition, right before dialogue of performers starts in a play, a designation identification code and display time information are transmitted to the control device 618 from outside at a predetermined time interval. Note that a time corresponding to the display time information corresponds to a predetermined time in the display device of 1C according to the present disclosure or the display device of 3A according to the present disclosure. To be specific, for example, as an operator operates a pointing device or a keyboard (not shown) included in the personal computer 652 and by designating the designation identification code, the plurality of pieces of character data constituting the data group, and the line displaying the total display time of each piece of the character data displayed in the display device 653, the personal computer 652 reads the designated designation identification code and total display time, obtains the display time information, creates display packets, and then transmits the designation identification code and display time information toward the control device 618 of the display device together with a synchronization signal. Note that, as the pointing device, for example, a joy stick, a pointing stick (trackpoint), a touch pad, a touch panel, a stylus pen, a data glove, a track ball, a pen tablet, a mouse, a light pen, and a joypad can be exemplified.

To be specific, as described above, the display time information $T_{Inf}$ can be expressed as follows using the total display time $T_{total}$ and a predetermined time interval $T_{int}$.

$$T_{Inf}(m)=T_{total}-(m-1)\times T_{int}$$

In addition, the designation identification code and the display time information $T_{Inf}$ are transmitted to the control device 618 from outside (the transmission device 651) at the predetermined time interval $T_{int}$. For example, when the elements are defined as follows:

$$T_{total}=10.0 \text{ seconds, and}$$

$$T_{int}=0.1 \text{ seconds,}$$

the display time information $T_{Inf}(m)$ when the designation identification code and the display time information are transmitted to the control device 618 from outside (the transmission device 651) a first time (m=1) is as follows:

$$T_{Inf}(1)=10.0 \text{ seconds.}$$

In the transmission device 651, whether or not $T_{Inf}=0$ (seconds) has been satisfied is investigated, and when $T_{Inf}$ is not 0 seconds, $T_{Inf}$ is reduced by $T_{int}$ (specifically, 0.1 seconds) as timer stand-by, and after $T_{int}$ (specifically, 0.1 seconds) elapses, the designation identification code and the display time information $T_{Inf}(2)$ are transmitted again with $T_{Inf}(2)=9.9$ seconds. This process is repeated until $T_{Inf}=0$ (seconds) is satisfied.

When the control device 618 receives the designation identification code and a data identification code, the control device reads character data which has codes coinciding with the transmitted designation identification code and data identification code coincide from the storage unit. Then, for the time corresponding to the transmitted display time information $T_{Inf}$, an image based on the character data is displayed in the image forming device 111 or 211. Here, when display of the image is started in the image forming device 111 or 211, even if the same designation identification code and different display time information $T_{Inf}$ are transmitted to the control device 618 from outside (the transmission device 651) thereafter, the control device 618 ignores the designation identification code and the display time information $T_{Inf}$ and continues displaying the image. In such an operation, in the control device 618, a flag (reception completion flag) may be set. On the other hand, when the control device 618 fails to receive the designation identification code and/or the display time information $T_{Inf}$ from the transmission device 651 from the first time to the $(m'-1)^{th}$ time for any reason and then the control device 618 succeeds in receiving the designation identification code and display time information $T_{Inf}(m')$ from the transmission device 651 the $m'^{th}$ time for the first time, an image based on the character data is displayed in the image forming device 111 or 211 for the time of:

$$T_{Inf}(m')=T_{total}-(m'-1)\times T_{int}$$

As described above, in Embodiment 16, even when the control device 18 fails to receive the designation identification code and/or the display time information transmitted from outside, reception of the designation identification code and the display time information can be attempted again or repeatedly. Therefore, the designation identification code and the display time information can be reliably received. As a result, even when a plurality of display devices receive designation identification code and display time information, for example, the plurality of display devices can reliably display the same image at the same time, and the problem that the display devices fail to display the image can be reliably avoided.

In Embodiment 16, an image can be further displayed in the image forming device 111 or 211 in a state in which luminance is controlled based on luminance information. To be specific, by transmitting luminance information of an image to be displayed in the optical device to the display device from outside (the transmission device 651) in addition to a designation identification code and display time information, visibility of the displayed image can be enhanced.

Note that Embodiment 16 (or the display devices of Embodiments 17 to 19 to be described later, if necessary) can be configured such that:

the storage unit included in the control device 18 stores data groups constituted by a plurality of pieces of character data for displaying images (for example, subtitles);

a data identification code is given to each piece of the character data constituting the data groups;

the control device 18 receives a designation identification code and display time information transmitted from outside at a predetermined time interval and reads character data which has codes coinciding with the transmitted designation identification code and data identification code from the storage unit; and an image is displayed in the image forming device based on the character data for a time corresponding to the transmitted display time information.

Embodiment 17

Embodiment 17 relates to the display device of 3B according to the present disclosure. The display device and the image display device described in Embodiment 16 can be applied to Embodiment 17. However, in Embodiment 17, in order to set the distance between an observation object and the display device, the control device 618 is provided with a switch button (refer to FIG. 31B) or a switch. Then, according to a seat taken by an observer (spectator), the distance from the display device to the observation object is set manually, i.e., by operating the switch button or switch. As an example, as the distance from the display device to the observation object, setting four kinds of distances including a "short distance," a "medium distance," a "long distance," and an "extremely long distance."

With regard to the display device of Embodiment 17, the storage unit included in the control device 618 stores data groups constituted by a plurality of pieces of character data and a data identification code is given to each piece of the character data constituting the data groups, as in Embodiment 16.

However, unlike in Embodiment 16, each piece of the character data includes a plurality of different size display data having different display sizes. To be specific, in Embodiment 17, as display data having different display sizes, there is image data obtained by converting a string of characters having different font sizes into an image. Note that a data structure of one piece of different size display data can be the same as that shown in FIG. 30, and a data identification code is given to each piece of the character data as in Embodiment 16.

Also in Embodiment 17, a designation identification code is transmitted to the control device 618 from outside (transmission device 651) as in Embodiment 16. Then, the control device 618 reads one piece of different size display data among a plurality of pieces of different size display data in the character data which has codes coinciding with the transmitted designation identification code and data identification code from the storage unit according to the distance between the observation object and the display device, specifically, according to the distance from the display device to the observation object set by operating the switch button or the switch provided in the control device 618, and causes an image to be displayed in the image forming device based on the one piece of different-size display data.

Also in Embodiment 17, the same image display method as in Embodiment 16 in which the designation identification code and display time information $T_{Inf}$ are transmitted to the control device 618 from outside (the transmission device 651) at a predetermined time interval $T_{int}$ and an image is displayed in the image forming device for a time corresponding to the transmitted display time information $T_{Inf}$ can be employed.

Information of the distance from the display device to the observation object can be configured to be wirelessly transmitted to the display device from outside. Alternatively, the display device can further include a distance measuring device that measures the distance from the display device to the observation object, and the information of the distance can be configured to be obtained by the distance measuring device. As the distance measuring device, for example, an imaging device may be set as an imaging device with an autofocus function (imaging device having a passive type distance measuring device).

As described above, with regard to the display device of Embodiment 17, the control device 18 reads one piece of different size display data among the plurality of pieces of different size display data in the character data which has codes coinciding with the transmitted designation identification code and data identification code from the storage unit according to the distance between the observation object and the display device and causes the image to be displayed in the image forming device based on the one piece of different-size display data, and thus imbalance between the size of the observation object seen by the eyes and the size of the image seldom occurs.

Note that the display device of Embodiment 17 can be configured such that:

the storage unit included in the control device 18 stores data groups constituted by a plurality of pieces of character data;

a data identification code is given to each piece of the character data constituting the data groups;

each piece of the character data is constituted by a plurality of pieces of different size display data having different display sizes;

the control device 18 receives a designation identification code transmitted from outside, and reads one piece of different size display data among the plurality of pieces of different size display data in the character data which has codes coinciding with the transmitted designation identification code and data identification code from the storage unit according to the distance between the observation object and the display device; and an image is displayed in the image forming device based on the one piece of different-size display data.

In addition, the display device described in Embodiment 16 and the display device described in Embodiment 17 can be combined. In other words, the display device described in Embodiment 16 can be configured such that:

each piece of the character data is constituted by the plurality of pieces of different size display data having different display sizes;

the control device 18 reads one piece of different size display data among the plurality of pieces of different size display data in the character data which has codes coinciding with the transmitted designation identification code and data identification code from the storage unit according to the distance between the observation object and the display device; and an image is displayed in the image forming device based on the one piece of different-size display data.

Embodiment 18

Embodiment 18 relates to the display device of 3C according to the present disclosure. The display device and the image display device described in Embodiment 16 can also be applied to Embodiment 18. In addition, also in the display device of Embodiment 18, the storage unit included in the control device 618 stores data groups constituted by a plurality of pieces of character data and a data identification code is given to each piece of the character data constituting the data groups as in Embodiment 16.

However, unlike in Embodiment 16, each piece of the character data is constituted by a plurality of pieces of different language display data having different display languages. For example, as a language, Chinese, Korean, English or the like can be exemplified. To be specific, in Embodiment 18, as display data having a different display language, image data obtained by converting a string of different language characters into an image is exemplified. Note that a data structure of one piece of different language display data can be the same as that shown in FIG. 30, and a data identification code is given to each piece of the character data as in Embodiment 16.

Also in Embodiment 18, a designation identification code is transmitted to the control device 618 from outside (the transmission device 651) as in Embodiment 16. Then, the control device 618 reads one piece of different language display data among the plurality of pieces of different language display data in the character data which has codes coinciding with the transmitted designation identification code and data identification code from the storage unit, and causes an image to be displayed in the image forming device based on the one piece of different language display data. The control device 618 may be provided with a switch button (refer to FIG. 31B) or a switch to manually select a display language.

As described above, with regard to the display device of Embodiment 18, the control device 18 reads one piece of different language display data among the plurality of pieces of different language display data in the character data which has codes coinciding with the transmitted designation identification code and data identification code from the storage unit, and causes an image to be displayed in the image forming device based on the one piece of different language display data, and thus the image can be easily displayed in the language that the observer (spectator) uses.

The display device described in Embodiment 16 can also be applied to Embodiment 18. To be specific, in Embodiment 18, the control device 618 reads one piece of different language display data among the plurality of pieces of different language display data in the character data which has codes coinciding with the transmitted designation identification code and data identification code from the storage unit, and causes an image to be displayed in the image forming device based on the one piece of different language display data as in Embodiment 16. In other words, the designation identification code and display time information $T_{Inf}$ are transmitted to the control device 618 from outside (the transmission device 651) at a predetermined time interval $T_{int}$, and the image is displayed in the image forming device for a time corresponding to the transmitted display time information $T_{Inf}$.

In addition, the display device of Embodiment 18 and the display device of Embodiment 17 can be combined. In other words, each piece of different size display data may be constituted by a plurality of pieces of different language display data having different display languages, and the control device 618 may select one piece of different size display data among a plurality of pieces of different size display data in character data which has codes coinciding with transmitted designation identification code and data identification code according to the distance between the display device and an observation object, read one piece of different language display data from the plurality of pieces of different language display data in one piece of different size display data from the storage unit, and cause an image to be displayed in the image forming device based on the one piece of different language display data. In addition, in this case, the designation identification code and display time information $T_{Inf}$ are transmitted to the control device 618 from outside (the transmission device 651) at a predetermined time interval $T_{int}$, and the image is displayed in the image forming device for a time corresponding to the transmitted display time information $T_{Inf}$.

Note that the display device of Embodiment 18 can be configured such that:

the storage unit included in the control device 18 stores data groups constituted by a plurality of pieces of character data;

a data identification code is given to each piece of the character data constituting the data groups;

each piece of the character data is constituted by a plurality of pieces of different language display data having different display languages;

the control device 18 receives a designation identification code transmitted from outside, and reads one piece of different language display data among the plurality of pieces of different language display data in the character data which has codes coinciding with the transmitted designation identification code and data identification code from the storage unit; and an image is displayed in the image forming device based on the one piece of different language display data.

In addition, the display device described in Embodiment 16 and the display device described in Embodiment 18 can be combined. In other words the display device described in Embodiment 16 can be configured such that:

each piece of character data is constituted by a plurality of pieces of different language display data having different display languages;

the control device 18 reads one piece of different language display data among the plurality of pieces of different language display data in the character data which has codes coinciding with a transmitted designation identification code and data identification code from the storage unit; and an image is displayed in the image forming device based on the one piece of different language display data.

In addition, the display device described in Embodiment 17 and the display device described in Embodiment 18 can be combined. In other words the display device described in Embodiment 17 can be configured such that:

each piece of different size display data is constituted by a plurality of pieces of different language display data having different display languages;

the control device 18 selects one piece of different size display data from a plurality of pieces of different size display data in character data which has codes coinciding with a transmitted designation identification code and data identification code according to the distance between an observation object and the display device, and further reads one piece of different language display data among the plurality of pieces of different language display data in one piece of different size display data from the storage unit; and an image is displayed in the image forming device based on the one piece of different language display data.

In addition, the display device described in Embodiment 16 and the display devices described in Embodiments 17 and 18 can be combined. In other words the display device described in Embodiment 16 can be configured such that:

each piece of different size display data is constituted by a plurality of pieces of different language display data having different display languages;

the control device 18 selects one piece of different size display data from a plurality of pieces of different size display data in character data which has codes coinciding with a transmitted designation identification code and data identification code according to the distance between an observation object and the display device, and further reads one piece of different language display data among the plurality of pieces of different language display data in the one piece of different size display data from the storage unit; and an image is displayed in the image forming device based on the one piece of different language display data.

Embodiment 19

Embodiment 19 relates to the display device of 3D according to the present disclosure. The display device and the image display device described in Embodiment 16 can also be applied to Embodiment 19.

In addition, also with regard to the display device of Embodiment 19, the storage unit included in the control device 618 stores data groups constituted by a plurality of pieces of character data and a data identification code is given to each piece of character data constituting the data groups, as in Embodiment 16. Note that each piece of character data has the same data structure as described in Embodiment 16 and the data identification code is given thereto as in Embodiment 16.

Also in Embodiment 19, a designation identification code is transmitted to the control device 618 from outside (the transmission device 651) as in Embodiment 16. Then, the control device 618 reads character data which has codes coinciding with the transmitted designation identification code and data identification code from the storage unit and performs a data process according to the distance between an observation object and the display device, and accordingly, an image is displayed in the image forming device based on the character data in a state in which the convergence angle has been controlled. Note that, based on the distance from the display device to the observation object, an image process may be performed on character data to the image forming device constituting at least one of the image display devices, but in Embodiment 19, an image process is performed on character data to the image forming device constituting both of the image display devices.

In other words, the display device of Embodiment 19 can be configured such that:

the storage unit included in the control device 18 stores data groups constituted by a plurality of pieces of character data;

a data identification code is given to each piece of character data constituting the data groups;

the control device 18 receives a designation identification code transmitted from outside, reads character data which has codes coinciding with the transmitted designation identification code and data identification code from the storage unit, and then performs a data process according to the distance between the observation object and the display device; and an image is displayed in the image forming device based on the character data in the state in which the convergence angle has been controlled.

The display device described in Embodiment 16 can also be applied to Embodiment 19. To be specific, in Embodiment 19, the control device 618 reads the character data which has codes coinciding with the transmitted designation identification code and data identification code from the storage unit, an image is displayed in the image forming device based on the character data as in Embodiment 16, and the designation identification code and display time information $T_{Inf}$ are transmitted to the control device 618 from outside (the transmission device 651) at a predetermined time interval $T_{int}$, and the image is displayed in the image forming device for a time corresponding to the transmitted display time information $T_{Inf}$.

In addition, the display device described in Embodiment 17 and the display device described in Embodiment 19 can be combined. In other words, the display device described in Embodiment 17 can be configured such that:

each piece of character data is constituted by a plurality of pieces of different size display data having different display sizes;

the control device 18 reads one piece of different size display data among a plurality of pieces of different size display data in the character data which has codes coinciding with a transmitted designation identification code and data identification code according to the distance between an observation object and the display device from the storage unit and then performs a data process according to the distance between the observation object and the display device; and an image is displayed in the image forming device based on the one piece of different size display data in the state in which the convergence angle has been controlled.

In addition, the display device described in Embodiment 17 and the display devices described in Embodiments 18 and 19 can be combined. In other words, the display device described in Embodiment 17 can be configured such that:

each piece of different size display data is constituted by a plurality of pieces of different language display data having different display languages;

the control device 18 selects one piece of different size display data from a plurality of pieces of different size display data in character data which has codes coinciding with a transmitted designation identification code and data identification code according to the distance between an observation object and the display device, further reads one piece of different language display data among the plurality of pieces of different language display data in one piece of different size display data from the storage unit, and performs a data process according to the distance between the observation object and the display device; and an image is displayed in the image forming device based on the one piece of different language display data in the state in which the convergence angle has been controlled.

In addition, the display device described in Embodiment 18 and the display device described in Embodiment 19 can be combined. In other words, the display device described in Embodiment 18 can be configured such that:

each piece of character data is constituted by a plurality of pieces of different language display data having different display languages;

the control device 18 reads one piece of different language display data among a plurality of pieces of different language display data in the character data which has codes coinciding with a transmitted designation identification code and data identification code according to the distance between an observation object and the display device from the storage unit and then performs a data process according to the distance between the observation object and the display device; and an image is displayed in the image forming device based on the one piece of different language display data in the state in which the convergence angle has been controlled.

Embodiment 20

Figure 36:
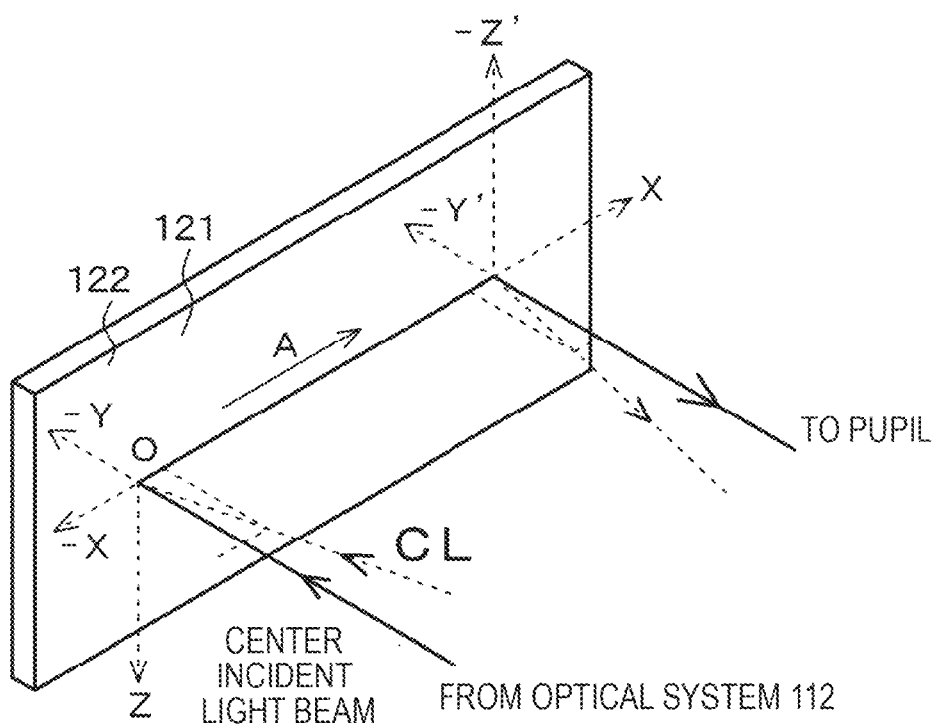
FIG. 36 is a diagram schematically showing propagation of light in a light guide plate constituting an image display device of a display device of Embodiment 20.

Embodiment 20 is also a modification of the display devices of Embodiments 1 to 11, and to be specific, relates to the display device of 2A according to the present disclosure, and particularly, to the display device displaying subtitles (subtitle display device). Conceptual diagrams of the display device and the image display device with regard to the display device of Embodiment 20 are shown in FIGS. 35A and 35B. Note that a state of the image forming device before the optical axis of the image forming device and the optical axis of the optical system are moved in the horizontal direction (X axis direction) is schematically shown in FIG. 35A, and a state thereof after the movement is schematically shown in FIG. 35B. In addition, propagation of light in the light guide plate constituting the image display device in the display device of Embodiment 20 is schematically shown in FIG. 36. Note that conceptual diagrams of a state in which the display device of Embodiment 20 is used are the same as those shown in FIGS. 20 and 21, and a conceptual diagram of the control device constituting the display device of Embodiment 20 is the same as that shown in FIG. 22. Furthermore, an example of an image signal of Embodiment 20 is the same as that shown in FIG. 23A.

In the display device (subtitle display device) of Embodiment 20 or the display devices of Embodiment 21 to 25 to be described later, according to an observation position of an observer, a movement device 40 is operated, a turning device 43 is operated, a liquid lens 44 is operated, and then a liquid prism 45 is operated, and these operations are controlled based on a control signal from the control device 18 based on observation position information (or a left or right shift amount of an image) of the observer. Here, as the observation position information of the observer, for example, a position of a seat taken by the observer (spectator) or theater information of a cinema or a theater can be exemplified.

In addition, in the display device 100, 200, 300, 400, or 500 of Embodiment 20 or Embodiment 21 to be described later, the optical axis of the image forming device 111 (111A and 111B) or 211 and the optical axis of the optical system 112 or 254 are relatively moved in the horizontal direction (X axis direction) by the movement device 40. To be specific, as the conceptual diagrams of FIGS. 35A, 35B, and 36 are shown, the positions of the optical axis of the image forming device 111 or 211 and the optical axis of the optical system 112 or 254 may be relatively moved in the horizontal direction (X axis direction) in each of the two image display devices 100, 200, 300, 400, or 500. In other words, any one of the image forming device 111 or 211 and the optical system 112 or 254 (for example, the optical system 112 or 254) is placed in a movement guide portion 42 constituted by a rack gear portion, and any one of the image forming device 111 or 211 and the optical system 112 or 254 (for example, the optical system 112 or 254) is moved on the movement guide portion 42 using a motor and pinion gear 41. Alternatively, after any one of the image forming device and the optical system is placed in the movement guide portion, any one of the image forming device and the optical system may be moved on the movement guide portion using a piezoelectric element and an ultrasonic motor. In such a configuration, a change is made in a Y-Z plane incidence angle of parallel light that has been output from the optical system 112 or 254 and incident on the optical device 120, 320, or 520 with respect to the optical device 120, 320, or 520. That is, there is a change in an angle of the optical axis of the optical system 112 or 254 with respect to the Y-Z plane. Note that, in FIG. 36, a center incident light beam before the optical axis of the image forming device 111 or 211 and the optical axis of the optical system 112 or 254 are moved in the horizontal direction (X axis direction) is indicated by a solid line, and the center incident light beam after the movement is indicated by a dotted line. Here, by moving the image forming device 111 or 211 and the optical system 112 or 254 so that the state shown in FIG. 35A is transitioned to the state shown in FIG. 35B, a value of the convergence angle increases, and a virtual image distance decreases. In other words, a virtual image gets closer to the observer (spectator). In other words, the image forming device 111 or 211 or the optical system 112 or 254 is relatively moved in the horizontal direction (X axis direction) so that, for example, the point "A" in FIG. 19 is located in a desired position. Note that, in the movement of the image forming device 111 or 211, the entire image forming device 111 or 211 may be moved, or some of the constituent elements of the image forming device 111 or 211 (for example, the liquid crystal display device 151, the scanning unit 253, and the like) may be moved.

Here, information relating to the observation position of the observer (observation position information of the observer) is, for example, given to the display device from a personal computer in advance. Alternatively, for example, seat information or theater information in the form of barcodes printed on a ticket, or seat information or theater information included in ticket information displayed on a mobile telephone may be read using an appropriate measure or method, and the observation position information of the observer based on the seat information or theater information may be given to the display device using an appropriate measure. In addition, based on the observation position information of the observer, the control device 18 causes the image forming device 111 or 211 and/or the optical system 112 or 254 to be relatively moved in the horizontal direction (X axis direction) by operating the motor and pinion gear 41, and the like, and the convergence angle is adjusted. To be specific, for example, as the distance from the display device to the observation object increases, the convergence angle may be smaller. When the distance from the display device to the observation object is infinite, the convergence angle is 0 degrees.

As described above, by moving two images obtained by the two image display devices 100, 200, 300, 400, or 500 for the right eye and the left eye based on the observation position information (or a left or right shift amount of an image), a virtual image can be disposed in a desired position. In other words, by adjusting the distance (gap) of the horizontal direction between the two images displayed in the optical device 120, 320, or 520 constituting the image display device 100, 200, 300, 400, or 500 or the Y-Z plane incidence angle, the convergence angle corresponding to the distance from the display device to the observation object can be adjusted.

Embodiment 21

Figure 37:
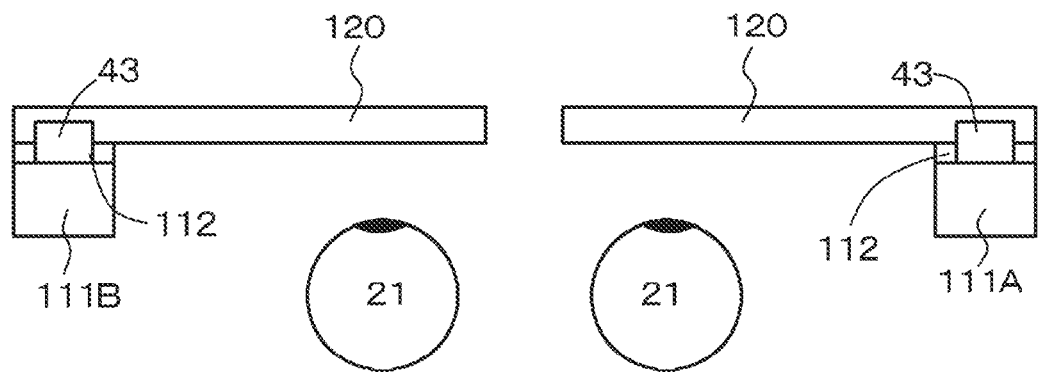
FIG. 37A and FIG. 37B are conceptual diagrams of a display device of Embodiment 21.
Figure 37B:
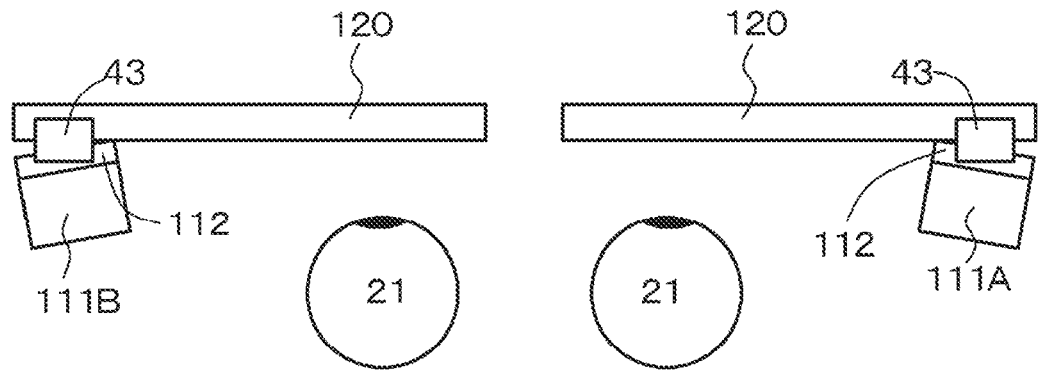

Embodiment 21 relates to the display device of 2B according to the present disclosure. Conceptual diagrams of the display device of Embodiment 21 are shown in FIGS. 37A and 37B. In the display device of Embodiment 21, at least one of the image display devices (in Embodiment 21, each of the two image display devices for the right eye and the left eye) further includes the turning device 43 that turns the image forming device 111 or 211 and the optical system 112 or 254, and by turning the image forming device 111 or 211 and the optical system 112 or 254 using the turning device 43 according to an observation position of an observer, an incidence angle (Y-Z plane incidence angle) of parallel light which has been output from the optical system 112 or 254 and incident on the optical device 120 or 320 with respect to the optical device 120 or 320 is changed, in other words, an angle of the optical axis of the optical system 112 or 254 with respect to the Y-Z plane is changed, and accordingly, the convergence angle (main light beam intersection angle with respect to a horizontal plane) is adjusted. Here, by moving the image forming device 111 or 211 and the optical system 112 or 254 so that the state shown in FIG. 37A is transitioned to the state shown in FIG. 37B, the value of the convergence angle increases and a virtual image distance decreases. In other words, a virtual image gets closer to the observer (spectator).

Note that the image forming device 111 or 211 and the optical system 112 or 254 are turned by the turning device 43, and specifically, while the positional relationship of the optical axis of the image forming device 111 or 211 and the optical axis of the optical system 112 or 254 in each of the two image display devices is fixed, at least one of the image display devices may be turned with respect to the Z axis arranged in an appropriate position as the turning axis by operating a piezoelectric element, a motor, or an ultrasonic motor. In such a configuration, a change occurs in the Y-Z plane incidence angle of parallel light which has been output from the optical system 112 or 254 and incident on the optical device 120 or 320 with respect to the optical device 120 or 320. In other words, there is a change in the angle of the optical axis of the optical system 112 or 254 with respect to the Y-Z plane. In some cases, the optical device 120 or 320 may also be turned.

Embodiment 22

Embodiment 22 relates to the display device of 2C according to the present disclosure. In the display device of Embodiment 22, the optical system 112 or 254 constituting at least one of the image display devices (in Embodiment 22, each of the two image display devices for the right eye and the left eye) includes the liquid lens 44, and the convergence angle (main light beam intersection angle) is adjusted through an operation of the liquid lens 44 according to an observation position of an observer. The liquid lens 44 constituting the optical system 112 or 254 is constituted by a known liquid lens that uses the electro-wetting phenomenon. Through an operation of the liquid lens 44, the optical axis of the optical system 112 or 254 can be moved in the horizontal direction (X axis direction) while the relationship between the optical axis of the optical system 112 or 254 and the Y axis is maintained constant, or an angle of the optical axis of the optical system with respect to the Y-Z plane can be changed. Thereby, a change is made in the Y-Z plane incidence angle of parallel light output from the optical system 112 or 254 and incident on the optical device 120 or 320 with respect to the optical device 120 or 320. In other words, there is a change in the angle of the optical axis of the optical system 112 or 254 with respect to the Y-Z plane.

The principle of the liquid lens 44 will be described with reference to principle diagrams of FIGS. 38A, 38B, 38C, 39A, 39B, and 39C. Note that FIG. 38A is a schematic cross-sectional diagram of FIG. 38B taken along the arrow A-A, FIG. 38B is a schematic cross-sectional diagram of FIG. 38A taken along the arrow B-B (in which a first liquid is not illustrated), and FIGS. 38C, 39A, 39B, and 39C are a schematic cross-sectional diagrams of FIG. 38A taken along the arrow C-C. Note that the shape obtained when the liquid lens is cut along the x-y plane is a schematic shape different from the actual shape.

The liquid lens shown in the principle diagrams of FIGS. 38A, 38B, 38C, 39A, 39B, and 39C (referred to as a "fundamental liquid lens" for the sake of convenience) has a housing. The housing is constituted by:
a first side member 51;
a second side member 52 facing the first side member 51;

a third side member 53 connecting one end of the first side member 51 and one end of the second side member 52;

a fourth side member 54 connecting the other end of first side member 51 and the other end of the second side member 52;

a top plate 55 attached to the top faces of the first side member 51, the second side member 52, the third side member 53, and the fourth side member 54; and a bottom plate 56 attached to the bottom faces of the first side member 51, the second side member 52, the third side member 53, and the fourth side member 54, and the housing constitutes one lens chamber. The lens chamber is occupied by a first liquid 65 and a second liquid 66 constituting the liquid lens as a cylindrical lens of which an axial line extends in the direction in which the first side member 51 and the second side member 52 extend (z direction).

In addition, a first electrode constituting the liquid lens (hereinafter, simply referred to as a "first electrode 61") is provided on the inner face of the portion of the top plate 55, a second electrode constituting the liquid lens (hereinafter, simply referred to as a "second electrode 62") is provided on the inner face of the first side member 51, and a third electrode constituting the liquid lens (hereinafter, simply referred to as a "third electrode 63") is provided on the inner face of the second side member 52. Here, in the states shown in FIGS. 38A, 38B, and 38C, no voltage is applied to the first electrode 61, the second electrode 62, or the third electrode 63.

When an appropriate voltage is applied to the first electrode 61, the second electrode 62, and the third electrode 63 from this state, the state of the interface between the first liquid 65 and the second liquid 66 is changed to the state shown in FIG. 39A, 39B, or 39C. Here, the state shown in FIG. 39A shows the state in which the same voltage is applied to the second electrode 62 and the third electrode 63, and the shape of the liquid lens formed in the lens chamber when it is cut along the x-y plane is symmetric with respect to the optical axis OA. In addition, the states shown in FIGS. 39B and 39C show the states in which different voltages are applied to the second electrode 62 and the third electrode 63, and the shape of the liquid lens formed in the lens chamber when it is cut along the x-y plane is asymmetric with respect to the optical axis OA. Note that the difference between electric potentials of the second electrode 62 and the third electrode 63 is greater in the state shown in FIG. 39C than in the state shown in FIG. 38B. As shown in FIGS. 39B and 39C, according to the difference between the electric potentials of the second electrode 62 and the third electrode 63, an optical power of the liquid lens can be changed, and the optical axis OA (expressed in dotted lines) of the liquid lens can be moved in the y direction orthogonal to the z direction. Alternatively, by arranging a plurality of liquid lenses shown in the principle diagrams and appropriately controlling voltages applied to the second electrode 62 and the third electrode 63 of each of the liquid lenses, the optical axes of all of the liquid lenses can be moved, inclinations of the optical axes of all of the liquid lenses can be changed, and thereby all of the liquid lenses can constitute a Fresnel lens.

Schematic cross-sectional diagrams of the practical liquid lens 44 of Embodiment 22 are shown in FIGS. 40, 41A, 41B, 41C, 42A, and 42B. Note that FIG. 40 is the same schematic cross-sectional diagram as FIG. 38B taken along the arrow A-A, and FIGS. 41A, 41B, 41C, 42A, and 42B are schematic cross-sectional diagrams of FIG. 40 taken along the arrow C-C. In addition, a schematic cross-sectional diagram of FIG. 40 taken along the arrow B-B is the same as shown in FIG. 38B.

The liquid lens 44 includes:

(A) a housing 50 constituted by:

a first side member 51;

a second side member 52 facing the first side member 51;

a third side member 53 connecting one end of the first side member 51 and one end of the second side member 52;

a fourth side member 54 connecting the other end of first side member 51 and the other end of the second side member 52;

a top plate 55 attached to the top faces of the first side member 51, the second side member 52, the third side member 53, and the fourth side member 54; and a bottom plate 56 attached to the bottom faces of the first side member 51, the second side member 52, the third side member 53, and the fourth side member 54, and (B) (M−1) partition members 57 each of which is arranged between the first side member 51 and the second side member 52 in parallel.

In addition, in the liquid lens 44 of Embodiment 22, M (=5) lens chambers 58 ($58_1$, $58_2$, $58_3$, $58_4$, and $58_5$) are disposed side by side. Here, each of the lens chambers 58 ($58_1$, $58_2$, $58_3$, $58_4$, and $58_5$) is occupied by a first liquid 65 and a second liquid 66 constituting the liquid lens as a cylindrical lens of which an axial line extends in the direction parallel to the direction in which the partition members 57 extend (z direction).

The first lens chamber $58_1$ is constituted by the first side member 51, the third side member 53, the first partition member 57, the fourth side member 54, the top plate 55, and the bottom plate 56. In addition, a first electrode 61 is provided on the inner face of the portion of the top plate 55 constituting the first lens chamber $58_1$, a second electrode 62 is provided on the inner face of the portion of the first side member 51 constituting the first lens chamber $58_1$, and a third electrode 63 is provided on the inner face of the portion of the first partition member 57 constituting the first lens chamber $58_1$.

In addition, an $(m+1)^{th}$ lens chamber $58_{(m+1)}$ is constituted by an $m^{th}$ (m=1, 2, . . . M−2) partition member 57, the third side member 53, an $(m+1)^{th}$ partition member 57, the fourth side member 54, the top plate 55, and the bottom plate 56. In addition, a first electrode 61 is provided on the inner face of the portion of the top plate 55 constituting an $(m+1)^{th}$ lens chamber $58_{(m+1)}$, a second electrode 62 is provided on the inner face of the portion of the $m^{th}$ partition member 57 constituting the $(m+1)^{th}$ lens chamber $58_{(m+1)}$, and a third electrode 63 is provided on the inner face of the portion of the $(m+1)^{th}$ partition member 57 constituting the $(m+1)^{th}$ lens chamber $58_{(m+1)}$.

Furthermore, an $M^{th}$ lens chamber $58_M$ (=$58_5$) is constituted by an $(M-1)^{th}$ partition member 57, the third side member 53, the second side member 52, the fourth side member 54, the top plate 55, and the bottom plate 56. In addition, a first electrode 61 is provided on the inner face of the portion of the top plate 55 constituting the $M^{th}$ lens chamber $58_M$ (=$58_5$), a second electrode 62 is provided on the inner face of the portion of an $(M-1)^{th}$ partition member 57 constituting the $M^{th}$ lens chamber $58_M$ (=$58_5$), and a third electrode 63 is provided on the inner face of the portion of the second side member 52 constituting the $M^{th}$ lens chamber $58_M$ (=$58_5$).

Note that, in the illustrated example, the first electrodes 61 are provided in each of the lens chambers, but only one first electrode 61 may be provided on the inner face of the top plate 55.

In the liquid lens 44 of Embodiment 22, surfaces of the first side member 51, the second side member 52, and the partition members 57 in which at least the interface of the first liquid 65 and the second liquid 66 is positioned have undergone water-repellent processing. In addition, the bottom faces of the partition members 57 extend to the bottom plate 56 and the top faces of the partition members 57 extend to the top plate 55. The external shape of the housing 50 is a rectangular shape having long sides in the z direction and short sides in the y direction. In addition, light is incident from the bottom plate 56 and output from the top plate 55.

The first liquid 65 and the second liquid 66 are insoluble and immiscible. The interface of the first liquid 65 and the second liquid 66 forms a lens face. Here, the first liquid 65 has a conductive property, the second liquid 66 has an insulating property, the first electrode 61 comes into contact with the first liquid 65, the second electrode 62 comes into contact with the first liquid 65 and the second liquid 66 via an insulation film 64, and the third electrode 63 comes into contact with the first liquid 65 and the second liquid 66 via another insulation film 64. In addition, the top plate 55, the bottom plate 56, and the first electrode 61 are formed of a material that is transparent with respect to light incident on the liquid lens 44.

More specifically, the top plate 55, the bottom plate 56, the first side member 51, the second side member 52, the third side member 53, the fourth side member 54, and the partition members 57 are made of glass or a resin such as an acrylic resin. In addition, the first liquid 65 having a conductive property is composed of an aqueous solution of lithium chloride, a density thereof is 1.06 g/cm$^3$, and a refraction index thereof is 1.34. On the other hand, the second liquid 66 having an insulating property is composed of silicone oil (TSF437 manufactured by Momentive Performance Materials Japan Inc.), a density thereof is 1.02 g/cm$^3$, and a refraction index thereof is 1.49. In addition, the first electrode 61 is composed of ITO, and the second electrode 62 and the third electrode 63 are composed of, for example, a metal electrode of gold, aluminum, copper, silver, or the like. Furthermore, the insulation film 64 is composed of metal oxide of poly-para-xylene, tantalum oxide, titanium oxide, or the like. Note that a water-repellent-processed layer (not shown) is provided on the insulation film 64. The water-repellent-processed layer is composed of a poly-para-xylene-based or fluorine-based polymer. It is preferable to perform hydrophilic processing on the surface of the first electrode 61 and water-repellent processing on the inner faces of the third side member 53 and the fourth side member 54.

In addition, in Embodiment 22, two liquid lenses 44 shown in FIG. 40 overlap to constitute the optical system 112 or 254. To be specific, the lenses overlap so that the y direction of the lower liquid lens 44 is orthogonal to the y direction of the upper liquid lens 44 and the z direction of the lower liquid lens 44 is orthogonal to the z direction of the upper liquid lens 44. In addition, the two overlapping liquid lenses 44 are disposed in the place of the optical system 112 shown in FIG. 1 so that, for example, the y direction of the lower liquid lens 44 is parallel to the X axis direction and the x direction thereof is parallel to the Y axis direction.

The first electrode 61, the second electrode 62, and the third electrode 63 have a configuration or structure in which the electrodes are connected to an external control circuit via a connection unit that is not shown and a desired voltage is applied thereto. In addition, when a voltage is applied to the first electrode 61, the second electrode 62, and the third electrode 63, the lens face formed by the interface between the first liquid 65 and the second liquid 66 changes to a state in which the lens face is upwardly convex as shown in FIG. 41B from a state in which the lens face is downwardly convex as shown in FIG. 41A. The changed states of the lens face are changed by the voltage applied to the electrodes 61, 62, and 63 based on the Lippman-Young law. In the example shown in FIG. 41B, the same voltage is applied to the second electrodes 62 and the third electrodes 63. For this reason, the shape of a liquid lens formed in a lens chamber when it is cut along the x-y plane is symmetric with respect to the optical axis of the liquid lens. Such control may be performed on the upper liquid lens 44 among the two overlapping liquid lenses 44.

In addition, the states shown in FIGS. 41C, 42A, and 42B show the states in which different voltages are applied to the second electrodes 62 and the third electrodes 63, and the shape of a liquid lens formed in a lens chamber when it is cut along the x-y plane is asymmetric with respect to the optical axis of the liquid lens. Here, in the state shown in FIG. 41C, a Fresnel lens as the liquid lens 44 is formed. Such control may be performed on the upper liquid lens 44 among the two overlapping liquid lenses 44.

On the other hand, in the states shown in FIGS. 42A and 42B, the optical axis of the liquid lens is moved in the y direction (X axis direction) orthogonal to the z direction. By setting the state shown in FIG. 42A or 42B, a direction in which light output from the liquid lens 44 travels can be changed, or an inclination of the optical axis of the entire liquid lens 44 with respect to the x direction can be controlled. In other words, by controlling the lower liquid lens 44 among the two overlapping liquid lenses 44, the optical axis of the liquid lens can be moved in the X axis direction, or the optical axis of the liquid lens can be inclined with respect to the Y axis direction. In addition, optical power of the liquid lens can be changed according to the difference between electric potentials of the second electrodes 62 and the third electrodes 63. Here, in the state shown in FIG. 42A, the same voltage is applied to each of the second electrodes 62 and the same voltage is applied to each of the third electrodes 63. On the other hand, in the state shown in FIG. 42B, different voltages are applied to each of the second electrodes 62 and each of the third electrodes 63, and accordingly, all of the liquid lenses 44 form a kind of a Fresnel lens.

Note that, when a voltage is applied to the first electrodes 61, the second electrodes 62, and the third electrodes 63, and the cylindrical lens exhibits optical power, the optical power of the cylindrical lens on the x-z plane (or a plane parallel to the x-z plane) is substantially 0, and optical power of the cylindrical lens on the x-y plane is a finite value. Here, an "optical axis of all liquid lenses" is a line connecting the center of curvature of two virtual optical surfaces of a virtual lens obtained as all of the liquid lenses 44 (one lens among all of the liquid lenses 44) when the liquid lens 44 is cut along the x-y plane.

A configuration in which the second electrodes 62 are connected to one another using a shared wiring, the third electrodes 63 are connected to one another using a shared wiring, the same voltage is applied to each of the second electrodes 62, and the same voltage is applied to each of the third electrodes 63 is possible. Alternatively, a configuration in which the second electrodes 62 are connected to one another using a shared wiring, the third electrodes 63 are connected to one another using individual wirings to apply different voltages individually, the third electrodes 63 are connected to one another using a shared wiring, the second electrodes 62 are connected to one another using individual wirings to apply different voltages individually, and the second electrodes 62 and the third electrodes 63 are connected to one another using individual wirings to apply different voltages individually is also possible.

Embodiment 23

Embodiment 23 relates to the display device of 2D according to the present disclosure. In the display device of Embodiment 23, the optical system 112 or 254 constituting at least one of the image display devices (in Embodiment 23, each of the two image display devices for the right eye and the left eye) includes a liquid prism 45, and the convergence angle (main light beam intersection angle with respect to a horizontal plane) is adjusted through an operation of the liquid prism 45 according to an observation position of an observer. The liquid prism 45 constituting a part of the optical system 112 or 254 is constituted by a known liquid prism that uses the electro-setting phenomenon. Through an operation of the liquid prism 45, an angle of the optical axis of the optical system 112 or 254 with respect to the Y-Z plane can be changed. In such a configuration, a change occurs in the Y-Z plane incidence angle of parallel light which has been output from the optical system 112 or 254 and incident on the optical device 120 or 320 with respect to the optical device 120 or 320. In other words, there is a change in the angle of the optical axis of the optical system 112 or 254 with respect to the Y-Z plane.

As in a conceptual diagram shown in FIG. 43, a configuration and a structure of the liquid prism 45 are set to be the same as those of the fundamental liquid lens shown in FIGS. 38A, 38B, and 38C, and thus detailed description thereof will be omitted, and a difference from the fundamental liquid lens is that a lens face is not formed by the interface between the first liquid 65 and the second liquid 66, but a flat slope of the prism is formed, and such a configuration can be achieved by appropriately selecting the first liquid 65 and the second liquid 66. In addition, the liquid prism 45 may be arranged between, for example, the optical system 112 and the light guide plate 121 in the display device shown in FIG. 1 so that the y direction is parallel to the X axis direction and the x direction is parallel to the Y axis direction.

Embodiment 24

Embodiment 24 is a modification of the display devices of Embodiments 20 to 23. In the display device of Embodiment 24, by controlling an image signal (character data, an input image signal, or input image data) to the image forming device 111 (111A and 111B) or 211 constituting at least one of the image display device (also in Embodiment 24, each of the two image display devices 100, 200, 300, 400, or 500 for the right eye and the left eye), the convergence angle is further precisely adjusted according to an observation position of an observer in addition to adjustment of the convergence angle in Embodiments 20 to 23, or a position of an image displayed in the optical device constituting at least one of the image display devices is adjusted according to the observation position of the observer. Note that, in Embodiment 24, both of the adjustment of the convergence angle and the adjustment of the position of the image according to the observation position of the observer are performed, but only one of the adjustments may be performed.

Specifically, a test image signal is transmitted to the control device 18 in a wireless manner (a wired manner in some cases). In addition, the control device 18 performs a process on the image signal for image display, and generates an image (subtitles) in the image forming device 111 or 211 based on the test image signal. The image passes through the optical system 112 or 254 and the optical device 120, 320, or 520, and then finally reaches both eyes of the observer (spectator) wearing the display device.

In addition, the image displayed in the optical device 120, 320, or 520 is moved right and left or up and down and rotated via the display device 18, specifically, using a switch (not shown) arranged in the display device 18 so that the images displayed by the image display devices 100, 200, 300, 400, or 500 for the left eye and the right eye coincide with (or are superimposed on) each other in a desired position (for example, in a desired position on a stage or on a screen). In other words, the image displayed in the optical device 120, 320, or 520 is moved right and left or up and down and rotated so that, for example, the point "A" in FIG. 19 is located in the desired position. In this manner, through the operation of the switch arranged in the control device 18, the image signal is controlled (corrected). In other words, a display position correction signal is generated in the control device 18, and the display position correction signal is added to the image signal.

A state of the image displayed by the image display devices 100, 200, 300, 400, or 500 for the left eye and the right eye deviated from the desired position to the right or left, a state thereof deviated upward or downward, and a state thereof rotated and deviated are the same as those shown in FIGS. 24A, 24B, and 24C. In addition, in order to move the image (character), the same operation and process as described in Embodiment 12 may be performed. In this manner, the position of the image displayed in the optical device 120, 320, or 520 constituting at least one of the image display device 100, 200, 300, 400, or 500 is controlled, and accordingly, the positions of two images in the two image display devices 100, 200, 300, 400, or 500 can be mutually adjusted. In other words, both of more precise adjustment of the convergence angle and adjustment of the positions of the images according to an observation position of an observer can be performed. Note that, in addition to the image signal to the image forming device 111 or 211, observation position information (distance information) from the observer (display device) to an observation object is transmitted to the display device from outside. An example of a conceptual diagram of a format of the signal is as shown in FIG. 25B.

As described above, by deviating the image display position from a predetermined position by a desired pixel amount, the convergence angle can be more precisely adjusted. In other words, by controlling the image signal to the image forming device 111 or 211 constituting the two image display devices 100, 200, 300, 400, or 500 for the right eye and the left eye based on the display position correction signal, the convergence angle can be more precisely adjusted according to the distance from the display device to the observation object, and as a result, the distance between the observation object and the observer (spectator) and the virtual image distance of the image (subtitles) displayed by the image display device can be made to be equal with precision.

Note that, in Embodiment 24 or Embodiment 25 to be described below, the size of a display screen (image display region) displayed in the optical device, the angle of view of the display screen (image display region), and resolution of the display screen may be altered according to an observation position of an observer and the distance between an observation object and the display device under control of the control device 18.

Embodiment 25

Embodiment 25 is a modification of the display devices of Embodiments 20 to 24. Since a basic configuration and structure of the display device of Embodiment 25 can be the same as those of the display devices of Embodiments 20 to 23, detailed description thereof will be omitted.

In the display device of Embodiment 25, after a predetermined time elapses from input of an image signal to the image forming device, image formation in the image forming device is stopped. In order to stop the image formation in the image forming device, in other words, in order to transition to a power save mode or the like in the display device, a signal indicating an image display time in the image display device or a signal instructing stop of image formation in the image forming device is added to an image signal.

An example of such an image signal of Embodiment 25 is the same as shown in FIG. 23B, and data "TIME" indicating the image display time that is a signal expressing the image display time of the image display device is added to the image signal of Embodiment 20 shown in FIG. 23A. Then, the control device 18 performs the same process and operation as described in Embodiment 13. In this manner, in the display device of Embodiment 25, after the predetermined time elapses from input of the image signal to the image forming device, the image formation in the image forming device is stopped. In other words, since the display device transitions to the power save mode or the like after the elapse of the predetermined time, the problem of waste of electric power in the display device does not occur.

Note that the display devices described in Embodiments 16 to 19 can be applied to the display devices of Embodiments 20 to 25 described above, and the display devices in such cases correspond to the display devices of 3A to 3D according to the present disclosure.

Hereinabove, the present disclosure has been described based on exemplary embodiments, but the present disclosure is not limited thereto. The configurations and structures of the display devices (head mounted type display) and the image display devices described in the embodiments are examples, and can be appropriately modified. For example, a surface relief hologram (refer to US patent number 20040062505A1) may be arranged in the light guide plate. With regard to the optical device 320, a diffraction grating element can be constituted by a transmissive diffraction grating element, or one of the first deflecting unit and the second deflecting unit can be constituted by a reflective diffraction grating element and the other can be constituted by a transmissive diffraction grating element. Alternatively, the diffraction grating element can be a reflective blazed diffraction grating element.

The dimmer may be installed in the region to which light of the optical device is output so as to be freely attachable and detachable. In order to install the dimmer to be freely attachable and detachable, for example, the dimmer may be mounted in the optical device using a screw made of a transparent plastic and then connected to a control circuit (for example, one included in the control device 18 to control the image forming device) for controlling a light transmittance of the dimmer via a connector or a wiring.

The configurations and structures of the movement devices, turning devices, liquid lenses, and liquid prisms described in Embodiments 20 to 25 are examples and can be appropriately modified. For example, the display device described in Embodiment 20 and the display device described in Embodiment 25 may be combined.

Figure 44:
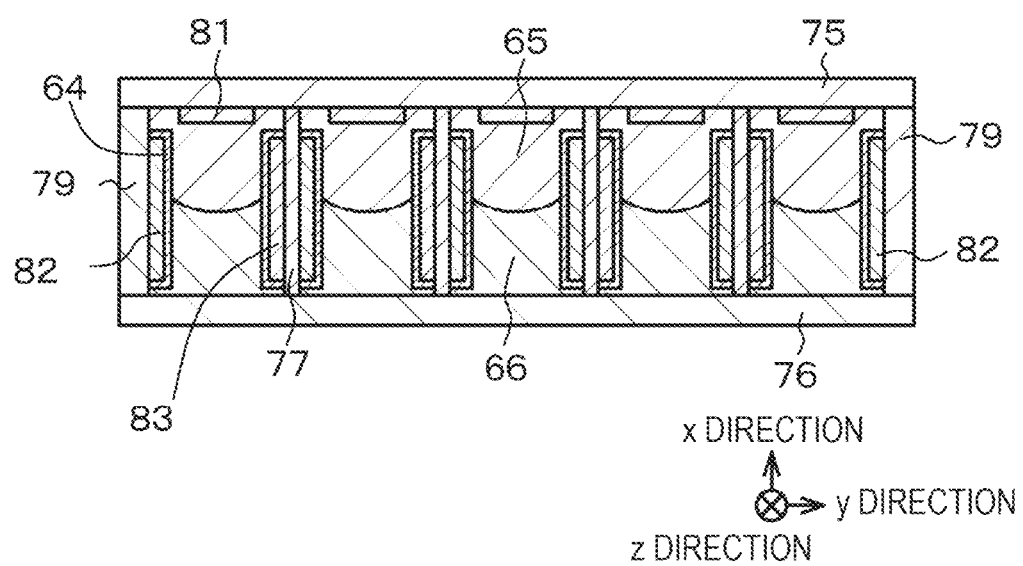
FIG. 44 is a schematic cross-sectional diagram of a liquid lens of a Fresnel lens type for causing a focal length of an optical system to be variable.
Figure 45:
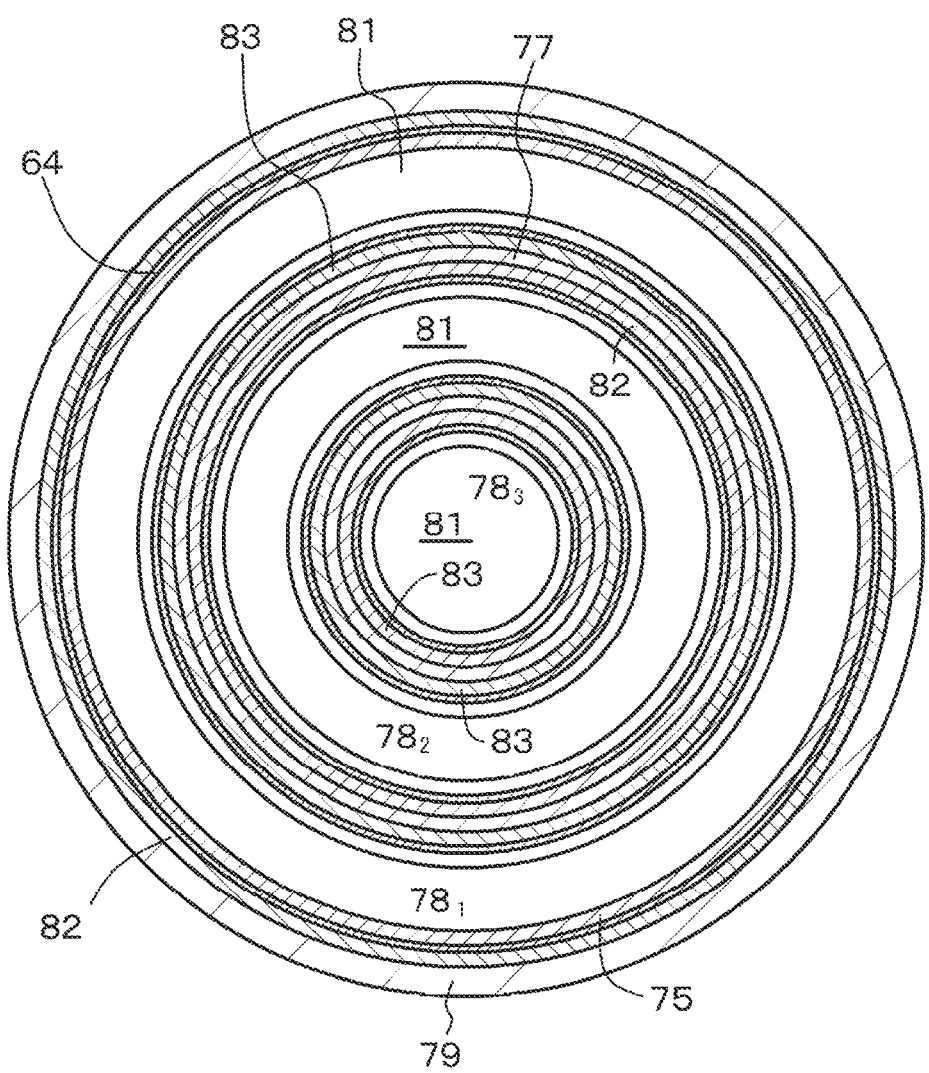
FIG. 45 is a schematic plan diagram of a liquid lens of a Fresnel lens type for causing a focal length of an optical system to be variable.

At the same time as adjustment of the convergence angle, the optical system 112 or 254 may be constituted by a liquid lens so that, for example, the focus of the optical system 112 or 254 is on the point "A" of FIG. 19, in other words, the focal distance of the optical system 112 or 254 is changeable. A schematic schematic cross-sectional diagram of the liquid lens is shown in FIG. 44, and a plan diagram thereof is shown in FIG. 45, in which the liquid lens is configured to be a Fresnel lens and ring-shaped lens chambers are arranged in a concentric manner.

In other words, the liquid lens includes:

(A) a housing having:

a so-called endless outer wall member 79 that does not have a terminal;

a top plate 75 attached to the top face of the outer wall member 79; and a bottom plate 76 attached to the bottom face of the outer wall member 79, and (B) (N−1) partition members 77 arranged concentrically with respect to the outer wall member 79 without a terminal. Note that the external shape of the housing is a circle. In addition, the housing has a center lens chamber surrounded by (N−1) circular lens chambers and an $(N-1)^{th}$ partition member 77. Here, in the illustrated example, N=3 is set. Each of the lens chambers 78 ($78_1$, $78_2$, and $78_3$) is occupied by a first liquid 65 and a second liquid 66 constituting the liquid lens.

The first lens chamber (circular lens chamber) $78_1$ is constituted by the outer wall member 79, the first partition member 77, the top plate 75, and the bottom plate 76. In addition, a first electrode (hereinafter, simply referred to as a "first electrode 81") constituting the liquid lens is provided on the inner face of the portion of the top plate 75 constituting the first lens chamber $78_1$, a second electrode (hereinafter, simply referred to as a "second electrode 82") constituting the liquid lens is provided on the inner face of the portion of the outer wall member 79 constituting the first lens chamber $78_1$, and a third electrode (hereinafter, simply referred to as a "third electrode 83") constituting the liquid lens is provided on the inner face of the portion of the first partition member 77 constituting the first lens chamber $78_1$.

An $(n+1)^{th}$ lens chamber (circular lens chamber) $78_{(n+1)}$ is constituted by an $n^{th}$ (n=1, 2, . . . N−2) partition member 77, an $(n+1)^{th}$ partition member 77, the top plate 75, and the bottom plate 76. In addition, the first electrode 81 is provided on the inner face of the portion of the top plate 75 constituting an $(n+1)^{th}$ lens chamber $78_{(n+1)}$, the second electrode 82 is provided on the inner face of the portion of an $n^{th}$ partition member 77 constituting the $(n+1)^{th}$ lens chamber $78_{(n+1)}$, and the third electrode 83 is provided on the inner face of the portion of the $(n+1)^{th}$ partition member 77 constituting the $(n+1)^{th}$ lens chamber $78_{(n+1)}$.

Another first electrode 81 is provided on the inner face of the portion of the top plate 75 constituting the center lens chamber $78_3$ corresponding to an $N^{th}$ lens chamber $78_N$, and another third electrode 83 is provided on the inner face of the portion of an $(N-1)^{th}$ partition member 77 constituting the center lens chamber $78_3$.

Note that, in the illustrated example, one of the first electrodes 81 is provided in each lens chamber, but one first electrode 81 may be provided on the inner face of the top plate 75.

With regard to the liquid lens, each surface of the outer wall member 79 and each of the partition members 77 in which at least the interface of the first liquid 65 and the second liquid 66 is positioned undergoes water-repellent processing as in Embodiment 22. Light is incident from the bottom plate 76 and output from the top plate 75. In addition, by differentiating a voltage applied to the second electrodes 82 from a voltage applied to the third electrodes 83 in each of the lens chambers $78_1$, $78_2$, and $78_3$, optical power of the liquid lens can be changed. Alternatively, by differentiating a voltage applied to the second electrodes 82 from a voltage applied to the third electrodes 83 in each of the lens chambers 78₁, 78₂, and 78₃, all of the liquid lenses form a Fresnel lens.

Figure 46:
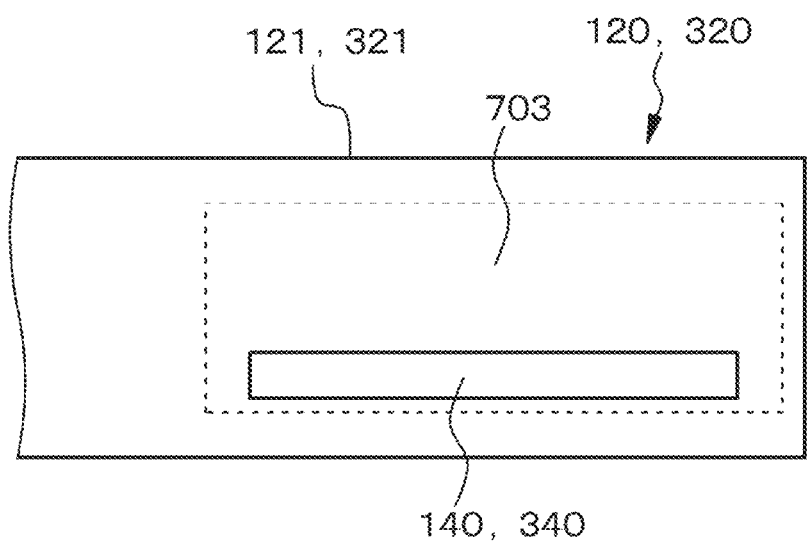
FIG. 46 is a schematic diagram of the portion of an optical device and a dimmer in a still another modified example of the display device of Embodiment 1 or Embodiment 7 viewed from above.
Figure 47:
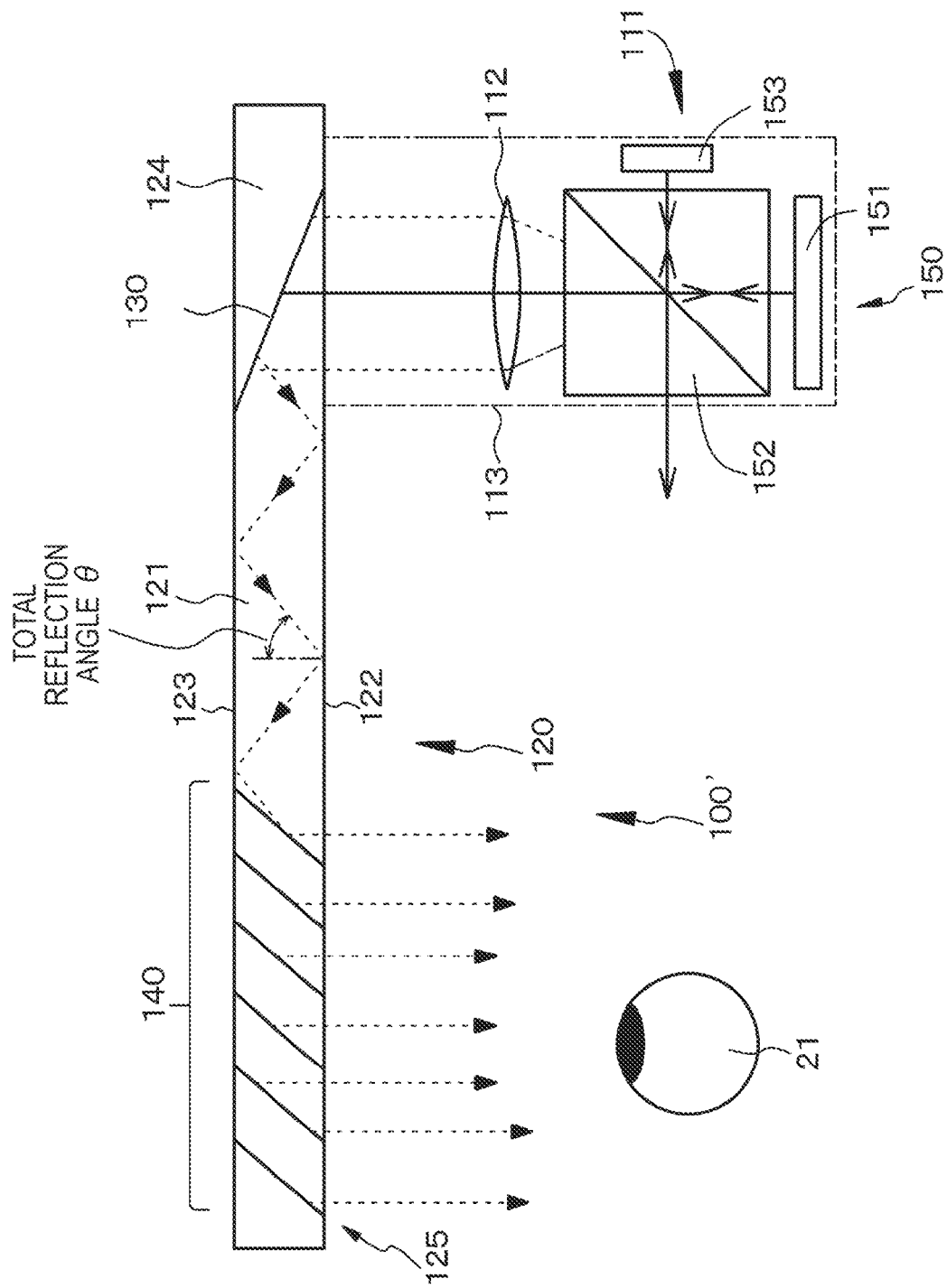
FIG. 47 is a conceptual diagram of an image display device of a display device of the related art.

Furthermore, the image display devices described in Embodiments 1 to 25 can be modified as described below. In other words, as a schematic diagram of the portion of the optical device and the dimmer of the display device of, for example, Embodiment 1 or 7 as viewed from the front is shown in FIG. 46, the dimmer 700 can be configured to be positioned in a projection image of the second deflecting unit 140 or 340. Here, in the portion of the optical device 120 or 320 facing the dimmer 700, for example, display of descriptive text, closed captions synchronized with and relating to a video, and display of various kinds of description and descriptive text for describing the content, the progress, the background of observation objects with regard to a play, kabuki, Noh, kyogen, an opera, a concert, a ballet, various performances, a recreational park (amusement park), an art museum, a tourist attraction, a resort, a tour guide, and the like may be performed.

REFERENCE SIGNS LIST

10 frame
11 front portion
12 hinge
13 temple portion
14 ear bend portion
15 wiring (signal line, power line, or the like)
16 headphone portion
17 headphone wiring
18 control device (control circuit)
18A command reception circuit
18B signal processing circuit
18C timing adjustment circuit
18D transmission circuit
18E timing generation circuit
19 mounting member
21 pupil
31 character data reproduction device
31' image data and character data reproduction device
32 character data wireless transmission device
40 movement device
41 motor and pinion gear
42 movement guide portion
43 turning device
44 liquid lens
45 liquid prism
51 first side member
52 second side member
53 third side member
54 fourth side member
55 top plate
56 bottom plate
57 partition member
61 first electrode constituting liquid lens
62 second electrode constituting liquid lens
63 third electrode constituting liquid lens
64 insulation film
65 first liquid
66 second liquid
75 top plate
76 bottom plate
77 partition member
78, 78₁, 78₂, 78₃ lens chamber
79 outer wall member
81 first electrode constituting liquid lens
82 second electrode constituting liquid lens
83 third electrode constituting liquid lens
100, 200, 300, 400, 500 image display device
111, 111A, 111B, 211 image forming device
112 optical system (collimating optical system)
113, 213 housing
120, 320 optical device (light guide unit)
121, 321 light guide plate
122, 322 first face of the light guide plate
123, 323 second face of the light guide plate
124, 125 portion of the light guide plate
126, 326 protective member (protective plate)
127, 327 adhesive member
130 first deflecting unit
140 second deflecting unit
330 first deflecting unit (first diffraction grating member)
340 second deflecting unit (second diffraction grating member)
150 reflective spatial light modulating device
151 liquid crystal display device (LCD)
152 polarization beam splitter
153 light source
251 light source
252 collimating optical system
253 scanning unit
254 optical system (relay optical system)
255 cross prism
256 total-reflection mirror
520 optical device (semi-transmissive mirror)
521 transparent member
618 control device
651 transmission device (transmission unit)
652 personal computer
653 display device
700, 700', 700", 710, 720, 730 dimmer
701, 701', 701" first substrate
702, 702" first electrode
703, 703', 703" second substrate
704, 704" second electrode
705, 705', 705" light transmission control material layer
706 sealant
707 adhesive
801 illuminance sensor (environment illuminance measuring sensor)
802 second illuminance sensor (transmitted light illuminance measuring sensor)

The invention claimed is:

1. A display device comprising:
(I) a frame configured to be mounted on a head of an observer;
(II) an image display device attached to the frame, wherein the image display device includes:
(A) an image forming device, and
(B) an optical device having a first side including a first surface region on which light output from the image forming device is incident, an interior region in which the light is guided, and a second surface region from which the light is output;
(III) a dimmer configured and arranged to adjust an amount of light transmittance to the optical device of external light incident from outside of the display device, wherein the dimmer is located on a second side of the optical device opposite the first side and is configured to be operated at at least three different light transmittance states; and (IV) a light shielding member configured and arranged to shield incidence of the external light on a portion of the second side of the optical device opposite the first surface region and a first portion of the dimmer so as to inhibit the external light from reaching the portion of the second side of the optical device and the first portion of the dimmer without also inhibiting the external light from reaching a second portion of the dimmer that is different from the first portion of the dimmer.

2. The display device according to claim 1, wherein the first surface region of the optical device on which light output from the image forming device is incident is included in a projection image of the light shielding member on the optical device.

3. The display device according to claim 1, wherein the light shielding member is disposed separate from the optical device on the second side.

4. The display device according to claim 1, wherein the light shielding member is disposed in a portion of the optical device on the second side.

5. The display device according claim 1, wherein the light shielding member is disposed in the dimmer.

6. The display device according to claim 1, wherein a projection image of an edge of the dimmer on the optical device is included in the projection image of the light shielding member on the optical device.

7. The display device according to claim 1, wherein the dimmer comprises:
    a first substrate facing the optical device and a second substrate facing the first substrate,
    electrodes each provided in the first substrate and the second substrate, and
    a light transmission control material layer sealed between the first substrate and the second substrate.

8. The display device according to claim 7, wherein the second substrate is thinner than the first substrate.

9. The display device according to claim 7, wherein the first substrate also serves as a constituent member of the optical device.

10. The display device according to claim 7, wherein the light transmission control material layer of the dimmer is configured to be a light shutter formed of a liquid crystal material layer.

11. The display device according to claim 7, wherein the light transmission control material layer of the dimmer is configured to be a light shutter formed of an inorganic electro-luminescence material layer.

12. The display device of claim 1, wherein the dimmer is configured to:
    when the measure of ambient light illumination is above a first value, adjust the amount of light transmittance of external light to the optical device to be equal to or lower than a first light transmittance amount; and
    when the measure of ambient light illumination is equal to or lower than the first value, adjust the amount of light transmittance of external light to the optical device to be equal to or greater than a second light transmittance amount.

13. The display device of claim 12, wherein the first light transmittance amount is 30% transmittance, and wherein the second light transmittance amount is 51% transmittance.

14. The display device of claim 1, further comprising a sensor configured to measure ambient light illumination and to provide an indication of the measured ambient light illumination to the dimmer.

15. The display device of claim 1,
    wherein the dimmer is configured to adjust the amount of light transmittance to the optical device of external light incident from outside of the display device based on a measure of ambient light illumination.

16. The display device of claim 15, wherein the dimmer is configured to:
    when the measure of ambient light illumination is above a first value, adjust the amount of light transmittance of external light to the optical device to be equal to or lower than a first light transmittance amount; and
    when the measure of ambient light illumination is equal to or lower than the first value, adjust the amount of light transmittance of external light to the optical device to be equal to or greater than a second light transmittance amount.

17. The display device of claim 16, wherein the first light transmittance amount is 30% transmittance, and wherein the second light transmittance amount is 51% transmittance.

18. The display device of claim 15, further comprising a sensor configured to measure ambient light illumination and to provide an indication of the measured ambient light illumination to the dimmer.

19. The display device of claim 1, wherein the first portion of the dimmer comprises an edge portion of the dimmer.

* * * * *